United States Patent
Imai et al.

(10) Patent No.: US 7,050,482 B2
(45) Date of Patent: May 23, 2006

(54) APPARATUS AND METHOD FOR MEASUREMENT OF COMMUNICATION QUALITY IN CDMA SYSTEM

(75) Inventors: Tetsuro Imai, Kanagawa (JP); Shinichi Mori, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 987 days.

(21) Appl. No.: 09/827,800

(22) Filed: Apr. 6, 2001

(65) Prior Publication Data

US 2001/0030991 A1    Oct. 18, 2001

(30) Foreign Application Priority Data

| Apr. 6, 2000 | (JP) | ............................. 2000-105485 |
| Apr. 6, 2000 | (JP) | ............................. 2000-105486 |
| Feb. 27, 2001 | (JP) | ............................. 2001-053033 |

(51) Int. Cl.
H04B 1/69 (2006.01)
H04B 1/38 (2006.01)

(52) U.S. Cl. .................... 375/145; 375/142; 455/562.1

(58) Field of Classification Search ................ 375/142, 375/145; 370/320; 342/445, 457
See application file for complete search history.

(56) References Cited

U.S. PATENT DOCUMENTS

| 5,414,730 A | 5/1995 | Lundquist et al. ........... 375/208 |
| 5,805,648 A | 9/1998 | Sutton ......................... 375/367 |
| 6,028,894 A | 2/2000 | Oishi et al. .................. 375/227 |

FOREIGN PATENT DOCUMENTS

EP    0 682 418 A2    5/1995

| EP | 0820156 A2 | 2/1998 |
| EP | 0982879 A1 | 3/2000 |
| EP | 0987833 A2 | 3/2000 |
| WO | WO 99/66643 | 12/1999 |

OTHER PUBLICATIONS

Subspace Based Estimation of the Signal to Interference Ratio for CDMA Cellular Systems Deepa Ramakrishna, Narayan B. Mandayam and Roy D. Yates 1997 IEEE p. 735-739.

Subspace Based Estimation of the Signal to Interference Ratio for TDMA Cellular Systems Michael Andersin, Narayan B. Mandayam and Roy D. Yates 1996 IEEE p. 1155-1159.

(Continued)

Primary Examiner—Stephen Chin
Assistant Examiner—Cicely Ware
(74) Attorney, Agent, or Firm—Workman Nydegger

(57) ABSTRACT

In order to perform synchronization detection with high speed, high precision and high reliability and to measure communication quality (propagation characteristics) at high precision and high efficiency, a mobile station includes synchronization detecting portion for detecting synchronization chip timing of channel to be measured, a synchronization chip timing information portion accumulating information of detected synchronization chip timing, a correlation detecting portion deriving a correlation value between spreading code of the channel to be measured and a received signal for performing communication with a base station and measurement of communication quality with taking the detected synchronization chip timing as a reception chip timing, a time series generating portion for generating a time series data of received signal vector after correlation detection, and a communication quality calculating portion for calculating communication quality from generated time series data.

38 Claims, 41 Drawing Sheets

OTHER PUBLICATIONS

Applications of Space-Time Adaptive Processing in Wireless Communication A.M. Haimovich and A. Shah 1997 IEEE p. 1098-1102.

An Improved Detection Technique for Direct-Sequence Code Acquistion in a Rayleigh Fading Mobile Channel Char-Dir Chung 1994 IEEE p. 1691-1695.

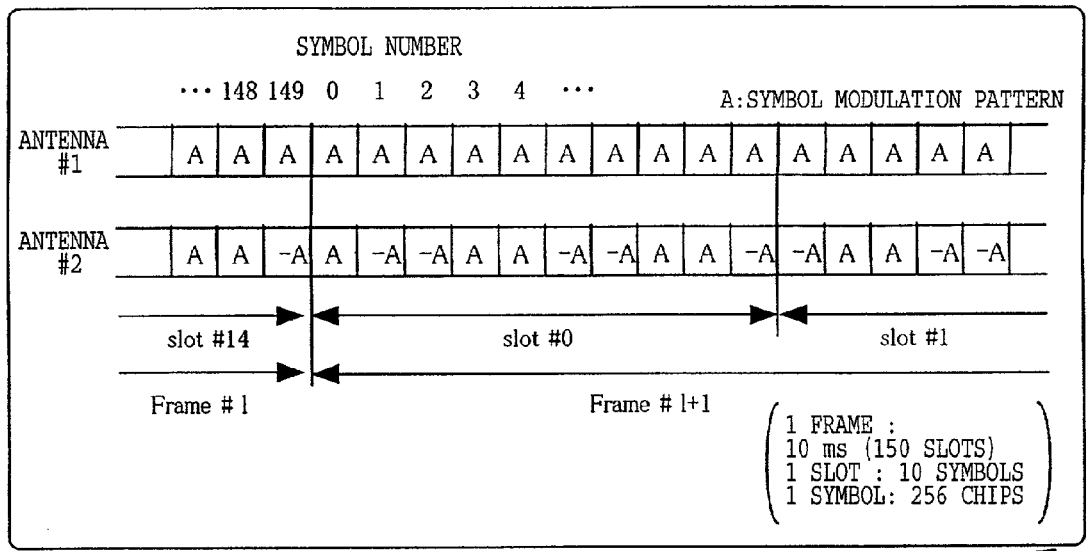
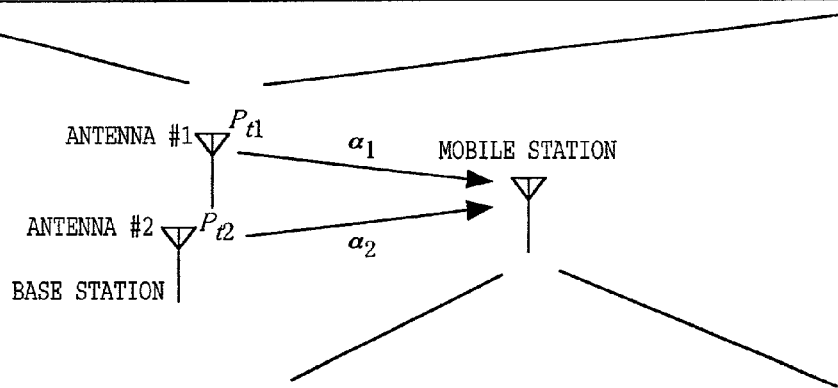
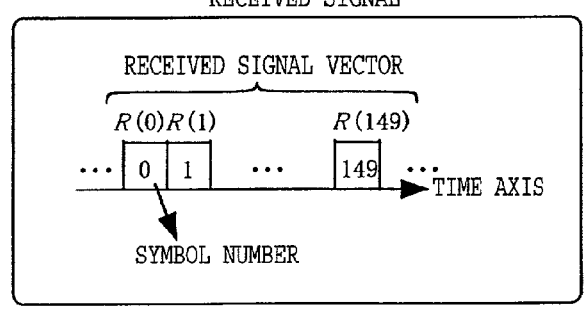
FIG.16

APPARATUS AND METHOD FOR MEASUREMENT OF COMMUNICATION QUALITY IN CDMA SYSTEM

This application claims priority under 35 U.S.C. 119 to Patent Application Nos. 2000-105485 filed Apr. 6, 2000, 2000-105486 filed Apr. 6, 2000, and 2001-53033 filed Feb. 27, 2001 in Japan, the contents of which are incorporated hereinto by reference.

BACKGROUND OF THE INVENTION

1. Field of the Invention

The present invention relates generally to a method and an apparatus for measurement of communication quality in a mobile communication system using a CDMA cellular system. More particularly, the invention relates to a method and an apparatus for measuring desired signal power, interference signal power, SIR and propagation paths between transmitter and receiver, as communication quality. Also the invention relates to a method and a system for detection of synchronization suitable for measuring communication quality using channels spread by relatively long known spreading code constantly transmitted by installed base stations.

2. Description of the Related Art

In CDMA cellular system, it is required to detect a synchronization chip timing of a channel to measure, namely a reception chip timing in conventional measurement of communication quality (propagation characteristics). It should be noted that the reception chip timing is promised to match with a position of a path between transmitter and receiver in time effective for communication. Next, for setting a correlation detector called a finger for the reception chip timing for deriving a received signal vector in the reception chip timing from a correlation value.

FIG. 1 shows a process for deriving a desired signal power and an interference signal power. The signal vector set forth above is a sum of the desired signal and the interference signal. Therefore, a received signal vector obtained within a certain given period (normally about 3 to 5 symbols) is summed and averaged to take obtained vector as a desired signal vector. The desired signal power is derived as a power of the desired signal vector. The interference signal vector is derived from a variance of the received signal vector with taking the desired signal vector as reference. Here, the chip length to be used in correlation is referred to as one symbol.

Effective paths between transmitter and receiver presents in about three to five paths in urban area in general (here, chip rate is about 4 Mcps). Accordingly, in order to obtain the desired signal power, the interference signal power and SIR for all of the effective paths, corresponding number of fingers are required to be not effective. On the other hand, vector averaging is included during process of measurement, it is essential that the symbol to be used for averaging is "a symbol which can be regarded to have the same phase of the desired signal vector". Normally, the symbol continuous in time is used. However, the condition is different when a transmit diversity is applied to the channel to be measured.

For example, when the channel to be measured is taken as a common pilot channel when the transmit diversity is applied, at first, the received signal vector after correlation detection is added and subtracted by preceding and following symbols to separate into received signal vector per each transmission antenna. Next, the desired signal power and the interference signal power are derived by performing the foregoing calculation per each received signal vector. By combining the desired signal power and the interference signal power obtained for each transmission antenna, the desired signal power and the interference signal power upon use of the transmit diversity is derived.

During this process, the received signal vector for each transmission antenna can be obtained only at every two symbol period. Accordingly, number of samples to be used in averaging, namely number of received signal vectors, becomes smaller in comparison with the case where the transmit diversity is not applied, to degrade measurement precision for each transmission antenna. When number of samples is set to be the same number as that when the transmit diversity is not applied, phase variation of the desired signal vector due to fading becomes not ignorable. Naturally, the measurement precision for each transmission antenna is lowered, the measurement precision after final combination is also lowered.

On the other hand, when a measurement system is installed on a mobile measurement vehicle for measuring communication quality while moving, the path position between transmitter and receiver is moved per each path according to movement of the mobile measurement vehicle. Accordingly, upon measuring, detection of reception chip timing has to be constantly performed and position of the finger has to be updated. When updating speed is low relative to movement of the path, the reception chip timing and path position can be offset. Therefore, obtained measured value cannot be correct.

As a method for detection of synchronization chip timing, namely a method that the mobile equipment detects of synchronization with the connecting base station at a preceding stage to perform measurement of communication quality, so-called 3-step cell search method is used in a wide band CDMA (hereinafter referred to as W-CDMA) cellular system. More particularly, so-called 3-step cell search method is a method performing detection of synchronization using three channels of PSCH (Primary Synchronization CHannel), SSCH (Secondary Synchronization CHannel), CPICH (Common Pilot Channel) transmitted from the base station. A cause why three channels are used by the 3-step cell search method is that the code of the channel transmitted from the base station (scrambling code) is unknown.

However, in measurement system or the like, in which the base station as object for measurement (objective scrambling code), the 3-step cell search method cannot be effective synchronization detection method. For example, when CPICH transmitted from the base station is used as channel to be measured, detection of synchronization may be performed by using only scrambling code, in which CPICH of the base station as object for measurement is spread.

On the other hand, when it is not necessary to perform communication between the base station and the mobile equipment immediately after detection of synchronization and when the synchronization chip timing may be determined with a certain range, complete synchronization detection is not required. Furthermore, it is possible to perform measurement of a service area by installing pseudo base station in advance of actual installation of the base station. In such case, it is not efficient to transmit three channels corresponding PSCH, SSCH and CPICH by the pseudo base station for measurement.

By the conventional method, for measuring communication quality (propagation characteristics) at high precision, correlation detectors called as fingers are provided in number corresponding to number of the paths, and installation position of each finger (reception chip timing) has to be certainly matched with the position of the path. Also, it is not efficient for constraint condition for number of samples and sampling interval upon deriving the desired signal power, the interference signal power in each reception chip timing.

On the other hand, it is not efficient in that number of samples and sampling interval are different depending upon whether transmit diversity is applied or not.

Furthermore, in the conventional method, upon performing detection of synchronization of the channel to be measured, channel other than the channel to be measured is required to be inefficient.

SUMMARY OF THE INVENTION

It is therefore an object of the present invention is to provide a communication quality measuring method and an apparatus for measurement of communication quality (propagation characteristics) with high precision and high efficiency by taking all chip timing in a range set at a reception chip timing detected in a preliminary step of measurement, and generating two time series having several period of time difference from a received signal vector of the same chip timing obtained within a certain given period.

Another object of the present invention is to provide a synchronization detecting method and apparatus which can perform detection of synchronization for measurement at high speed, high precision and high reliability.

A further object of the present invention to provide a synchronization detecting method and apparatus which can perform detection of synchronization for measurement at high speed, high precision and high reliability while transmit diversity is applied.

In order to accomplish the above-mentioned object, according to the 1st invention, a communication quality measuring method in CDMA cellular system detecting a reception chip timing of a channel to be measured and measuring communication quality, comprises: time series generating step of generating two series of data consisted of a time series data of a detected value and a time series data delayed for one, two or more periods, with respect to the reception chip timing where the detected value becomes the same; matrix calculation step of deriving covariant matrix of the two series data generated in the time series generating step; first power calculating step of deriving a desired signal power and an interference signal power in the reception chip timing from eigenvalues of the covariant matrix; and SIR calculating step deriving a SIR at the reception chip timing from the desired signal power and the interference signal power. With this method, the desired signal power, the interference signal power and SIR can be measured without restriction of sample number and sampling interval in series.

According to the 2nd invention, a communication quality measuring method in CDMA cellular system detecting a reception chip timing of a channel to be measured and measuring communication quality, comprises: time series generating step of generating two series of data consisted of a time series data of a detected value and a time series data delayed for one, two or more periods, with respect to the reception chip timing where the detected value becomes the same; adding step of deriving an add vector from addition of received signal vector between two points close in reception timing when the two series data generated in the time series generating step becomes a particular correlation value; subtracting step of deriving a difference vector from a difference of received signal vectors between two points close in reception timing; second power calculation step of deriving a desired signal power and an interference signal power by averaging the add vectors and the difference vectors; and SIR calculating step deriving a SIR at the reception chip timing from the desired signal power and the interference signal power. With this method, the desired signal power, the interference signal power and SIR can be simply and precisely measured without restriction of sample number and sampling interval in series.

According to the 3rd invention, in the 1st and 2nd invention, a communication quality measuring method in CDMA cellular system further comprises third power calculation step of deriving an averaged desired signal power and an averaged interference signal power by performing averaging in a given period from the desired signal power and the interference signal power obtained in a first power calculation step and the second power calculation step, and in the SIR calculation step, the SIR is derived from the averaged desired signal power and the averaged interference signal power.

According to the 4th invention, in the 1st and 2nd invention, when the channel to be measured is plural and only one correlation detector is useful, correlation detection of a plurality of channels are performed in time division for generating two series generated in the same reception chip timing per channel.

According to the 5th invention, in the 4th invention, a communication quality measuring method in CDMA cellular system further comprises fourth power calculation step of deriving an averaged desired signal power and an averaged interference signal power by averaging a given period from the desired signal power and the interference signal power obtained in the first power calculation step and a second power calculation step, and in the SIR calculation step, the SIR is derived from the averaged desired signal power and the averaged interference signal power.

According to the 6th invention, in the 3rd invention, when the channel to be measured is plural and only one correlation detector is useful, in the third power calculating step, the averaged desired signal power and the average interference signal power are derived in time division, and in the SIR calculation step, the SIR of a plurality of channels are derived in time division.

According to the 7th invention, in the 1st and 2nd invention, the communication quality measuring method in CDMA cellular system further comprises path detection step of deriving paths of transmitter and receiver to be effective for communication from a value of the SIR obtained in the SIR calculation step. With this method, judgment whether the measured reception chip timing from the measured based on the value of measured SIR matches the position of the path effective for communication, or not, is facilitated. On the other hand, when all chip timing in the measurement window including the detected reception chip timing are taken as object for measurement, effective path can be derived from the value of SIR of each chip.

According to the 8th invention, a communication quality measuring apparatus in CDMA cellular system detecting a reception chip timing of a channel to be measured and measuring communication quality, comprising: time series generating means for generating two series of data consisted of a time series data of a detected value and a time series data delayed for one, two or more periods, with respect to the reception chip timing where the detected value becomes the same; matrix calculation means for deriving covariant matrix of the two series data generated in the time series generating means; first power calculating means for deriving a desired signal power and an interference signal power in the reception chip timing from eigenvalues of the covariant matrix; and SIR calculating means deriving a SIR at the reception chip timing from the desired signal power and the interference signal power. With this method, the desired signal power, the interference signal power and SIR can be measured without restriction of sample number and sampling interval in series.

According to the 9th invention, a communication quality measuring apparatus in CDMA cellular system detecting a reception chip timing of a channel to be measured and measuring communication quality, comprises: time series generating means for generating two series of data consisted of a time series data of a detected value and a time series data delayed for one, two or more periods, with respect to the reception chip timing where the detected value becomes the same; adding means for deriving an add vector from addition of received signal vector between two points close in reception timing when the two series data generated in the time series generating means becomes a particular correlation value; subtracting means for deriving a difference vector from a difference of received signal vectors between two points close in reception timing; second power calculation means for deriving a desired signal power and an interference signal power by averaging the add vectors and the difference vectors; and SIR calculating means deriving a SIR at the reception chip timing from the desired signal power and the interference signal power. With this method, the desired signal power, the interference signal power and SIR can be simply and precisely measured without restriction of sample number and sampling interval in series.

According to the 10th invention, in 8th or 9th invention, the communication quality measuring apparatus in CDMA cellular system further comprises third power calculation means for deriving an averaged desired signal power and an averaged interference signal power by performing averaging in a given period from the desired signal power and the interference signal power obtained in the first power calculation means and a second power calculation means.

According to the 11th invention, in 8th or 9th invention, when the channel to be measured is plural and only one correlation detector is useful, the time series generating means derives the averaged desired signal power and the average interference signal power in time division, and the SIR calculation means derives the SIR of a plurality of channels in time division.

According to the 12th invention, in the 11th invention, the communication quality measuring apparatus in CDMA cellular system further comprises fourth power calculation means for deriving an averaged desired signal power and an averaged interference signal power by averaging a given period from the desired signal power and the interference signal power obtained in the first power calculation means and a second power calculation means.

According to the 13th invention, in the 10th invention, the communication quality measuring apparatus in CDMA cellular system comprises third power calculation means for deriving an averaged desired signal power and an averaged interference signal power by performing averaging in a given period from the desired signal power and the interference signal power obtained in a first power calculation means and the second power calculation means.

According to the 14th invention, the communication quality measuring apparatus in CDMA cellular system further comprises path detection means for deriving paths between transmitter and receiver to be effective for communication from a value of the SIR obtained in the SIR calculation means. With this construction, judgment can be done easily whether the reception chip timing measured from the value of the measured SIR matches with the position of the path effective for communication or not. Also, when all chip timing in the measurement window including the detected reception chip timing is taken as object for measurement, effective paths can be derived from the value of SIR of each chip.

According to the 15th invention, a communication quality measuring method detecting reception chip timing of channel to be measured repeatedly transmitted a transmission symbol series of a known pattern and performing measurement of communication quality, comprises: correlation detection step of performing correlation detection of received signal using a code series spreading the channel to be measured; delay step of delaying one of received series detected in the correlation detection step for one, two or more symbol period within a range where mutual correlation between transmission symbol series is 1 and influence of a propagation path can be regarded as the same; vector calculation step of calculating difference vector and add vector from difference value and add value of respective received signal vectors of the same reception chip timing in the other received series detected by the correlation detection step and the received series provided delay in the delay step; and communication quality calculation step of calculating a desired signal power, an interference signal power and SIR from the difference vector and the add vector calculated in the vector calculation step. With this method, by providing a time difference within a range where the correlation between the transmission symbol series is 1 and influence of the propagation path can be regarded as the same, the desired signal power, the interference signal power and SIR can be simply and precisely measured.

According to the 16th invention, a communication quality measuring method detecting reception chip timing of channel to be measured repeatedly transmitted transmission symbol series of respectively different known pattern using common spreading code from different antennas upon use of transmit diversity and performing measurement of communication quality, comprises: correlation detection step of performing correlation detection of received signal using a code series spreading the channel to be measured; delay step of delaying one of received series detected in the correlation detection step for one, two or more symbol period within a range where mutual correlation between transmission symbol series in the different antennas is 1 and influence of a propagation path can be regarded as the same; vector calculation step of calculating difference vector and add vector from difference value and add value of respective received signal vectors of the same reception chip timing in the other received series detected by the correlation detection step and the received series provided delay in the delay step; and communication quality calculation step of calculating a desired signal power, an interference signal power and SIR from the difference vector and the add vector calculated in the vector calculation step. With this method, the desired signal power, the interference signal power and SIR of the channel to be measured and applying the transmit diversity, can be measured precisely and easily.

According to the 17th invention, in the 15th invention, the communication quality measuring apparatus further comprises vector selection step of selecting only result of calculation at the same reception chip timing of received symbol matching respective transmission symbols of the different antenna among difference vector and add vector calculated in the vector calculation step when a mutual correlation between transmission symbol series is smaller than one.

According to the 18th invention, in the 16th invention, the communication quality measuring apparatus further comprises vector selection step of selecting only result of calculation at the same reception chip timing of received symbol matching respective transmission symbols of the different antenna among difference vector and add vector calculated in the vector calculation step when a mutual correlation between transmission symbol series in the different antenna is smaller than one.

According to the 19th invention, a communication quality measuring apparatus detecting reception chip timing of channel to be measured repeatedly transmitted a transmission symbol series of a known pattern and performing measurement of communication quality, comprises: correlation detection means for performing correlation detection of received signal using a code series spreading the channel to be measured; delay means for delaying one of received series detected in the correlation detection step for one, two or more symbol period within a range where mutual correlation between transmission symbol series is 1 and influence of a propagation path can be regarded as the same; vector calculation means for calculating difference vector and add vector from difference value and add value of respective received signal vectors of the same reception chip timing in the other received series detected by the correlation detection step and the received series provided delay in the delay step; and communication quality calculation means for calculating a desired signal power, an interference signal power and SIR from the difference vector and the add vector calculated in the vector calculation step. With this method, by providing a time difference within a range where the correlation between the transmission symbol series is 1 and influence of the propagation path can be regarded as the same, the desired signal power, the interference signal power and SIR can be simply and precisely measured.

According to the 20th invention, a communication quality measuring apparatus detecting reception chip timing of channel to be measured repeatedly transmitted transmission symbol series of respectively different known pattern using common spreading code from different antennas upon use of transmit diversity and performing measurement of communication quality, comprises: correlation detection means for performing correlation detection of received signal using a code series spreading the channel to be measured; delay means for delaying one of received series detected in the correlation detection step for one, two or more symbol period within a range where mutual correlation between transmission symbol series in the different antennas is 1 and influence of a propagation path can be regarded as the same; vector calculation means for calculating difference vector and add vector from difference value and add value of respective received signal vectors of the same reception chip timing in the other received series detected by the correlation detection step and the received series provided delay in the delay step; and communication calculation quality means for calculating a desired signal power, an interference signal power and SIR from the difference vector and the add vector calculated in the vector calculation step. With this method, the desired signal power, the interference signal power and SIR can be measured more precisely. With this method, the desired signal power, the interference signal power and SIR of the channel to be measured and applying the transmit diversity, can be measured precisely and easily.

According to the 21st invention, in the 19th invention, the communication quality measuring apparatus further comprises vector selection means for selecting only result of calculation at the same reception chip timing of received symbol matching respective transmission symbols of the different antenna among difference vector and add vector calculated in the vector calculation step when a mutual correlation between transmission symbol series is smaller than one. With this construction, the desired signal power, the interference signal power and SIR can be measured more precisely.

According to the 22nd invention, in the 19th invention, the communication quality measuring apparatus further comprises vector selection means for selecting only result of calculation at the same reception chip timing of received symbol matching respective transmission symbols of the different antenna among difference vector and add vector calculated in the vector calculation step when a mutual correlation between transmission symbol series in the different antenna is smaller than one. With this construction, the desired signal power, the interference signal power and SIR can be measured more precisely. With this construction, the desired signal power, the interference signal power and SIR can be measured more precisely.

According to the 23rd invention, for measuring communication quality in a mobile receiving station in a mobile communication system employing a CDMA cellular system, using channel spread with spreading code and constantly transmitted from a base station, a synchronization detecting method in CDMA cellular system comprises the step of: in the mobile receiving station, determining a synchronization chip timing of a channel to be measured by detecting partial correlation value between spreading code to be measured and a received signal. With this method, since the partial correlation value is derived between the spreading code of the channel to be measured and the received signal, three channels are not required for synchronization detection.

According to the 24th invention, in the 23rd invention, a matched filter is used upon detection of the partial correlation value and a synchronization chip timing of the channel to be measured is detected by sequentially rewriting the code in the matched filter. With this method, synchronization detection using the partial correlation value can be performed at high speed, high precision and high reliability.

According to the 25th invention, in the 23rd and 24th inventions, an averaging period and sampling period are preliminarily set in advance of performing the synchronization detection, and the synchronization chip timing of the channel to be measured is determined on the basis of a value derived by averaging of detected plurality of partial correlation values in the averaging period by detecting the partial detection values per set sampling period.

According to the 26th invention, in the 25th invention, upon averaging process of the detected plurality of partial correlation values, the synchronization chip timing of the channel to be measured is determined using an averaged value by preliminarily calculating the averaged value by power averaging process or vector averaging process.

According to the 27th invention, in the 26th invention, the synchronization chip timing of the channel to be measured is determined by enabling setting of process of the averaging process for a plurality of times and using the averaged value derived by a plurality of times of averaging process by the same or different averaging method in each process.

According to the 28th invention, the steps of performing synchronization chip timing detection process for a plurality of times as defined in any one of 23rd to 27th, and making judgment whether synchronization chip timing of a channel to be measured is to be determined using an average value of a plurality of timing value and a standard deviation value, the synchronization chip timing of the channel to be measured is determined with providing a given range, or synchronization detection is to be performed again. With this method, correctness of the detected synchronization chip timing can be easily judged. Also, upon performing measurement of communication quality using the measurement window, position and width of the window can be determined.

According to the 29th invention, for measuring communication quality in a mobile receiving station in a mobile communication system employing a CDMA cellular system, using channel spread with spreading code and constantly transmitted from a base station, a synchronization detecting device in CDMA cellular system comprises: the mobile receiving station including means for determining a synchronization chip timing of a channel to be measured by detecting partial correlation value between spreading code to be measured and a received signal. With this method, since the partial correlation value is derived between the spreading code of the channel to be measured and the received signal, three channels are not required for synchronization detection.

According to the 30th invention, in the 29th invention, the means includes a matched filter is used upon detection of the partial correlation value and a synchronization chip timing of the channel to be measured is detected by sequentially rewriting the code in the matched filter. With this construction, synchronization detection using partial correlation can be performed at high speed, high precision and high reliability.

According to the 31st invention, the 29th and 30th inventions, the means preliminarily sets an averaging period and sampling period in advance of performing the synchronization detection, and determines the synchronization chip timing of the channel to be measured on the basis of a value derived by averaging of detected plurality of partial correlation values in the averaging period by detecting the partial detection values per set sampling period.

According to 32nd invention, in the 31st invention, upon averaging process of the detected plurality of partial correlation values, the means determines the synchronization chip timing of the channel to be measured using an averaged value by preliminarily calculating the averaged value by power averaging process or vector averaging process.

According to the 33rd invention, in the 32nd invention, the means determines the synchronization chip timing of the channel to be measured by enabling setting of process of said averaging process for a plurality of times and using the averaged value derived by a plurality of times of averaging process by the same or different averaging device in each process.

According to the 34th invention, a synchronization detecting device in CDMA cellular system comprises means for performing synchronization chip timing detection process for a plurality of times as defined in any one of the 29th to 33rd inventions, and making judgment whether synchronization chip timing of a channel to be measured is to be determined using an average value of a plurality of timing value and a standard deviation value, the synchronization chip timing of the channel to be measured is determined with providing a given range, or synchronization detection is to be performed again. With this method, correctness of the detected synchronization chip timing can be easily judged. Also, upon performing measurement of communication quality using the measurement window, position and width of the window can be determined.

According to the 35th invention, in a mobile communication system employing CDMA cellular system using a common pilot channel constantly transmitted from a base station in a mobile communication system upon use of transmit diversity for measuring communication quality in a mobile station being measured, a synchronization detecting device comprises: the mobile station separating received signal vector obtained by correlation detection of received signal per symbol into received signal vector per transmission antenna by performing addition and subtraction before and after symbol, and determining synchronization chip timing on the basis of a value derived by addition of the received signal vector in power. With this method, since the partial correlation value is derived between the spreading code of the channel to be measured and the received signal, three channels are not required for synchronization detection.

According to the 36th invention, in the 35 invention, the synchronization chip timing is determined on the basis of a value derived by addition of an average vector derived by averaging received signal vector per each of a plurality transmission antenna obtained over a plurality of period with taking a unit where symbol pattern of signals transmitted from a plurality of transmission antenna becomes orthogonal between antennas.

According to the 37th invention, synchronization detecting method in CDMA system determining synchronization chip timing on the basis of a value derived by performing synchronization chip timing detection process defined in 35th or 36th invention for a plurality of times and performing addition of obtained plurality of powers.

According to the 38th invention, in a mobile communication system employing CDMA cellular system using a common pilot channel constantly transmitted from a base station in a mobile communication system upon use of transmit diversity for measuring communication quality in a mobile station being measured, a synchronization detecting device comprises: the mobile station separating received signal vector per separating received signal vector obtained by detecting correlation per symbol by performing addition and subtraction before and after symbol, and determining synchronization chip timing on the basis of a value derived by addition of the received signal vector in power. With this method, since the partial correlation value is derived between the spreading code of the channel to be measured and the received signal, three channels are not required for synchronization detection.

According to the 39th invention, in the 38th invention, the means determines the synchronization chip timing on the basis of a value derived by addition of an average vector derived by averaging received signal vector per each of a plurality transmission antenna obtained over a plurality of period with taking a unit where symbol pattern of signals transmitted from a plurality of transmission antenna becomes orthogonal between antennas.

According to the 40th invention, a synchronization detecting device in CDMA system determining synchronization chip timing on the basis of a value derived by performing synchronization chip timing detection process defined in 38th or 39th inventions for a plurality of times and performing addition of obtained plurality of power.

According to the 41st invention, in a mobile communication system employing CDMA cellular system using a common pilot channel constantly transmitted from a base station in a mobile communication system upon use of transmit diversity for measuring communication quality in a mobile station being measured, a communication quality measuring method comprises: in the mobile station, received signal vector obtained by correlation detection of received signal per symbol being separated into received signal vector per transmission antenna by performing addition and subtraction before and after symbol, and a desired signal power, an interference signal power and SIR being calculated by deriving add vector and difference vector of two received signal vectors spaced for a plurality of symbol periods per transmission antenna, and performing averaging process of the add vector and the difference vector. With this method, when the symbol period for deriving the add vector and the difference vector at two symbols, when the phase variation of the desired signal vector due to fading within the two symbol period can be ignored, measuring precision can be improved in proportion to sample number.

According to the 42nd invention, in the 41st invention, the add vector and the difference vector are derived from the received signal vector of one transmission antenna and the desired signal power, the interference signal power and SIR are derived by adding a predetermined correction value.

According to the 43rd invention, in the 42nd invention, the desired signal power and the interference signal power are averaged, and the desired signal power, the interference signal power and SIR are calculated by adding a predetermined correction value.

According to the 44th invention, in a mobile communication system employing CDMA cellular system using a common pilot channel constantly transmitted from a base station in a mobile communication system upon use of transmit diversity for measuring communication quality in a mobile station being measured, a communication quality measuring apparatus comprising: the mobile station includes means for receiving received signal vector obtained by correlation detection of received signal per symbol being separated into received signal vector per transmission antenna by performing addition and subtraction before and after symbol, and calculating a desired signal power, an interference signal power and SIR by deriving add vector and difference vector of two received signal vectors spaced for a plurality of symbol periods per transmission antenna, and performing averaging process of the add vector and the difference vector. With this method, when the symbol period for deriving the add vector and the difference vector at two symbols, when the phase variation of the desired signal vector due to fading within the two symbol period can be ignored, measuring precision can be improved in proportion to sample number.

According to the 45th invention, in the 44th invention, the means derives the add vector and the difference vector from the received signal vector of one transmission antenna and derives the desired signal power, the interference signal power and SIR by adding a predetermined correction value.

According to the 46th invention, in the 45th invention, the means averages the desired signal power and the interference signal power, and calculates the desired signal power, the interference signal power and SIR by adding a predetermined correction value.

As set forth above, according to the present invention, the communication quality (propagation characteristics) can be measured with high precision by generating the time series data of the received signal vector at the same reception chip timing obtained in certain given period and the time series data shifted the data in time for several periods. Also, by performing communication quality measurement using the measurement window, without depending upon variation of the path between transmitter and receiver (number and position) to be caused in actual environment, moving measurement of the communication quality at high precision and high efficiency becomes possible and path number and positions thereof can also be measured accurately.

On the other hand, according to the present invention, since only channel to be measured is used, synchronization detection for measurement can be done at high speed, high precision and high reliability. Also, in case of synchronization detection under the premise of communication quality measurement using the measurement window, only position and window width of the measurement window is required. Thus, complete synchronization detection is not required.

Furthermore, according to the present invention, even when transmit diversity is applied, synchronization detection at high speed, high precision and high reliability. Also, measurement of the communication quality at high precision can be done at high speed and high efficiency.

The above and other objects, effects, features and advantages of the present invention will become more apparent from the following description of embodiments thereof taken in conjunction with the accompanying drawings.

BRIEF DESCRIPTION OF THE DRAWINGS

FIG. 16 is an illustration showing a frame structure of CPICH and the received signal in the case where a transmit diversity is applied;

DETAILED DESCRIPTION OF PREFERRED EMBODIMENTS

At first, detection of synchronization as a method for detecting a synchronization chip timing will be explained and then measurement of communication quality will be explained.

(1) Synchronization Detecting Method

Figure 1:
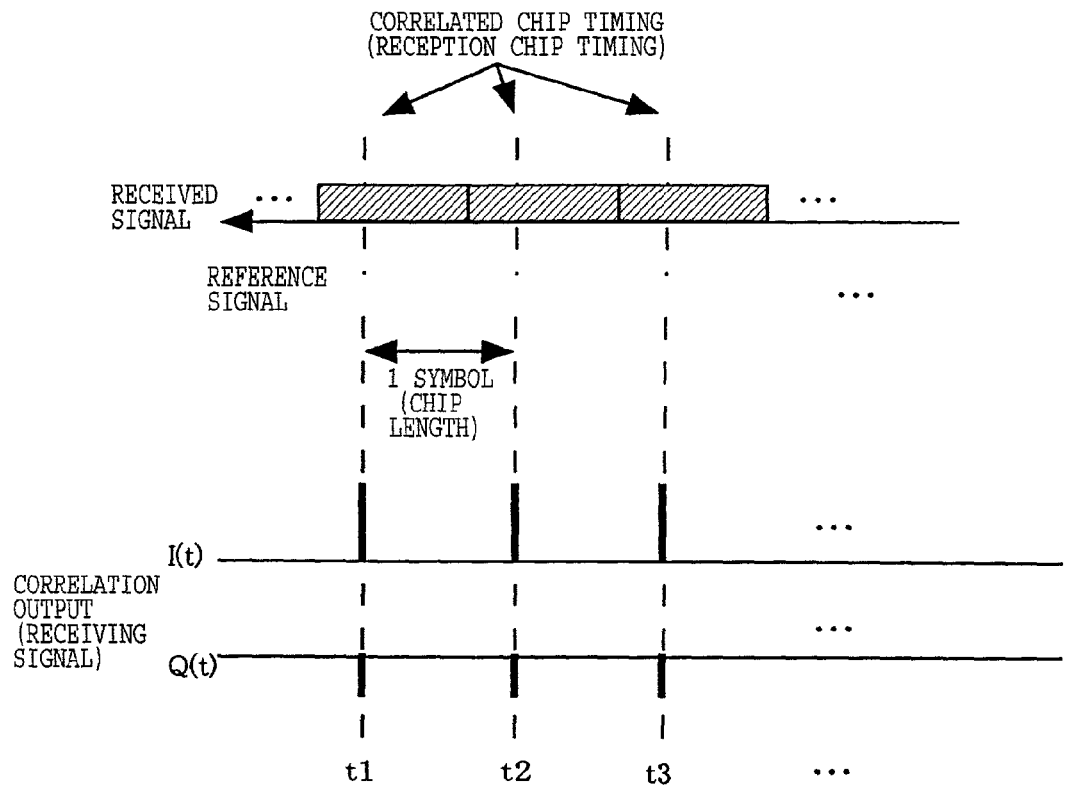
FIG. 1 is an illustration showing a process for deriving a desired signal power and an interference signal power.
Figure 2:
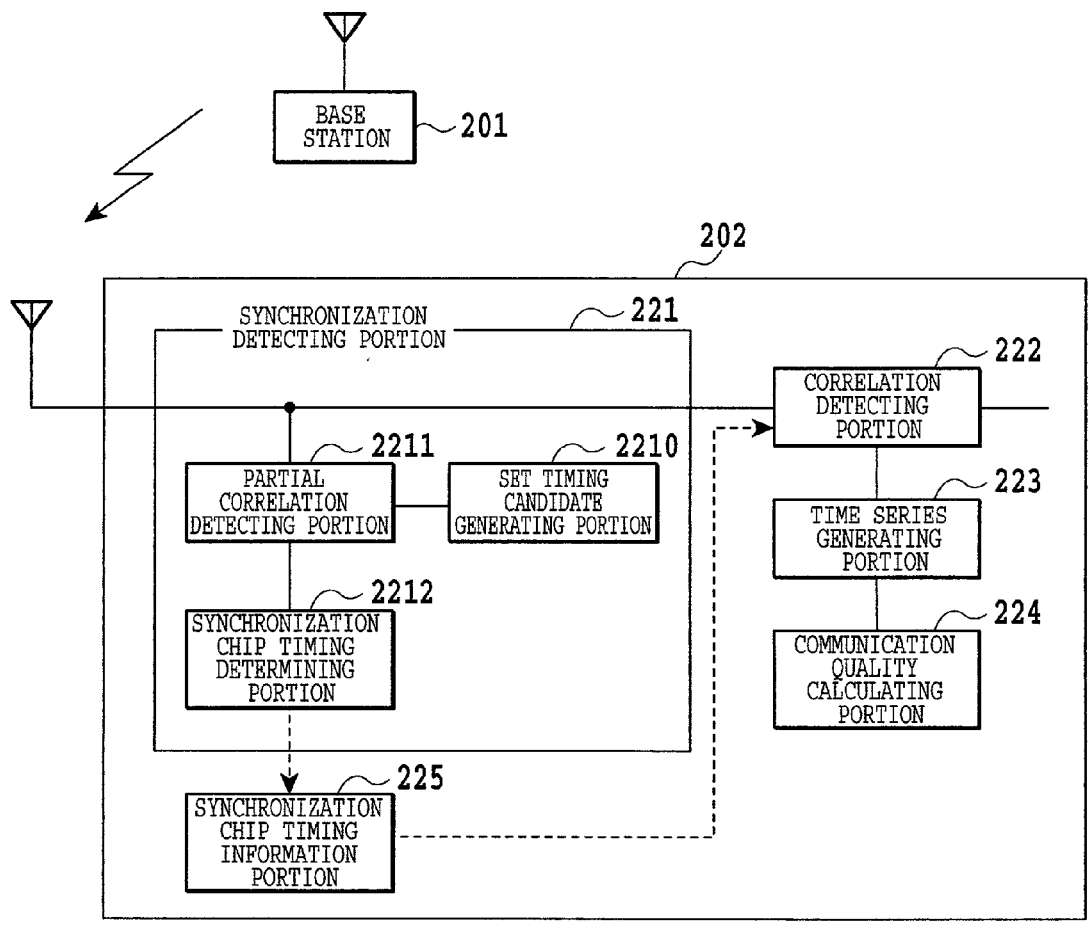
FIG. 2 is a block diagram showing an overall construction of a W-CDMA type mobile communication system, to which the present invention is applied.

FIG. 2 shows an overall construction of a W-CDMA type mobile communication system, to which the present invention is applied. The mobile communication system is constructed with a base station 201 and a mobile station 202. The mobile station 202 includes a synchronization detecting portion 221 detecting a synchronization chip timing of a channel to be measured for communication with the base station and measuring a communication quality, a synchronization chip timing information portion 225 for accumulating information of detected synchronization chip timing, a correlation detecting portion 222 for deriving a correlation value between a spreading code of the channel to be measured and a received signal for communication with the base station and measuring of communication quality, a time series generating portion 223 for generating a time series data of a received signal vector after correlation detection, and a communication quality calculating portion 224 for calculating a communication quality from the generated time series data. The synchronization detecting portion 221 includes a synchronization timing candidate generating portion 2210 for establishing blocks of all chip timings which can be synchronized and generating synchronization timing candidates, a partial correlation detecting portion 2211 deriving a partial correlation with a reception signal for the synchronization timing candidate, and a synchronization chip timing determining portion 2212 for determining synchronization chip timing from the partial correlation values of respective candidate timings.

Figure 3:
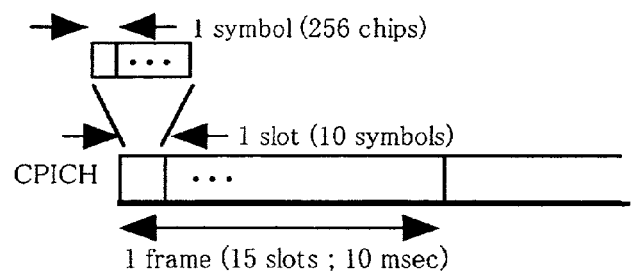
FIG. 3 is an illustration showing a frame construction of CPICH.

FIG. 3 shows a frame construction of CPICH (common pilot channel). In one frame, a hundred fifty symbols are contained. One frame is 10 msec. period. In the shown embodiment, as the channel to be measured, CPICH constantly transmitted from each base station is used. Namely, in the synchronization detecting method using only channel to be measured, the partial correlation between the spreading code of the channel to be measured and the received signal and a peak value where the partial correlation becomes maximum, is derived for detecting synchronized chip timing. Here, a matched filter is used for correlation detection and the partial correlation value is derived with sequentially varying the code to be written for achieving high speed synchronization chip timing.

While other embodiments will be explained later, improvement of precision of the synchronization detection can be achieved by averaging the obtained correlated value at every given interval and detecting the synchronization chip timing. Furthermore, reliability can be improved by repeating detection of synchronization chip timing for several times and determining the synchronization chip timing to be an object for measurement using the detected values of the synchronization chip timing, determining the synchronization chip timing with providing a certain range, or by making judgment whether synchronization detection has to be performed again or not.

On the other hand, in the embodiment of synchronization detection which will be described later, a time resolution of a synchronization timing is assumed as one chip length for simplification. However, when the synchronization timing is detected in greater detail, the synchronization detection method according to the present invention may be performed with setting sampling rate at X times of that in one chip length for over-sampling.

Figure 4:
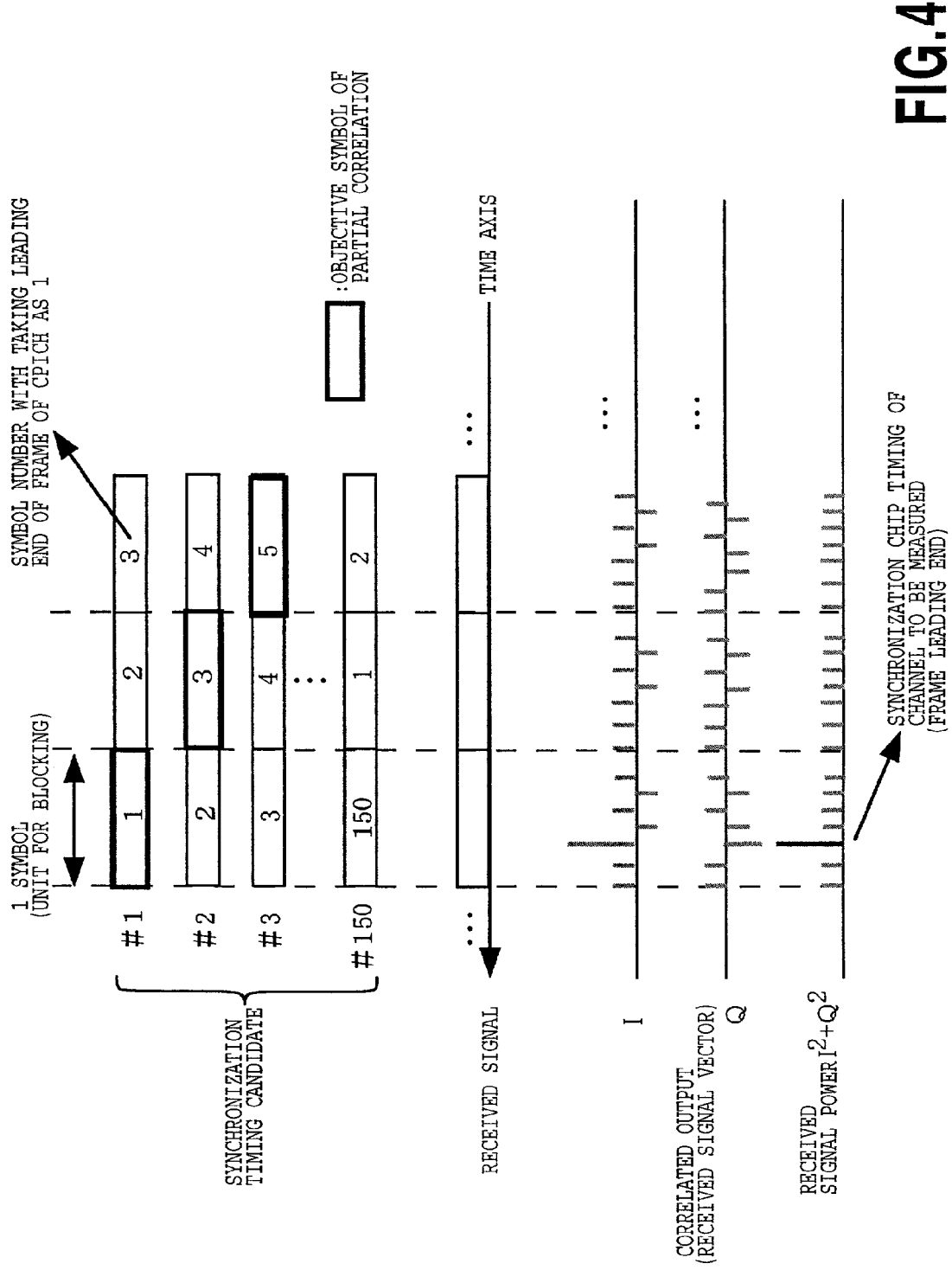
FIG. 4 is an illustration showing a principle of operation of the first embodiment of a synchronization detecting method according to the present invention.

FIG. 4 shows a principle of operation of the first embodiment of the synchronization detection method according to the present invention. In the first embodiment, an object for partial correlation is set at 256 chip length. When CPICH is taken as the channel to be measured, a chip timing, at which synchronization can be established, is 38400. Initially, the chip timing are blocked per symbol. Then, as synchronization timing, 150 candidates are generated with reference to symbol numbers of leading ends of the frames. Thereafter, partial correlation between each code of synchronization timing candidate and the received signal is sequentially derived as shown in FIG. 4 to obtain a power delay file per each synchronization timing candidate. Finally, chip timing where a candidate having the maximum peak among respective of obtained candidates of power delay profiles, is retrieved to take the obtained timing as the synchronization chip timing of the channel to be measured.

In W-CDMA system, a plurality of channels are transmitted at the same frequency, all channels other than the channel to be measured become interfering channels. Considering process gain, power of the interference signal is restricted for chip length to be used for ordinary correlation detection. In the embodiment shown in FIG. 4, partial correlation is performed at 256 chip length (1 symbol=256 chips), the process gain is 256, and an average power of the interference signal becomes 1/256.

In the first embodiment of the synchronization detection method, when the received signal power of the chip timing matching with an effective path position for communication is higher than or equal to a received signal power at other timing, detection of the synchronization chip timing is successful. Accordingly, by setting the chip length (unit for blocking) for partial correlation longer, probability of success in detection of the synchronization chip timing becomes higher.

Figure 5:
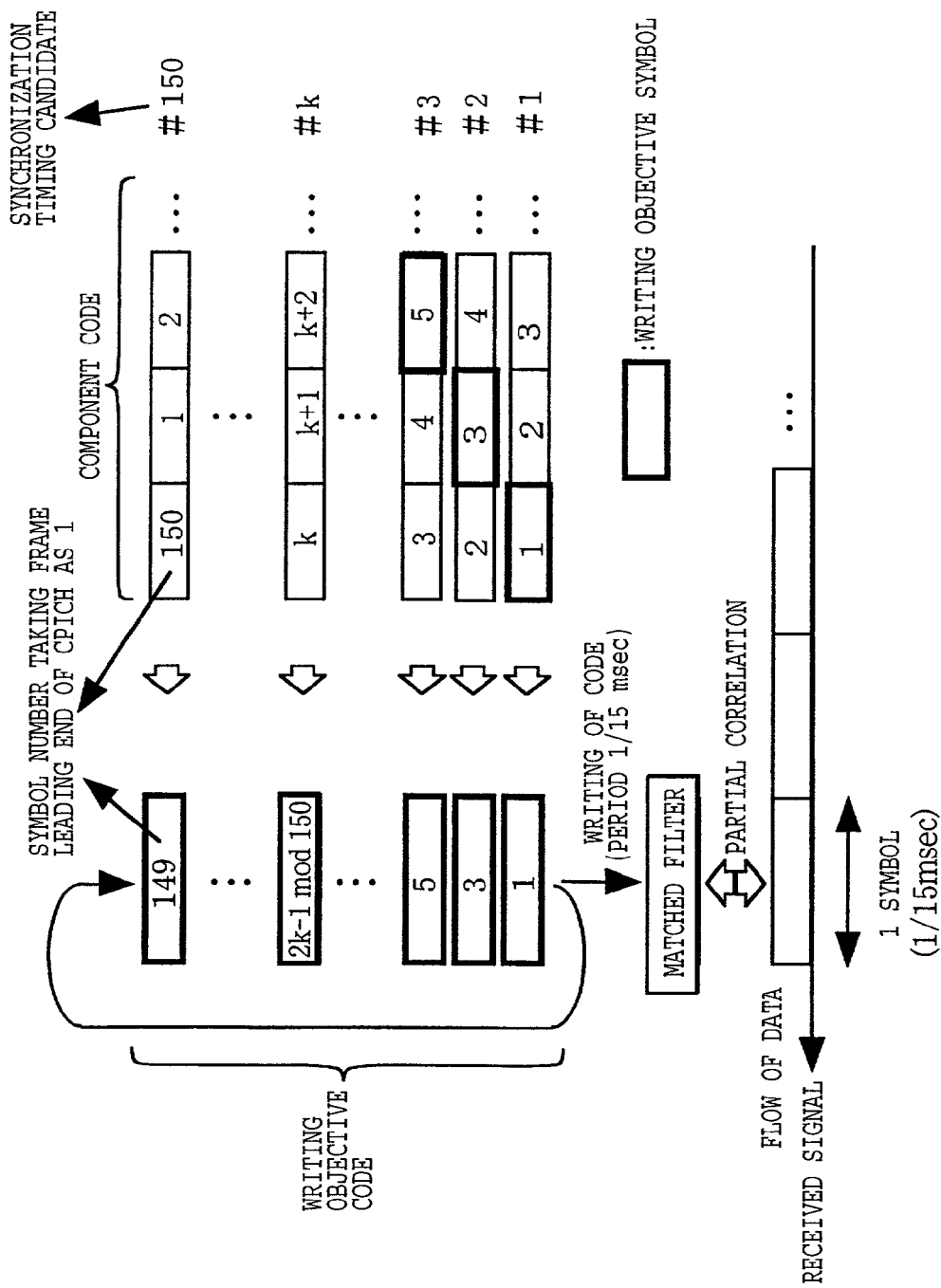
FIG. 5 is an explanatory illustration of an operation in the case when a matched filter is used in a correlation detecting portion of a mobile station, to which the present invention is applied.

FIG. 5 is explanatory illustration of operation in the case where a matched filter is used in the correlation detecting portion of the mobile station, to which the present invention is applied. The matched filter is used for calculation of partial correlation to rewrite code in the matched filter per 1/15 msec. As shown in FIG. 5, rewriting code to be written in the matched filter is consisted of 256 chips extracted among 150 timing candidates #1 to #150.

By the first embodiment, a period required for detecting the synchronization chip timing can be 10 msec.

Next, the second embodiment of the synchronization detection method will be explained. In the second embodiment, equalizing process in the synchronization detecting portion 221 shown in FIG. 2 will be described. In the mobile communication system, it is generally influenced by multi-path fading, the power of the received signal (correlation detected value) fluctuates significantly. Also, since partial correlation is used for correlation detection, precision in correlation detection is not always high.

Figure 6:
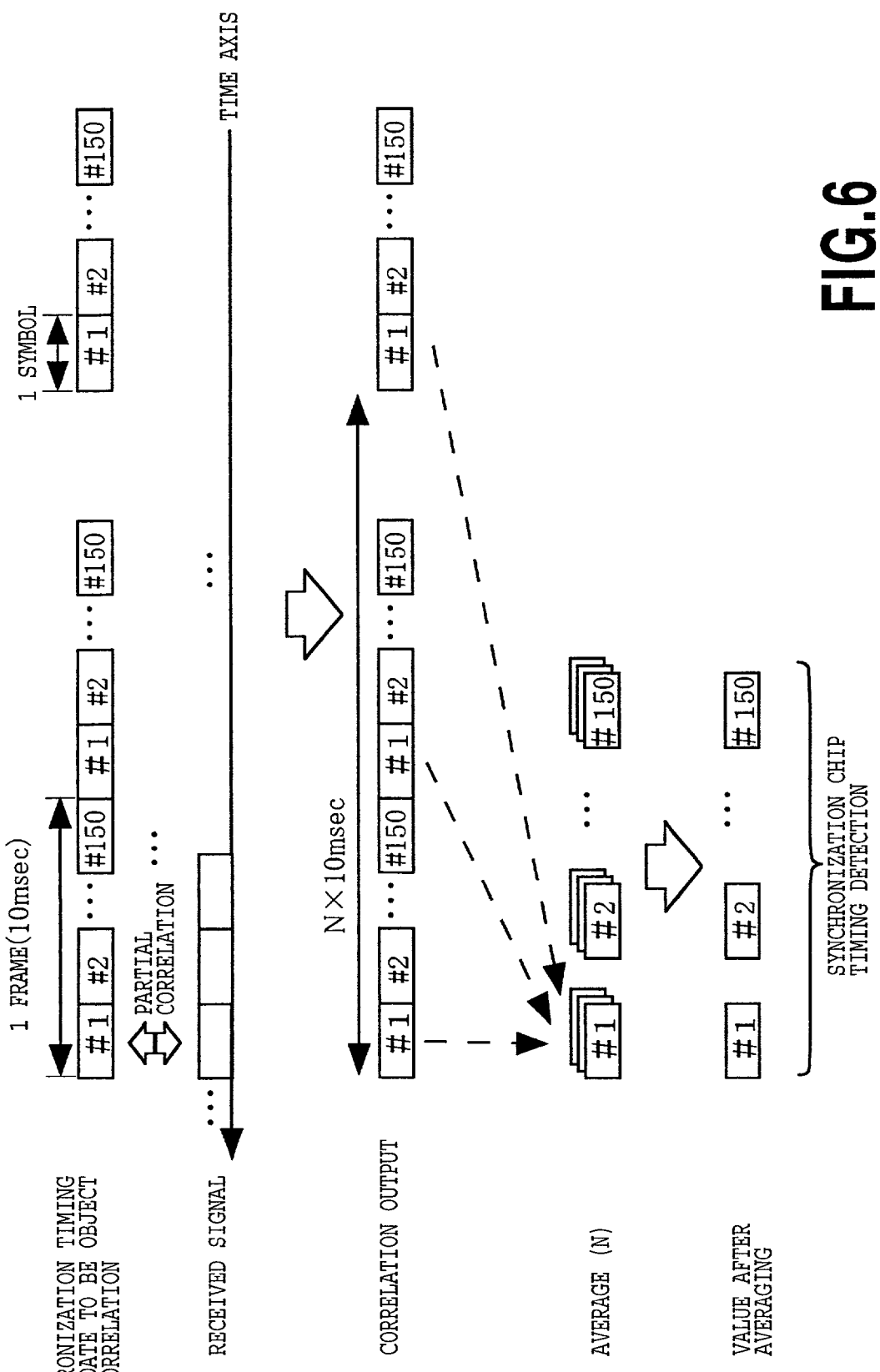
FIG. 6 is an illustration showing a principle of operation of the second embodiment of the synchronization detecting method according to the present invention.

FIG. 6 shows principle of operation of the second embodiment of the synchronization detection method according to the present invention. In the second embodiment, the partial correlation value of each synchronization timing candidate within a given period is averaged to detect synchronization chip timing using obtained average value. Accordingly, assuming that number of samples of respective timing candidate within the equalizing period is N, a period required fir detection of the synchronization chip timing becomes N*10 msec. As an averaging method, there are a method to perform power averaging process and a method to perform vector averaging process.

Figure 7:
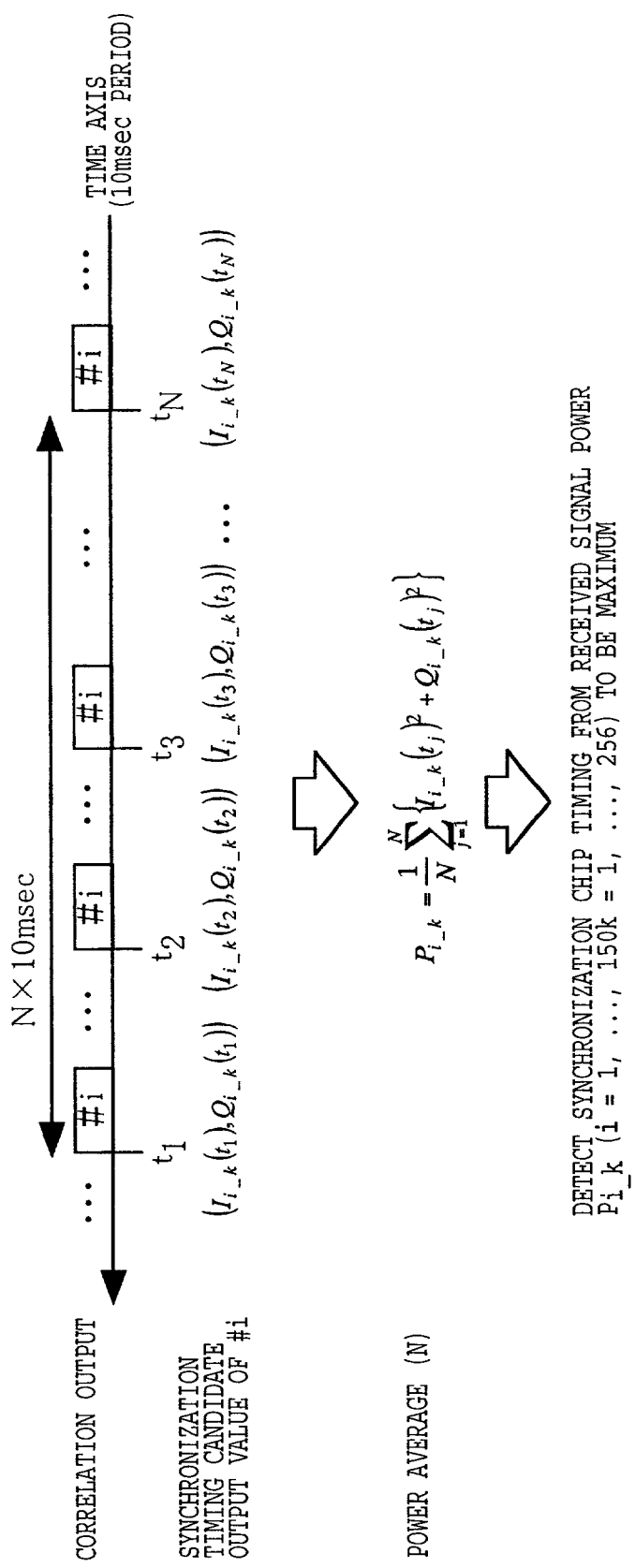
FIG. 7 is an illustration showing the case where a power averaging process as an equalizing process in the second embodiment of the synchronization detection method.

FIG. 7 shows the case where the power averaging process is performed as equalizing process in the second embodiment of the synchronization detecting method. A received signal vector at a timing t of the synchronization timing candidate #i and its chip number k in the symbol, is assumed as $(I_{i\_k}(t), Q_{i\_k}(t))$, the synchronization timing candidate after equalization is #i, and a power at chip number k in its symbol is assumed as $P_{i\_k}$.

In the power averaging process, the instantaneous received signal power is calculated from the received signal vector of each synchronization timing candidate, and subsequently, N in number of the calculated received signal power is averaged per synchronization timing candidate. By the power value after equalization thus obtained, the synchronization chip timing of the channel to be measured is determined. The power averaging process is characterized in that when sample number N is increased, a standard deviation of the received signal power at a timing other than the true synchronization chip timing becomes smaller (note that the average value is held unchanged).

Figure 8:
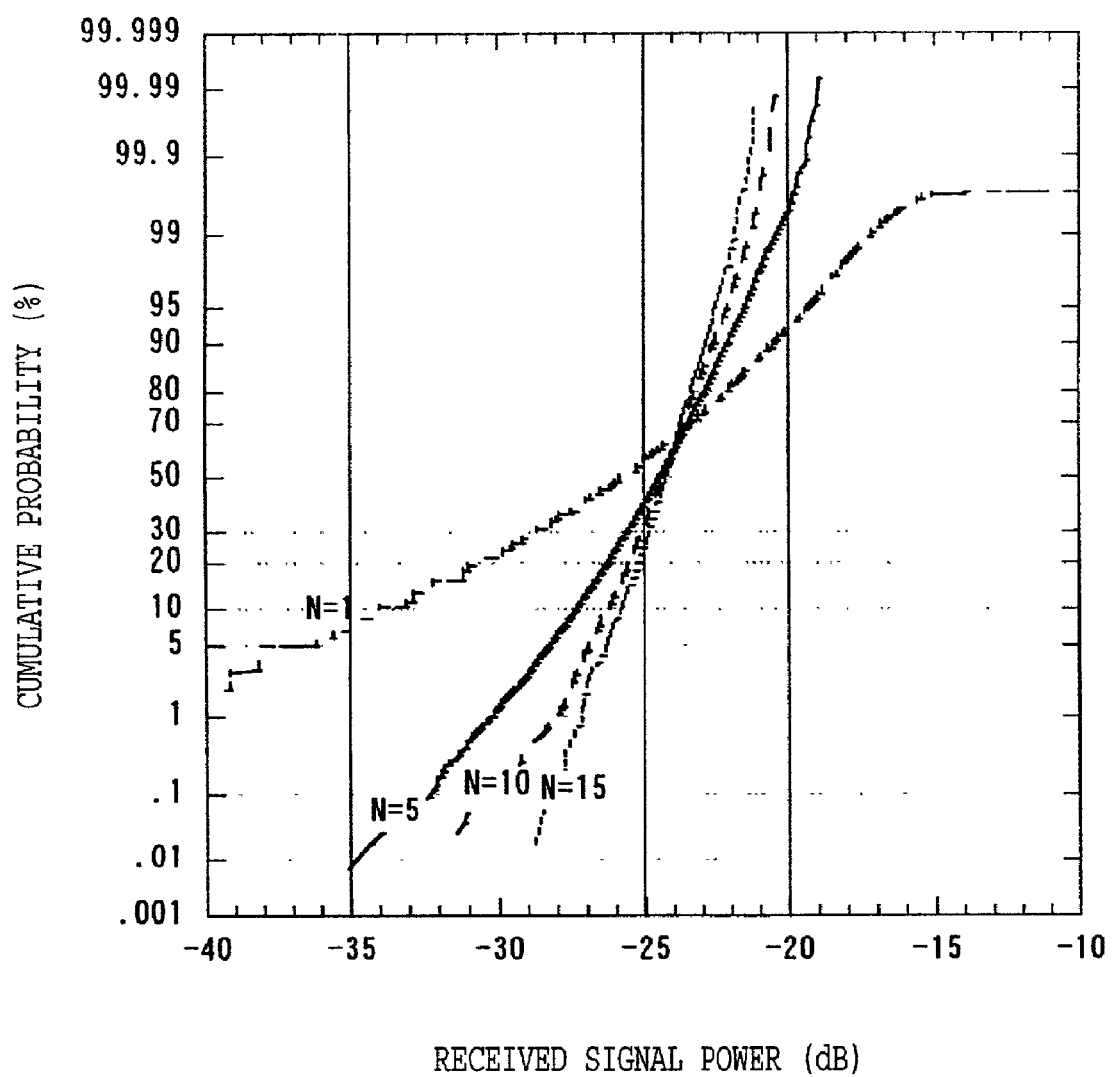
FIG. 8 is an illustration showing a received signal power distribution after power averaging process as the equalizing process.

FIG. 8 shows a received signal power distribution after performing power averaging process as the equalizing process. After detection of partial correlation for a certain scrambling code at 256 chip length and averaging power in sample number 5, 10 and 15, FIG. 8 shows a distribution of the power value of the received signal at a timing other than true synchronization chip timing. However, fading is not added. As can be appreciated from FIG. 8, when the sample number N is increased, the standard deviation of the power value of the received signal in the true synchronization chip timing becomes smaller. As a result, probability of success of detection of synchronization becomes high.

Figure 9:
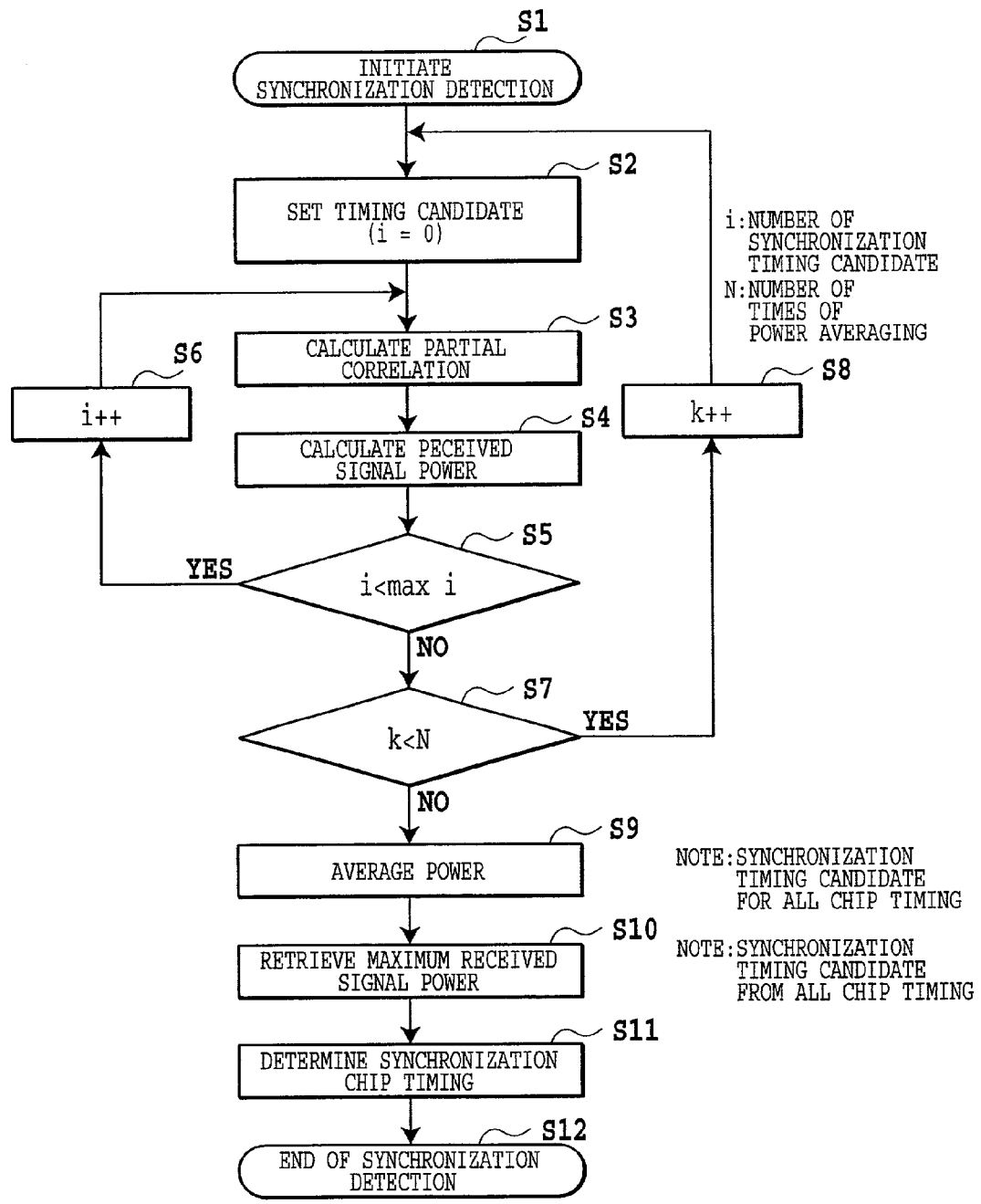
FIG. 9 is a flowchart showing a synchronization chip timing detection procedure by the power averaging process.

FIG. 9 shows a synchronization chip timing detection procedure in the power averaging process. At step S1, synchronization detection is initiated. At step S2, synchronization timing candidate is set (i=0). At step S3, partial correlation calculation is performed. At step S4, received signal power is calculated. At step S5, check is performed whether i<max i is satisfied or not. At step S6, i is incremented. At step S7, check is performed whether k<N is satisfied or not. At step S8, k is incremented. At step S9, power averaging is performed at all synchronization timing candidate or all chip timing. At step S10, retrieval of the maximum power of the received signal is performed for all synchronization timing candidate or all chip timing. At step S11, the synchronization chip timing is determined. At step S12, synchronization detection is terminated.

Figure 10:
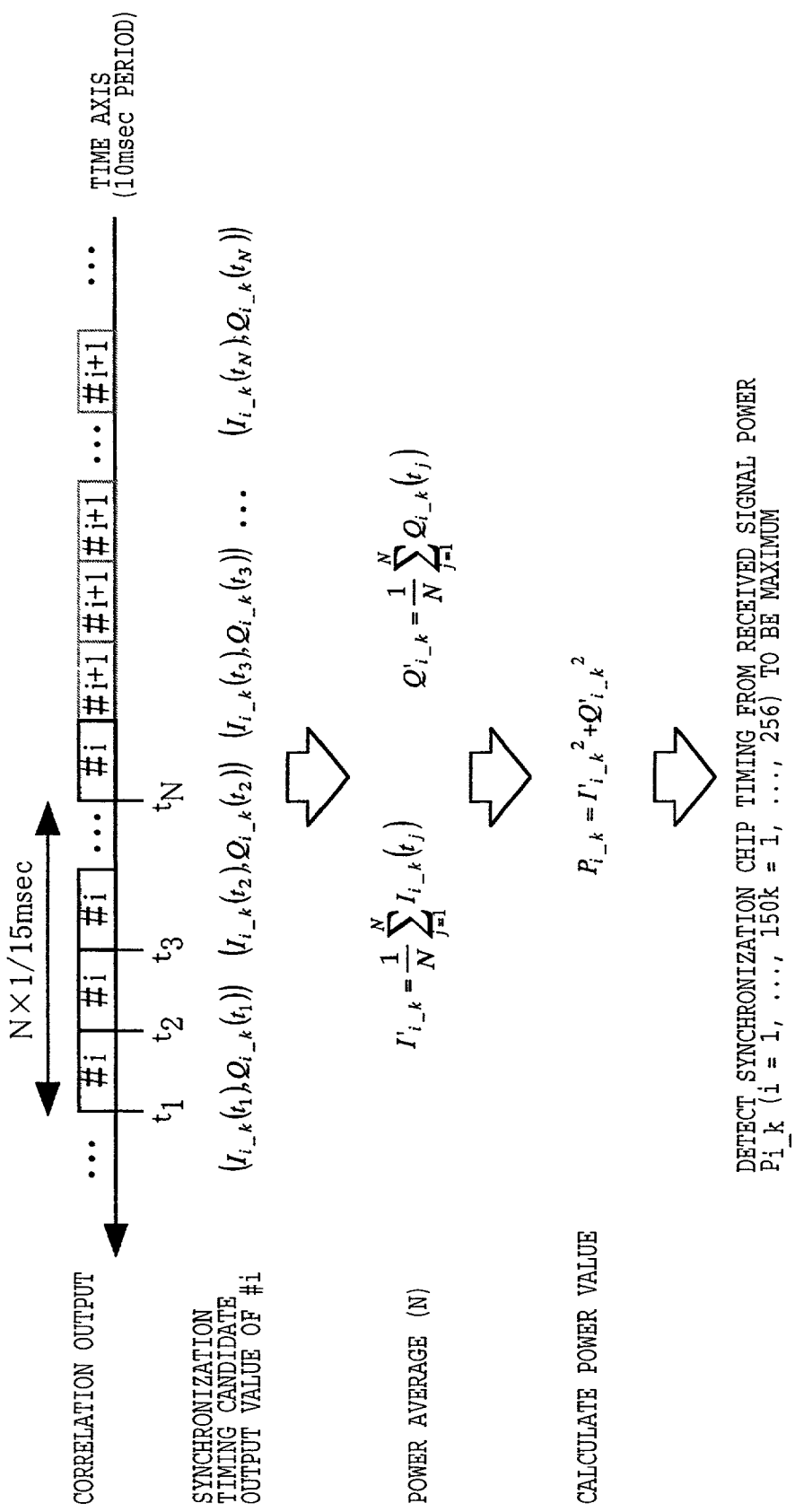
FIG. 10 is an illustration of the case where vector averaging process is performed as equalizing process in the second embodiment of the synchronization detecting method.

FIG. 10 shows the case where the vector averaging process as the equalizing process in the second embodiment of the synchronization detection method. In the vector averaging process, the received signal vector of each synchronization timing candidate is averaged respectively on I side and Q side (N in number). Subsequently, the received signal power is calculated from the values of I and Q after averaging, the synchronization chip of the channel to be measures is determined. Since the vector averaging process is premised in that the phase rotation of the desired signal vector due to fading in the averaging period can be ignored, in the example shown in FIG. 10, a sampling interval per one synchronization timing candidate is set at $1/15$ msec.

In the foregoing vector averaging process, by increasing number of samples to be averaged, the average value of the power of the received signal other than the true synchronization chip timing becomes small (standard deviation is unchanged).

Figure 11:
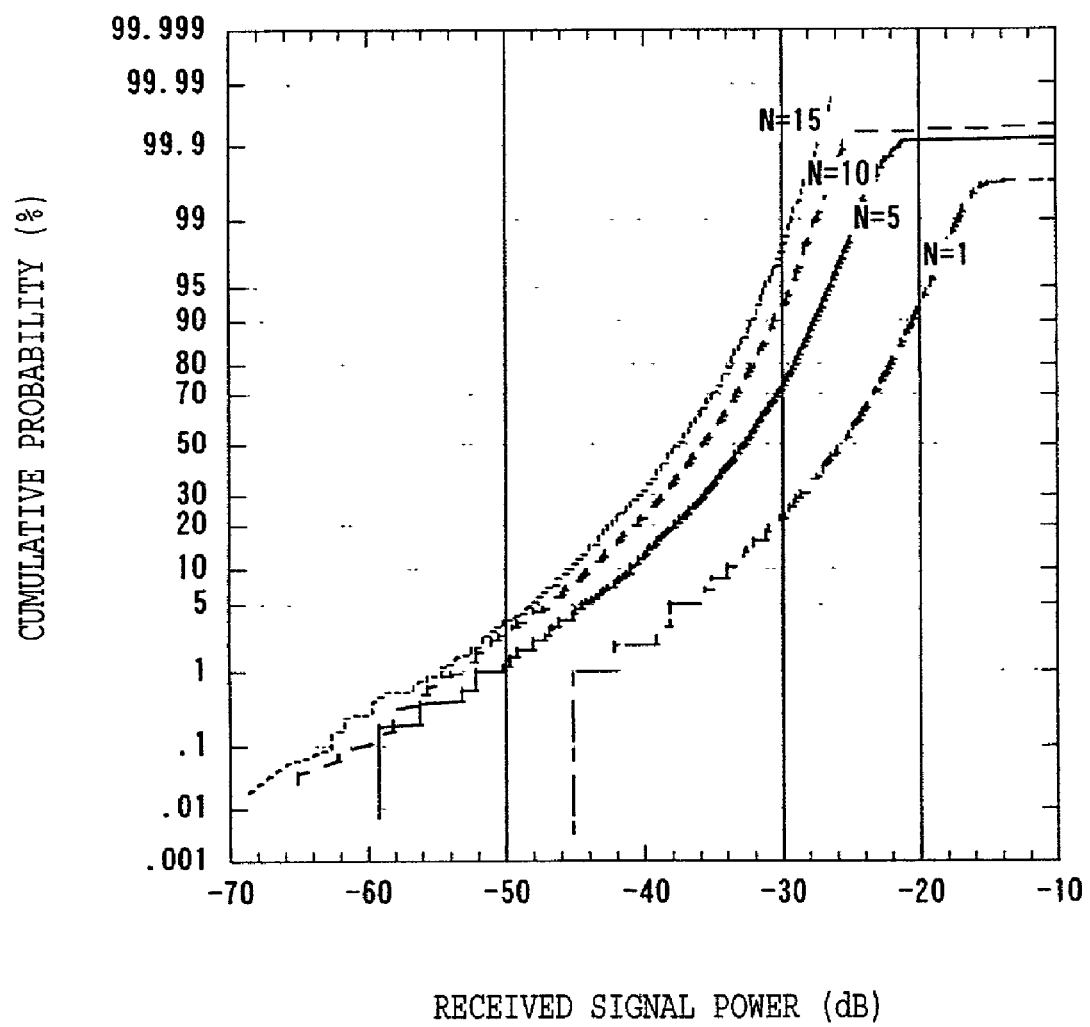
FIG. 11 is an illustration showing a distribution after performing vector averaging process as equalizing process.

FIG. 11 shows a received signal power distribution after performing vector averaging process as the equalizing process. After detection of partial correlation for a certain scrambling code at 256 chip length and averaging power in sample number 5, 10 and 15, FIG. 11 shows a distribution of the power value of the received signal at a timing other than true synchronization chip timing. However, fading is not added. As can be appreciated from FIG. 11, when the sample number N is increased, the average value of the power of the received signal in the true synchronization chip timing becomes smaller. As a result, probability of success of detection of synchronization becomes high.

Figure 12:
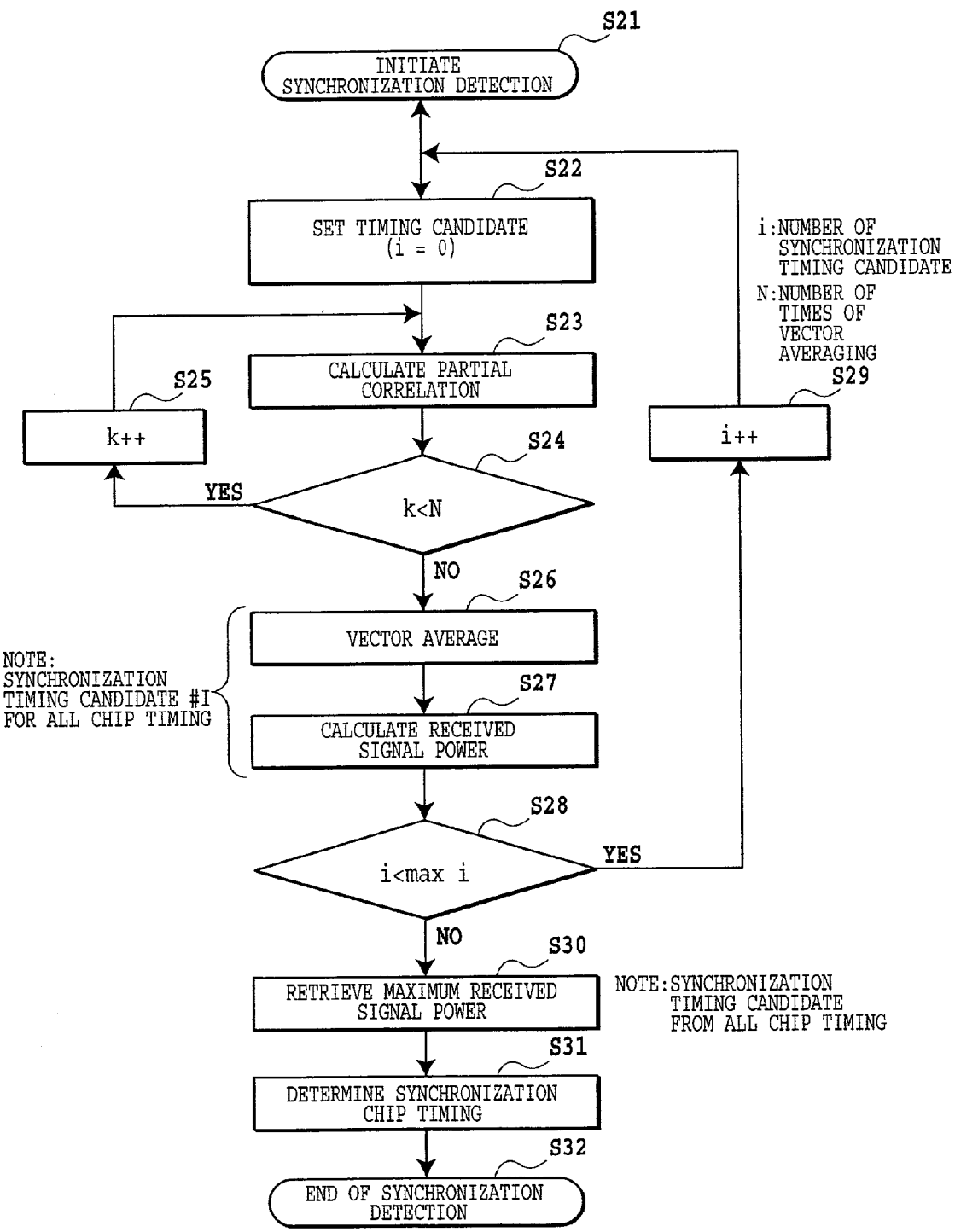
FIG. 12 is a flowchart showing a synchronization chip timing detection procedure by the vector averaging process.

FIG. 12 shows a synchronization chip timing detection procedure in the vector averaging process. At step S21, synchronization detection is initiated. At step S22, synchronization timing candidate is set (i=0). At step S23, partial correlation calculation is performed. At step S24, check is performed whether k<N is satisfied or not. At step S25, k is incremented. At step S6, vector average is derived for all chip timing of synchronization timing candidate #i. At step S27, the power values are calculated for all chip timing of the synchronization timing candidate #i. At step S28, check is performed whether i<max i is satisfied or not. At step S29, i is incremented. At step S30, retrieval of the maximum power of the received signal is performed for all synchronization timing candidate or all chip timing. At step S31, the synchronization chip timing is determined. At step S32, synchronization detection is terminated.

Figure 13:
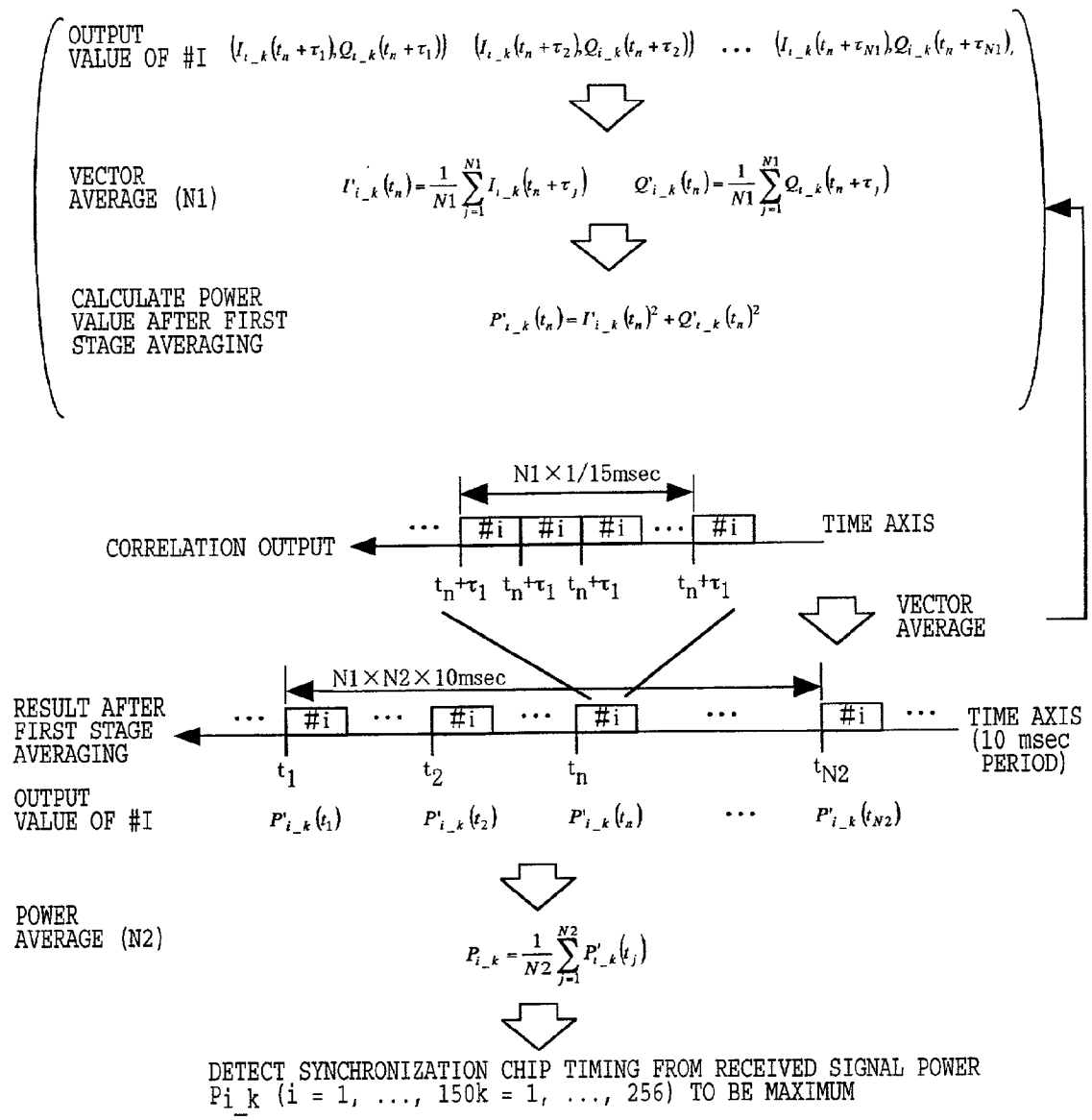
FIG. 13 is an illustration showing a principle of operation of the third embodiment of a synchronization detecting method according to the present invention.

FIG. 13 shows a principle of operation of the third embodiment of the synchronization detection method according to the present invention. The third embodiment of the synchronization detection method is further improvement of the second embodiment set forth above. Namely, process of equalizing process can be set for a plurality of times. Even in each process, using the average value obtained by averaging for a plurality of times by the same or different averaging method, the synchronization chip timing of the channel to be measures is determined.

In the third embodiment, averaging operation is repeated twice. At the first stage of averaging, N1 in number of vector averaging process is performed per synchronization timing candidate. Subsequently, the power value is derived from the received signal vector after vector averaging for deriving N2 in number of averaged values. At the second stage, the chip timing where the received signal power after averaging becomes maximum, is detected to the synchronization chip timing of the channel to be measured.

In the third embodiment, at first, in the first stage averaging, the average value of the received signal power in the synchronization chip timing other than the true synchronization chip timing becomes small for N1 in number of samples. Subsequently, by averaging in the second stage, the standard deviation becomes smaller than N2 in number of samples. As a result, probability of success in detection of synchronization becomes further higher in comparison with the case of one time of averaging operation. In the third embodiment, a period required for synchronization detection is (N1×N2×10) msec.

Figure 14:
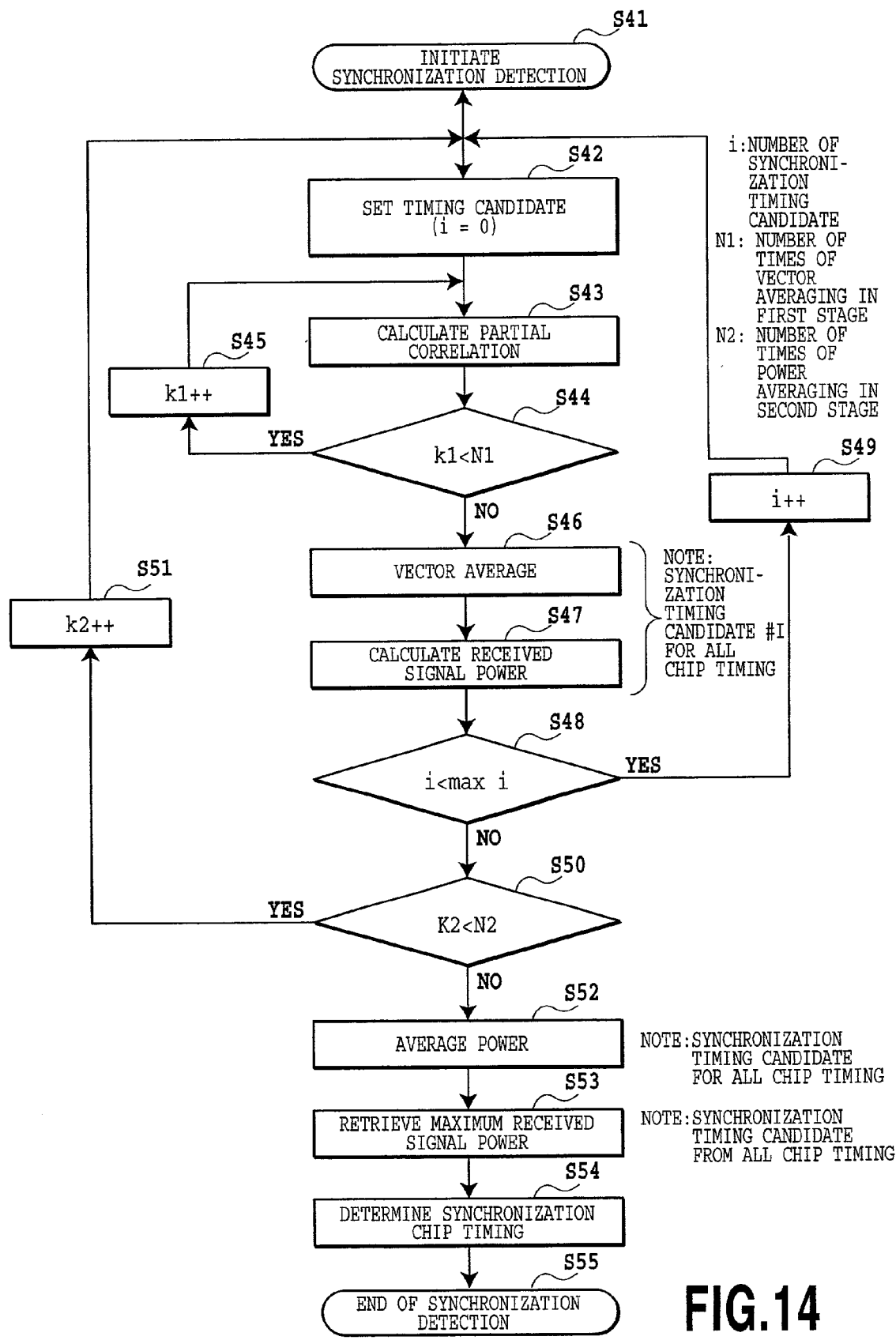
FIG. 14 is a flowchart showing a synchronization chip timing detection procedure in the third embodiment of the synchronization detecting method.

FIG. 14 shows a synchronization chip timing detection procedure in the third embodiment of synchronization detection method. At step S41, synchronization detection is initiated. At step S42, synchronization timing candidate is set (i=0). At step S43, partial correlation calculation is performed. At step S44, check is performed whether k1<N1 is satisfied or not. At step S45, k1 is incremented. At step S46, vector average is derived for all chip timing of synchronization timing candidate #i. At step S47, the power values are calculated for all chip timing of the synchronization timing candidate #i. At step S48, check is performed whether i<max i is satisfied or not. At step S49, i is incremented. At step S50, check is performed whether k2<N2 is satisfied or not. At step S51, k2 is incremented. At step S52, power averaging is performed at all synchronization timing candidate or all chip timing. At step S53, retrieval of the maximum power of the received signal is performed for all synchronization timing candidate or all chip timing. At step S54, the synchronization chip timing is determined. is At step S55, synchronization detection is terminated.

Furthermore, the fourth embodiment of the synchronization detection method will be explained. The fourth embodiment determines the synchronization chip timing of the channel to be measured by performing synchronization chip timing detection process in the foregoing first to third embodiments for a plurality of times and using the averaged value of a plurality of synchronization chip timing values and the standard deviation value. Therefore, in the fourth embodiment, check is performed whether the detected synchronization chip timing is reasonable or not.

Figure 15:
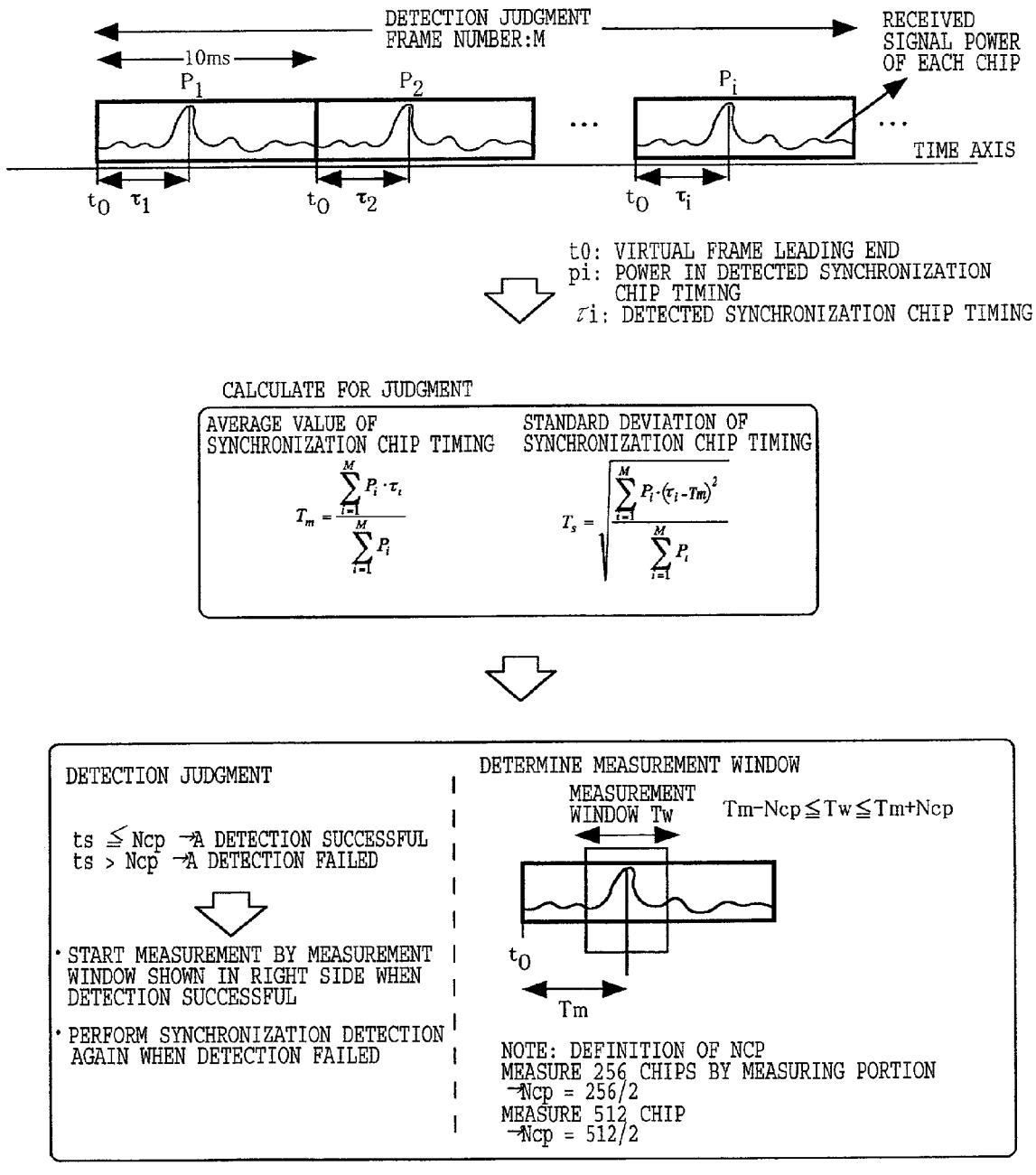
FIG. 15 is an illustration showing a principle of operation of the fourth embodiment of a synchronization detecting method according to the present invention.

FIG. 15 shows a principle of operation of the fourth embodiment of the synchronization detection method according to the present invention. M in number of synchronization chip timings detected after averaging are prepared. Then, the synchronization chip timing as object for measurement is checked. It should be noted that, in the fourth embodiment, complete synchronization detection is not required and it is only required to have a value falling within certain range (measurement window).

The fourth embodiment is premised in that measurement of all chip timing in measurement window is performed after synchronization detection. At first, an averaged value of M in number of detected synchronization chip timings. Subsequently, using the average value thus derived, the standard deviation is derived. As an averaged value derived centered at the measurement window, the value of the derived standard deviation falls within the measurement window width, measurement becomes possible to take the detection successful. On the other hand, when the derived standard deviation does not fall within the measurement window, judgment is made that probability of failure of detection is high to again initiate synchronization detection.

Next, explanation will be given for the synchronization detection method in the case where transmit diversity is applied in CPICH.

FIG. 16 shows the frame structure of CPICH and the received signal in the case where the transmit diversity is applied. α1 is a vector variation amount depending upon propagation path from the transmission antenna #1 of the base station to the mobile station, α2 is a vector variation amount depending upon propagation path from the transmission antenna #2 of the base station to the mobile station. These are varied from time to time according to movement of place of the mobile station. On the other hand, the signal transmitted from each antenna of the base station is provided modulation of A or -A per symbol. This pattern is determined uniquely. It should be noted that symbol modulation pattern when the transmit diversity is not applied, is the same as that of the antenna #1.

CPICH transmitted from the antenna #1 and the antenna #2 are influenced by each propagation path. In the mobile station, the signals in combined form are received. Accordingly, the signal of symbol #0 transmitted from the base station is received in the mobile receiving station as expressed by the following equation:

$$R(0) = \sqrt{P_{t1}}\, \alpha_1(0) \cdot A + \sqrt{P_{t2}}\, \alpha_2(0) \cdot A + N(0) \quad (1)$$

wherein $R(0)$ is the received signal vector after correlation detection, $P_{t1}$ and $P_{t2}$ are transmitting power of CPICH in respective transmission antennas, $N(0)$ is interference signal vector.

The synchronization detection is detection of the position of symbol #0 in the mobile receiving station. It should be noted that communication quality measurement upon use of transmit diversity which will be discussed later, is derivation of the desired signal power as expressed by:

$$<P_{t1}|\alpha_1|^2 + P_{t2}|\alpha_2|^2> \quad (2)$$

and the interference power as expressed by:

$$<|N|^2> \quad (3)$$

wherein $< >$ expresses an average.

Next, the received signal vector combined as expressed by the foregoing expression (1) will be separated into the received signal vector from each transmission antenna. For separation, two continuous symbols are used. Assuming (i)th symbol (wherein i is even number) as a symbol to be a reference, the received signal vector $r_1$ and $r_2$ from each antenna is expressed by:

$$r_1(i) = \frac{R(i+1) + R(i)}{2A} \approx \sqrt{P_{t1}}\, \alpha_1(i) + \frac{N(i+1) + N(i)}{2A} \quad (4)$$

$$r_2(i) = (-1)^{i/2+1}\frac{R(i+1) - R(i)}{2A} \approx \sqrt{P_{t2}}\, \alpha_2(i) +$$

$$(-1)^{i/2+1}\frac{N(i+1) - N(i)}{2A}$$

The foregoing equation (4) use approximations of $\alpha_1(i+1) \approx \alpha_1(i)$ and $\alpha_2(i+1) \approx \alpha_2(i)$.

Figure 17:
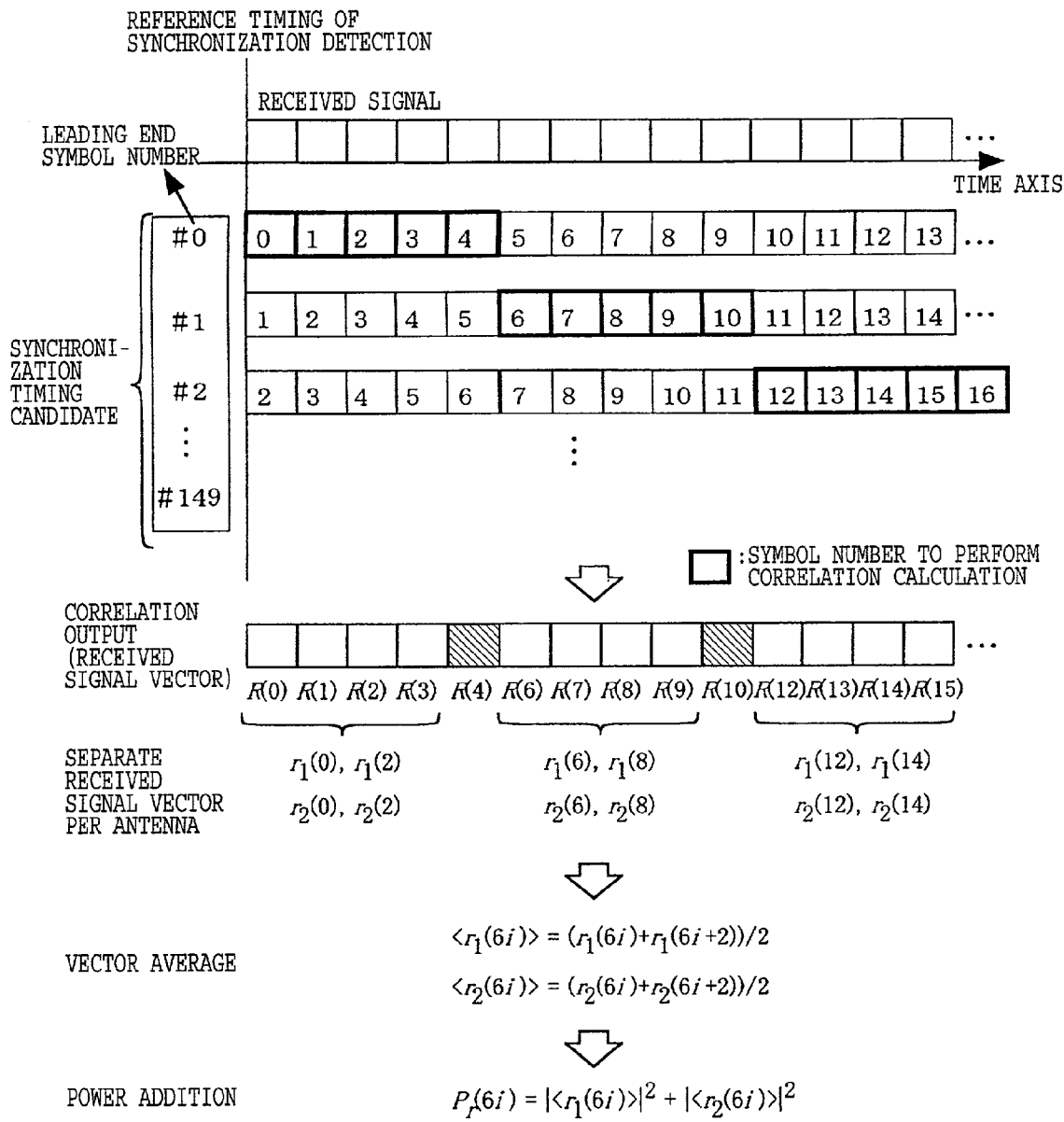
FIG. 17 is an illustration showing a principle of operation of the fifth embodiment of a synchronization detecting method according to the present invention.

FIG. 17 shows a principle of operation of the fourth embodiment of the synchronization detection method according to the present invention. The synchronization detection detects leading position (synchronization chip timing) of CPICH from the received signal. #0 to #149 in FIG. 17 are synchronization timing candidates generated by the synchronization timing candidate generating portion 2210 shown in FIG. 2. It should be noted that unit for blocking is one symbol. Calculation of correlation with the received signal is performed by sequentially extracting objective symbol number among the synchronization timing candidates #0 to #149 and using spreading code (256 chip length) corresponding to the symbol number.

For example, assuming an average number of vector is $N_1$, from the synchronization timing candidate #i, $2N_1+1$ in number of symbols in series from $2(N_1+1)i$ is selected for correlation calculation. When matched filter is used in correlation calculation, a timing to finish correlation calculation for all of the synchronization timing candidates is $T_1=10\times(2N_1+1)$ [ms].

Next, from the obtained received signal vector $R(i)$ and $R(i+1)$, the received signal vector from each transmission antenna is separated using the foregoing equation (4). Here, number of received signal vectors after separation belonging in the same synchronization timing candidates is $N_1$ in number per one transmission antenna. These $N_1$ in number of received signal vectors averaged per transmission antenna, and finally, obtained two average vectors are summed in power. FIG. 17 shows the case where the number of vector average $N_1$ is 2. In practice, the foregoing calculation is performed for all of 256 chips. On the other hand, the foregoing calculation is executed with over-sampling of X times of one symbol, calculation is performed for number of samples of 256×X. The synchronization chip timing is determined by synchronization timing candidate having the maximum power value and the chip number in the symbol.

Figure 18:
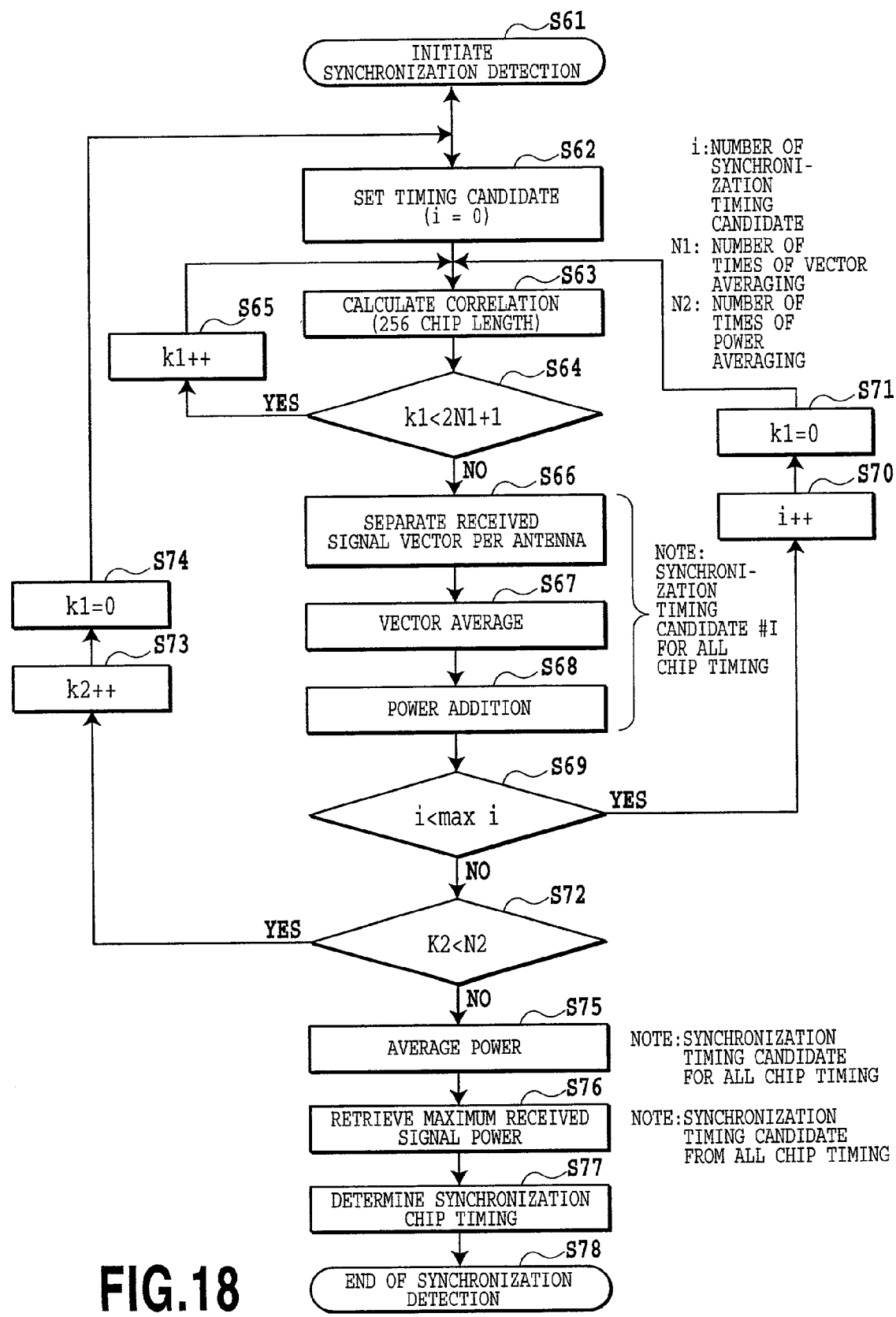
FIG. 18 is a flowchart showing a synchronization chip timing detection procedure in the sixth embodiment of the synchronization detecting method.

FIG. 18 shows the synchronization chip timing detection procedure in the sixth embodiment of the synchronization detection method. In the shown embodiment, except for the period required for calculation, a period from initiation of synchronization detection to finishing thereof is $T_1=10\times(2N_1+1)\times N_2$ [ms].

At step S61, synchronization detection is initiated. At step S62, synchronization timing candidate is set (i=0). At step S63, partial correlation calculation is performed. At step S64, check is performed whether k1<2N1+1 is satisfied or not. At step S65, k1 is incremented. At step S66, received signal vector is separated per antenna with respect to all chip timings of the synchronization timing candidates. At step S67, vector averages of the received signal vectors are derived. At step S68, the averaged received signal vector is converted into the power value per antenna and then the power values of respective antennas are summed.

At step S69, check is performed whether i<max i is satisfied or not. At step S70, i is incremented. At step S71, k1 is reset to 0. At step S72, check is performed whether k2<N2 is satisfied or not. At step S73, k2 is incremented. At step S74, k1 is reset to 0. At step S75, power averaging is performed at all synchronization timing candidates or all chip timing. At step S76, retrieval of the maximum power of the received signal is performed for all synchronization timing candidates or all chip timing. At step S77, the synchronization chip timing is determined. At step S78, synchronization detection is terminated.

(2) Communication Quality Measuring Method

Figure 19:
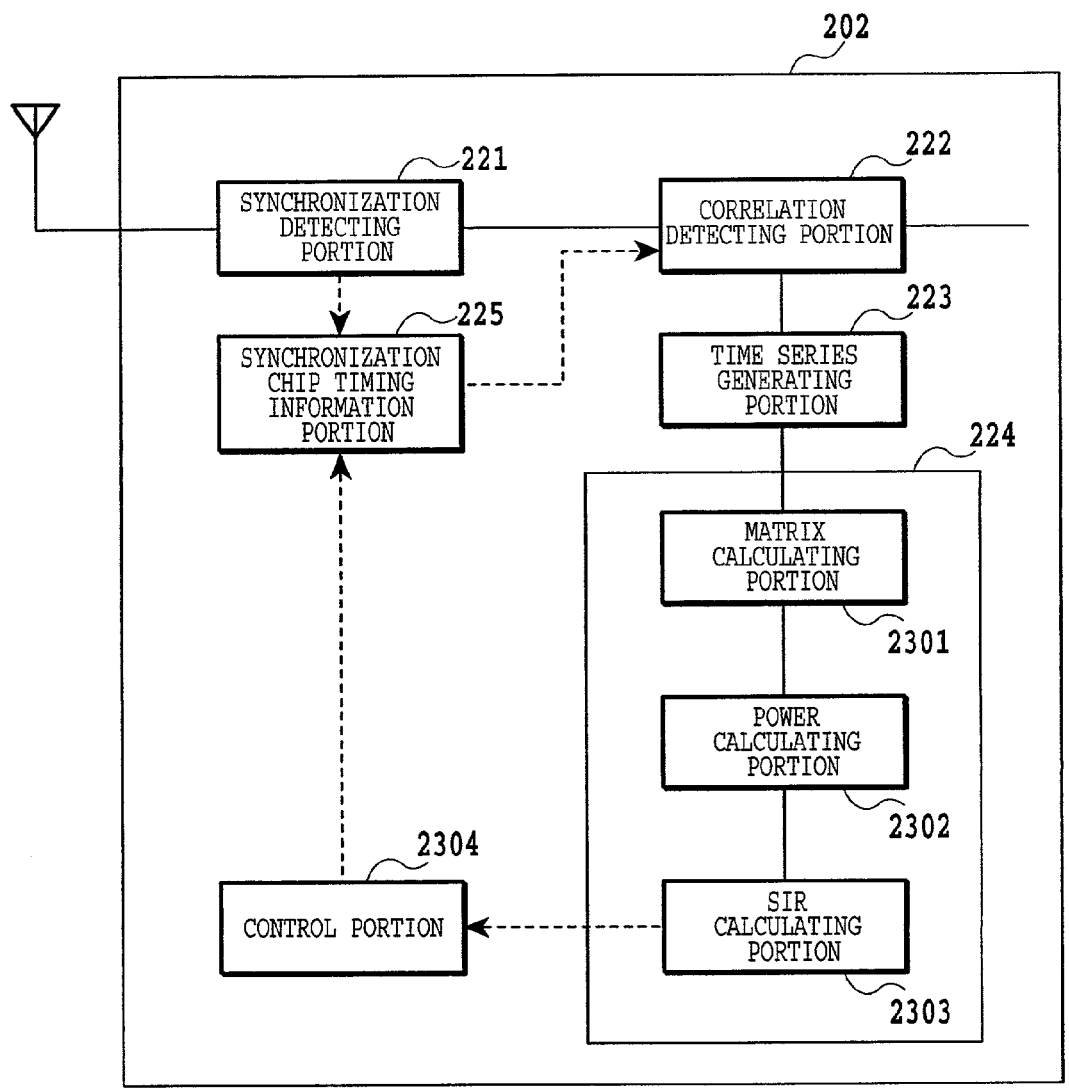
FIG. 19 is a block diagram showing an overall construction of the mobile station, to which the present invention is applied.

Next, the measurement method of communication quality will be explained. FIG. 19 shows overall construction of the mobile station, to which the present invention is applied. The mobile station 202 has the same construction as that of FIG. 2. The communication quality calculating portion 224 includes matrix calculation means 2301 for deriving covariant matrix from two time series data in the received signal vector generated in the time series generating portion 223 and performing calculation of eigenvalues, power calculating means 2302 for calculating the desired signal power and the interference signal value using the eigenvalues, and SIR calculating means for deriving SIR.

On the other hand, using a control portion 2304 as component of the mobile communication system, a path between transmitter and receiver effective for communication is derived using the SIR value derived in the SIR calculation means to control the synchronization chip timing information portion 225 for achieving measurement of more precise value.

In the shown embodiment, with reference to the synchronization chip timing obtained in the synchronization detecting portion, all chip timings in a certain range are taken as object for measurement. Namely, communication quality measurement using the measurement window is performed.

Figure 20:
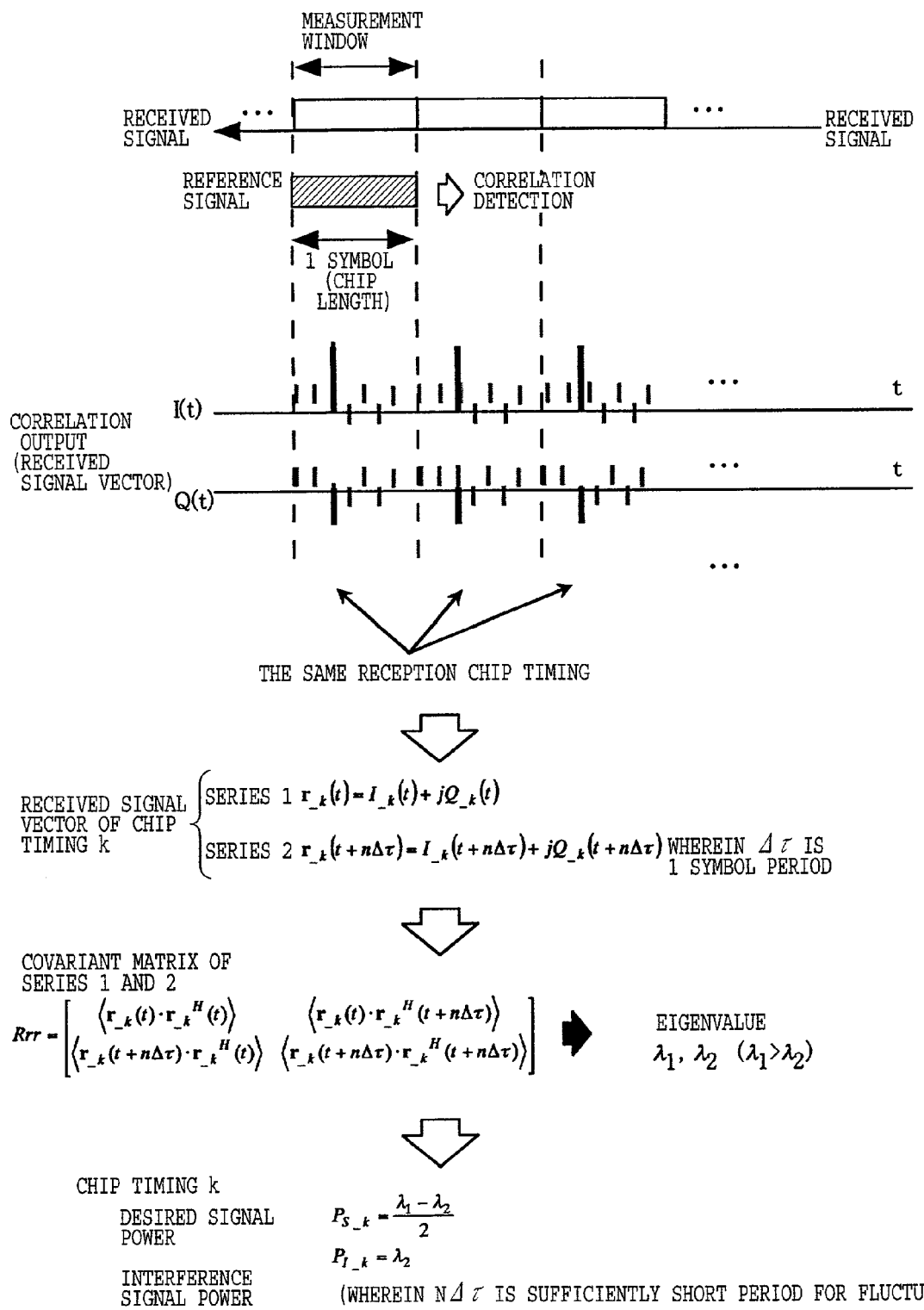
FIG. 20 is an illustration showing a principle of operation of the first embodiment of a communication quality measuring method according to the present invention.

FIG. 20 shows a principle of operation of the first embodiment of the communication quality measuring method according to the present invention, a chip length to perform correlation detection and the measurement window width is taken as one symbol. Here, consideration is given for chip timing k presenting in the measurement window. In order to derive the desired signal power and the interference signal power in the chip timing k, a series 1 is established by arranging the received signal vector of the chip timing 1 in a certain given period (averaged period, and a series 2 is established by a time series data of the received signal vector distanced from the series 2 for several symbols.

Next, covariant matrix of the series 1 and the series 2 is derived to calculate eigenvalues thereof. By performing operation shown in FIG. 20 using the eigenvalues thus derived, the desired signal power and the interference signal power at the chip timing k can be derived as averaged values within the averaging period. It should be noted that the operation for deriving the powers from the eigenvalues shown in FIG. 20 is effective only when correlation between two series is relatively high. In other words, the foregoing operation is only effective when the time difference between two series is sufficiently small relative to a variation of the desired signal vector due to multi-path fading. In the shown embodiment, there is no limitation in sampling interval (data interval in one series) and number of samples (number of data in one series).

It should be noted that greater number of samples within the averaging period results is closer value to the true value. On the other hand, SIR in the chip timing k can be derived from a ratio of the obtained desired signal power and the interference signal power. On the other hand, in case of communication quality measurement not using the measurement window, the synchronization chip timing obtained by the synchronization detecting portion may be measured as the chip timing k.

Figure 21:
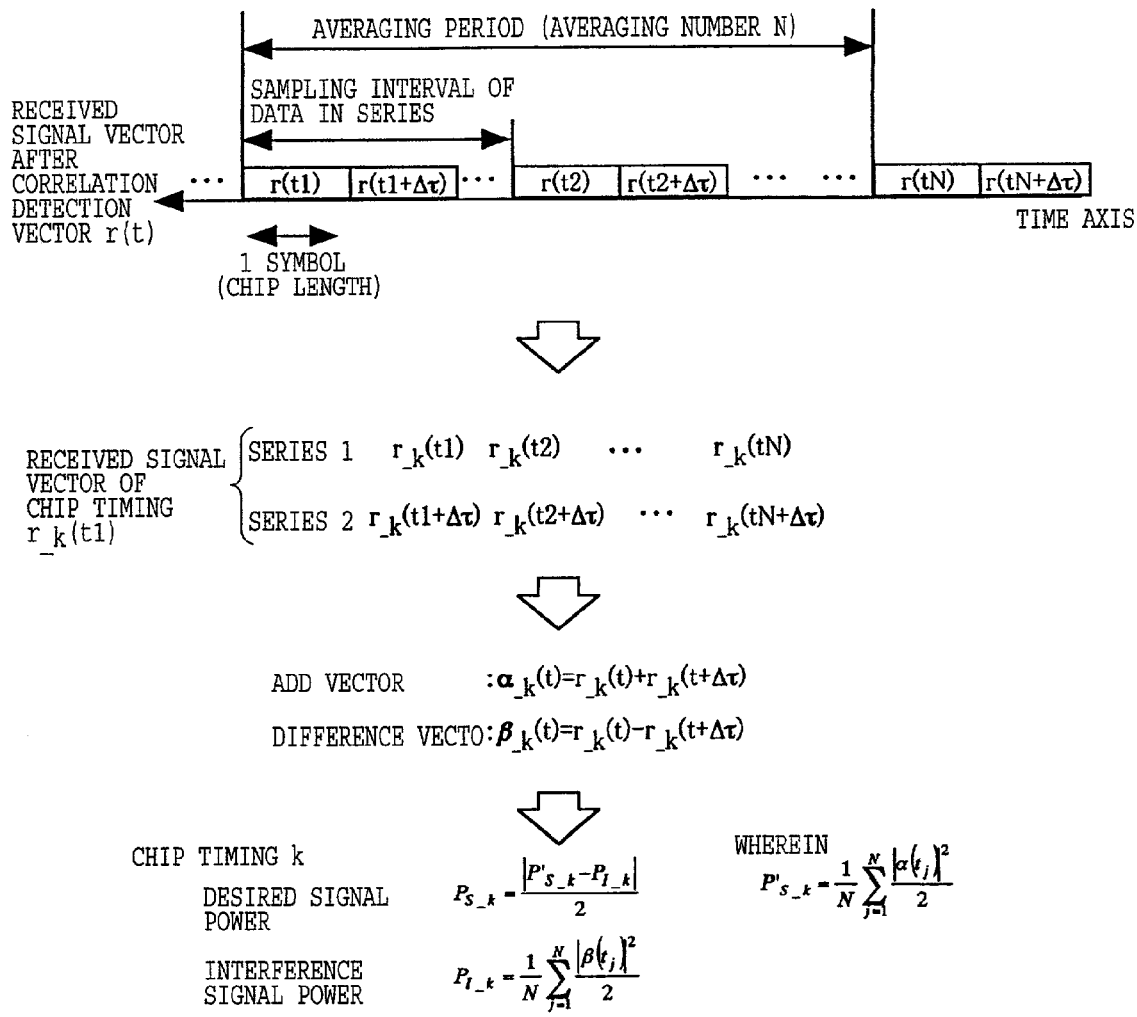
FIG. 21 is an illustration showing a principle of operation of the second embodiment of a communication quality measuring method according to the present invention.

FIG. 21 shows a principle of operation of the second embodiment of the communication quality measurement method according to the present invention. When correlation between two series, namely when the correlation value is greater than or equal to 0.85, the desired signal power and the interference signal power can be derived from an add vector and difference vector relative to the received signal vectors having reception timing close to each other between time series. More preferably, at the correlation value greater than or equal to 0.9, the desired signal power and the interference signal value are derived at comparable precision as the first embodiment of FIG. 20. Further preferably, at the correlation value greater than or equal to 0.95, the desired signal power and the interference signal value are derived at comparable precision as the first embodiment of FIG. 20 and with more simple calculation method.

In the shown embodiment, a time difference between time series (delay time difference) as one symbol, the add vector and difference vector are derived from the received signal vector between adjacent symbols. At first, using N in number of difference vector within the averaging period, the interference signal power is derived by operation shown in FIG. 21. Next, the desired signal power is derived using N in number of add vectors within the averaging period and already derived interference signal power. From a ratio of the derived desired signal power and the interference signal power, SIR in the averaging period can be derived. Even in the shown embodiment, similarly to the first embodiment shown in FIG. 20, there is basically no limitation for the sampling interval and the sampling number.

In the shown embodiment, in the time series generating portion 223 shown in FIG. 19, in addition to generation of two time series data of the received signal vector, generation of time series data of the add vector and difference vector is also performed. It should be noted that, in the shown embodiment, since the eigenvalues are not required, matrix operation shown in FIG. 19 becomes unnecessary.

Figure 22:
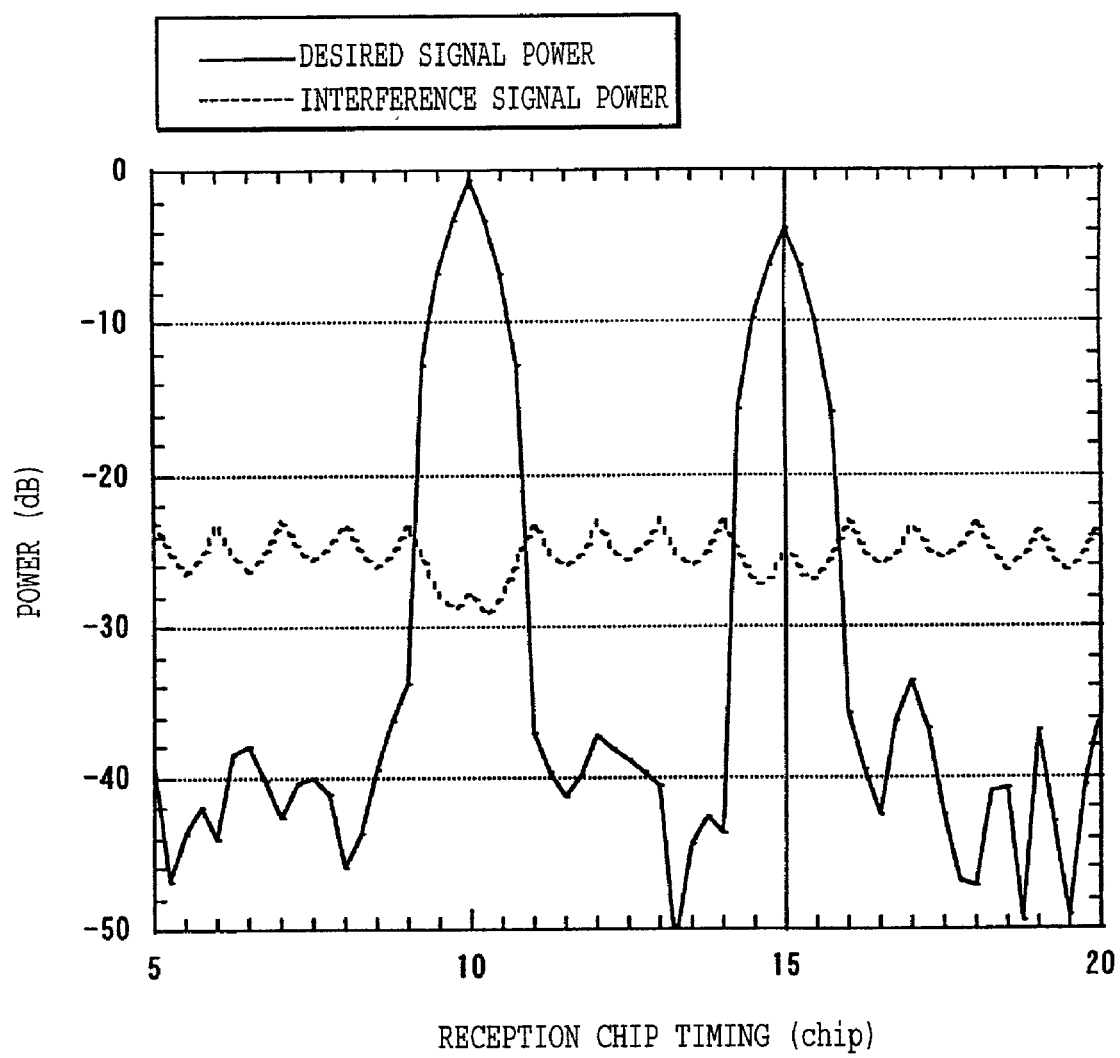
FIG. 22 is an illustration showing a result of simulation in the second embodiment of the communication quality measuring method.

FIG. 22 shows a result of simulation in the second embodiment of the communication quality measuring method. Namely, FIG. 22 shows examples of the result of output of the desired signal power and the interference signal within the measurement window derived by simulation. In the simulation, it is assumed that two signals, in which a certain code is spread, arrive with 5 chip delay. Namely, the position of the first path is tenth chip and the position of the second path is fifteenth chip. The signal arriving at the second path acts as interference signal in the first path and the signal arriving at the first path acts as interference signal in the second path. The averaging period is 1500 symbols and the sampling interval is 1 symbol. It should be noted that the power of the signal arriving at the second path is set to be 5 dB lower than the power of the signal arriving at the first path. The correlation detection is perform with four times over-sampling of 256 chip length.

Figure 23:
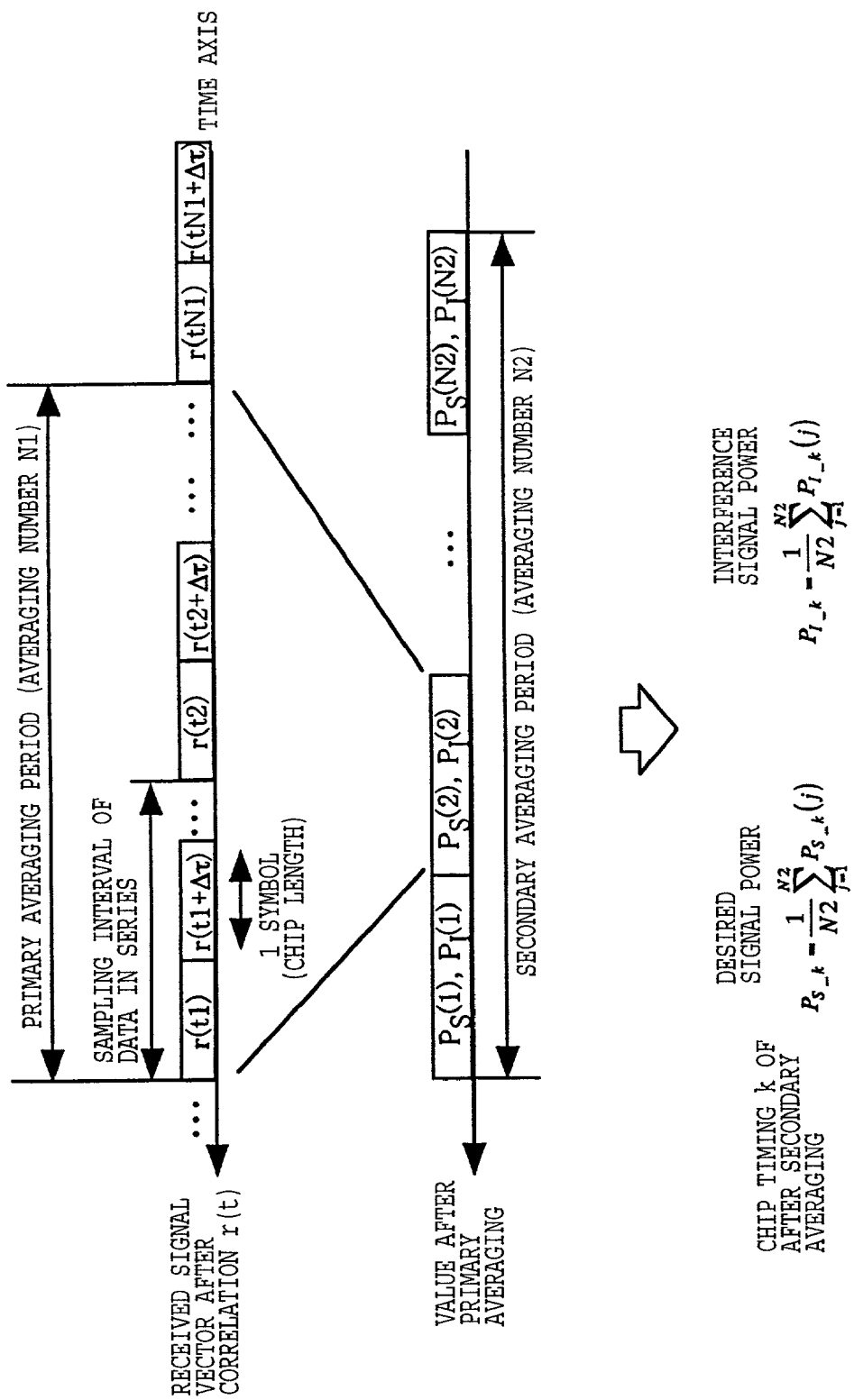
FIG. 23 is an illustration showing a principle of operation of the third embodiment of a communication quality measuring method according to the present invention.

FIG. 23 shows a principle of operation of the third embodiment of the communication quality measuring method according to the present invention. In the shown embodiment, by averaging the desired signal power and the interference signal power derived in the foregoing first and second embodiments, more stable value (average value) can be obtained. In the shown embodiment, at first, an average values of the desired signal power and the interference signal power are derived per N1 in number of chips in the average period using the methods in the first and second embodiments (primary averaging). Then, as secondary averaging, N2 in number of desired signal powers and the interference signal powers obtained by the primary averaging are averaged in power. It should be noted that SIR in the averaging period is derived from a ratio of the derived desired signal power and the interference signal power.

Figure 24:
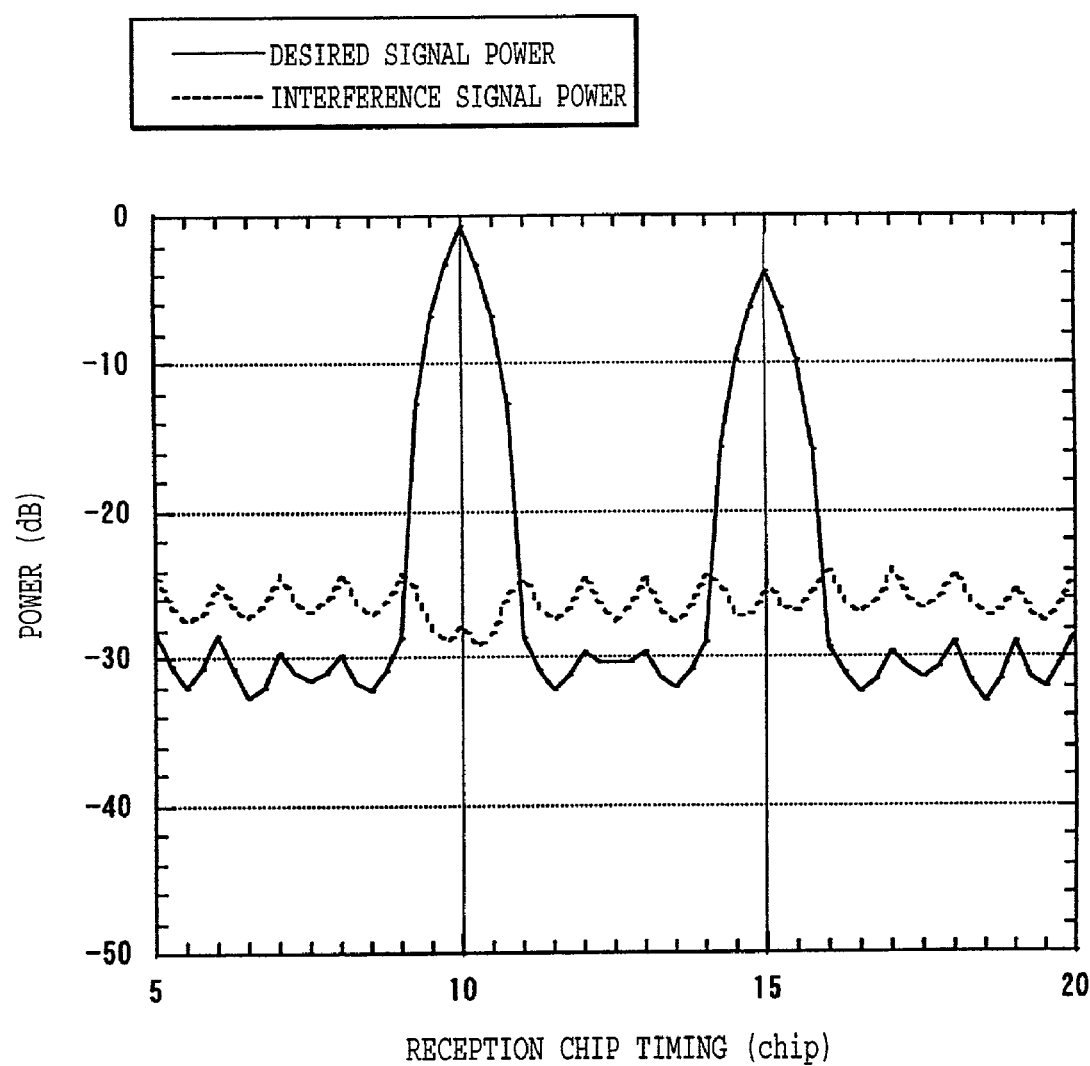
FIG. 24 is an illustration showing a result of simulation in the third embodiment of the communication quality measuring method.

FIG. 24 shows a result of simulation by the third embodiment of the communication quality measuring method. Condition of simulation is the same as those of FIG. 22 except for averaging method. Averaging sample number is 5 in the primary averaging and 300 in the second averaging. The averaging period in total is 1500 symbols. Comparing with the results shown in FIG. 22, it should be appreciated that more stable values can be obtained.

Figure 25:
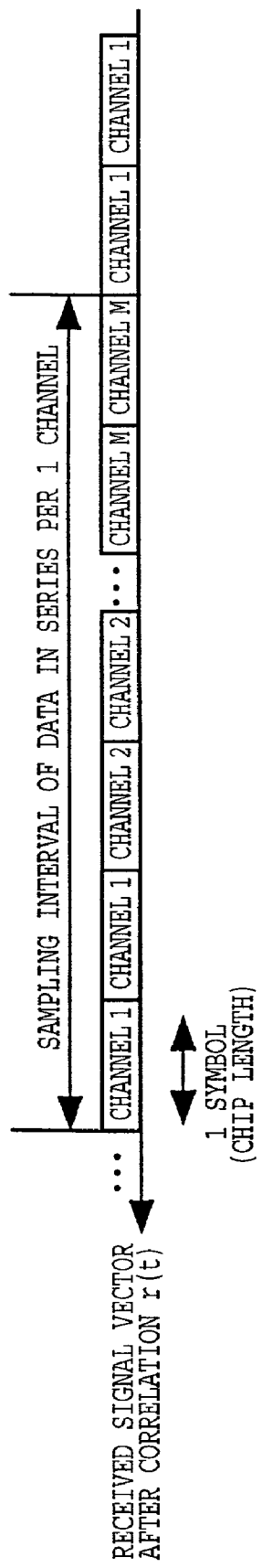
FIG. 25 is an illustration showing a principle of operation of the fourth embodiment of a communication quality measuring method according to the present invention.

FIG. 25 shows a principle of operation of the fourth embodiment of the communication quality measuring method according to the present invention. In the shown embodiment, number of channels to be measured is assumed to be M. The reason why the same channels are continuous for two symbols, is that two series data are required by the averaging methods in the first and second embodiments. As shown in FIG. 25, with taking two symbols as set, measurement of other channel within the sampling period becomes possible. In a certain given period, measurement data of a plurality of channels can be obtained at substantially the same. In the prior art using the vector averaging, since there is a limitation that "phase variation of the desired signal vector due to multi-path fading in the averaging period, should be ignorable." Therefore, when number of channels to be measured is large number and the averaging period is relatively long, time multiplexing of other channel within the sample period is difficult.

Figure 26:
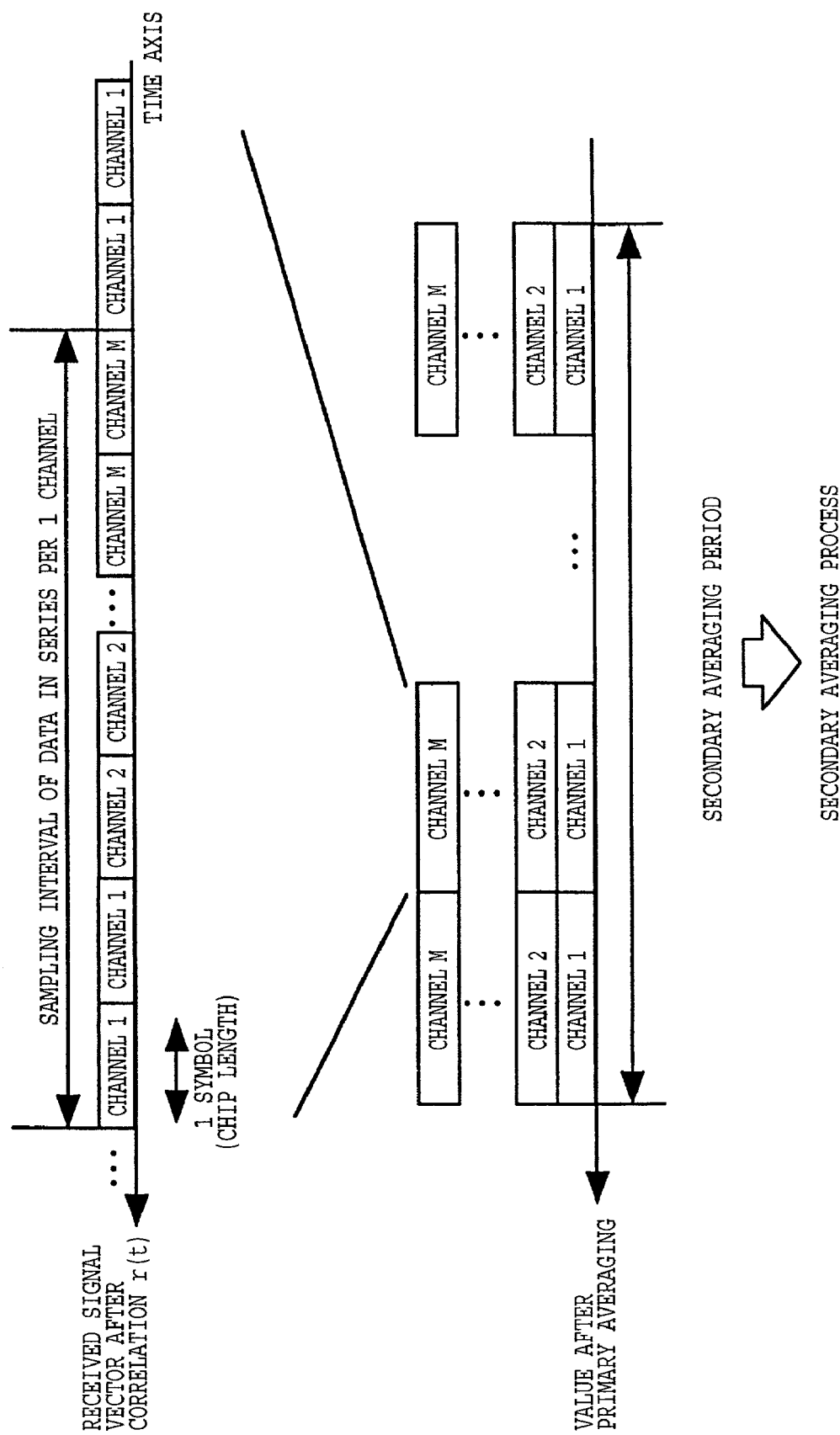
FIG. 26 is an illustration showing a principle of operation of the fifth embodiment of a communication quality measuring method according to the present invention.

FIG. 26 shows a principle of operation of the fifth embodiment of the communication quality measuring method according to the present invention. In the shown embodiment, primary average is derived by time multiplexing of other channels within sampling period of one channel. Then, secondary averaging (averaging in power) is performed from the result obtained by the primary averaging.

Figure 27:
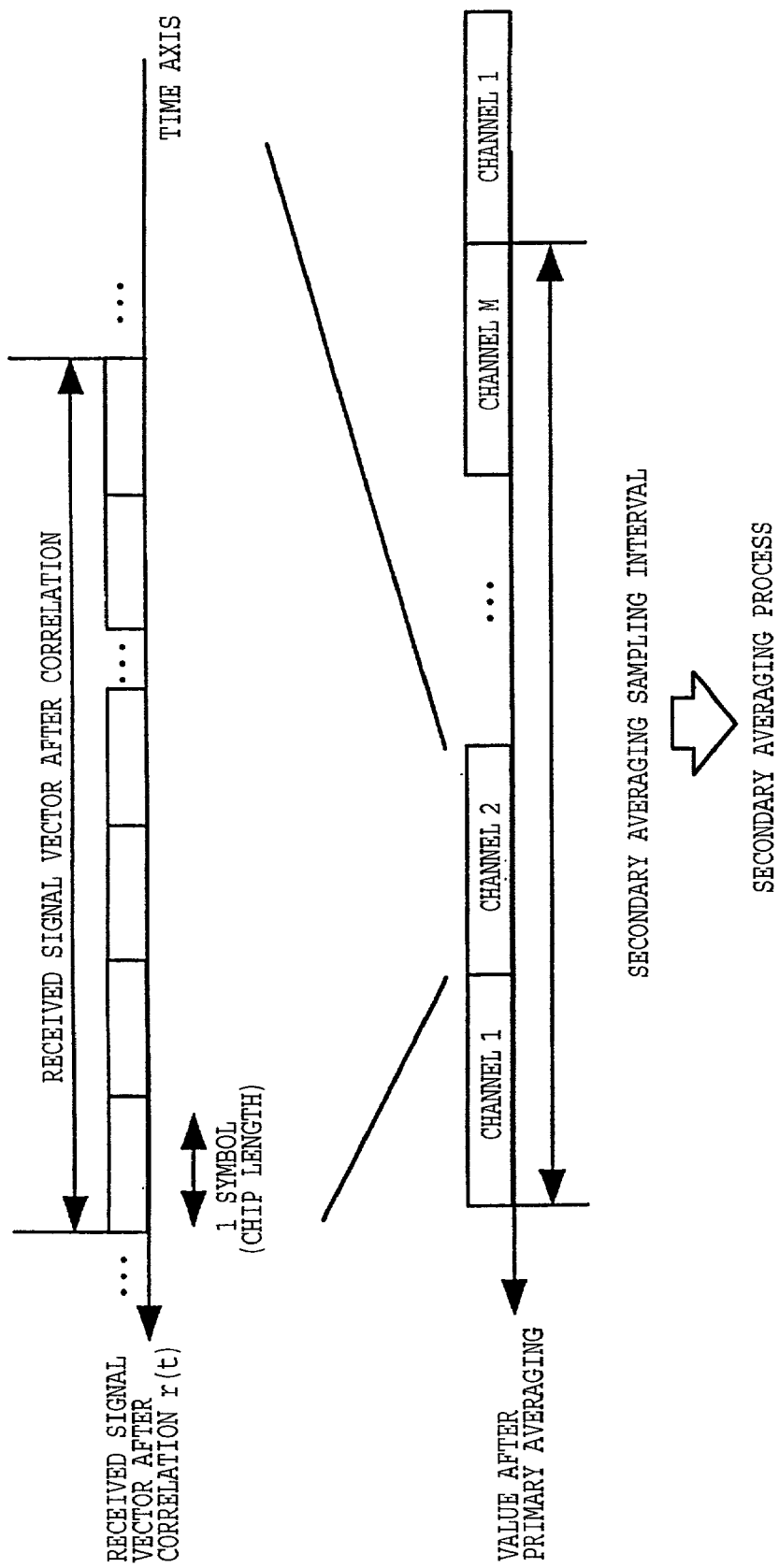
FIG. 27 is an illustration showing a principle of operation of the sixth embodiment of a communication quality measuring method according to the present invention.

FIG. 27 shows a principle of operation of the sixth embodiment of the communication quality measuring method according to the present invention. In the shown embodiment, at first, primary averaging is performed per one channel, and other channels are multiplexed in the secondary averaging period to obtain the values after secondary averaging of respective channels.

Figure 28A:
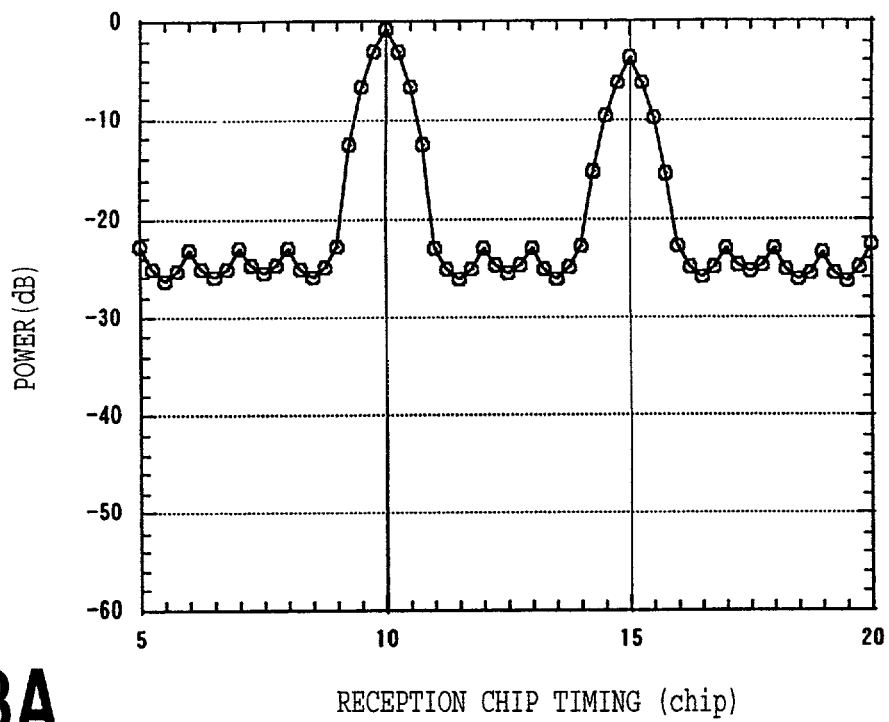
FIGS. 28A and 28B are illustrations showing a result of simulation in the fifth embodiment of the communication quality measuring method.
Figure 28B:
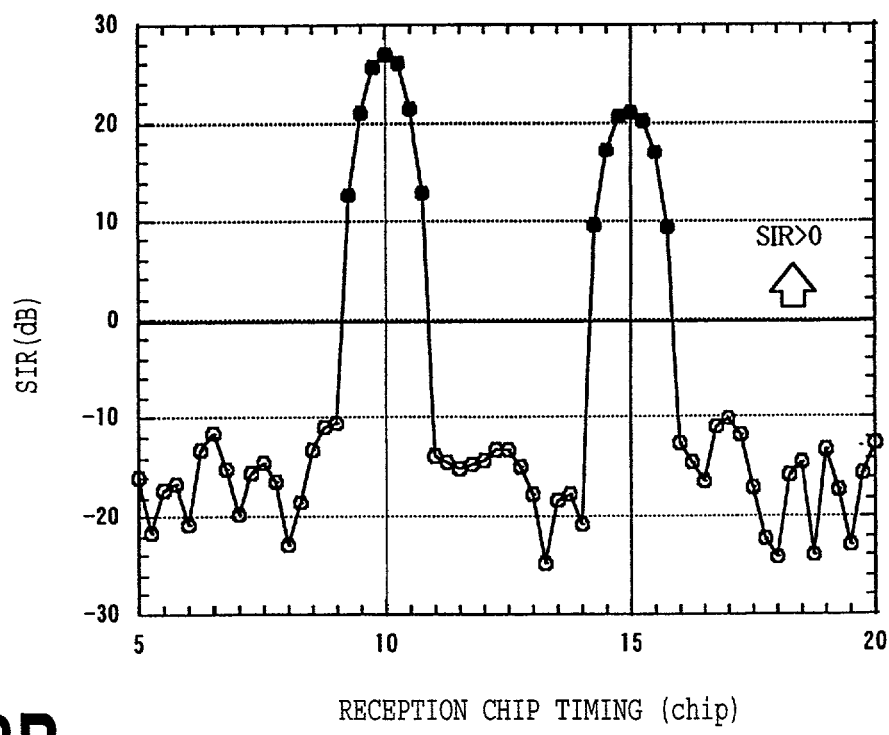

FIGS. 28A and 28B show the results of simulation in the fifth embodiment of the communication quality measuring method. FIG. 28A is a profile of obtained received signal power performing simulation in the same condition as FIGS. 22 and 24. The averaging method performs only averaging in power per chip. FIG. 28B is a profile of SIR per each chip derived using the desired signal power and the interference signal power obtained from FIG. 22. Conventionally, the position of the path to be effective in communication is detected as the synchronization chip timing from the peak where the power becomes maximum by deriving the received signal power per chip in the synchronization detecting portion 221 shown in FIG. 19, as shown in FIG. 28A.

In FIG. 28A, since the desired signal power is set relatively higher than the interference signal power, the path position can be easily detected from the peak value thereof. However, according to increase of the interference signal power, judgment whether the peak value is the actual path position or not, is difficult. On the other hand, it is not possible to distinguish whether the peak is results in presence of the path or the peak is results in fluctuation of noise only by the peak value of the power. When error is present in the synchronization chip timing in the synchronization detecting portion 221, precision in measurement is degraded since the measurement is performed at a chip timing different from the path position effective for communication, in the communication quality measuring portion 224.

On the other hand, in the shown embodiment, the synchronization chip timing obtained in the synchronization detecting portion 221 is taken as the reception chip timing to measure SIR by the first and second embodiments. In the control portion 2304 shown in FIG. 19, judgment is made whether the reception chip timing is offset from the path position effective for communication from the measured SIR value or not. If judgment is made that the reception chip timing is offset from the path position, the synchronization chip timing information portion 225 shown in FIG. 19 is controlled to modify the synchronization chip timing.

On the other hand, in case of the communication quality measurement premised by the measurement window, for all chip timing in the measurement window, the desired signal power, the interference signal power and SIR are measured. Therefore, SIR profile shown in FIG. 28B is obtained. In FIG. 28B, SIR<0 is certainly established at positions where the path is not present, and SIR>0 is established at positions where the path is present. In the control portion 2304 shown in FIG. 19, the peak value where SIR >0 is established is detected to detect the path position effective for communication.

When judgment is made that the position of the measuring window and the window width are not appropriate, modification of the position of the measuring window and the window width is performed by controlling the synchronization chip timing information portion 225 of FIG. 19. By such control, even when the path position between transmitter and receiver is moved by movement of the mobile station, the position of the window is modified following movement of the path. As a result, moving measurement of the communication quality can be realized without causing degradation of precision.

(3) Communication Quality Measuring Method Upon Use of Transmit Diversity

Figure 29:
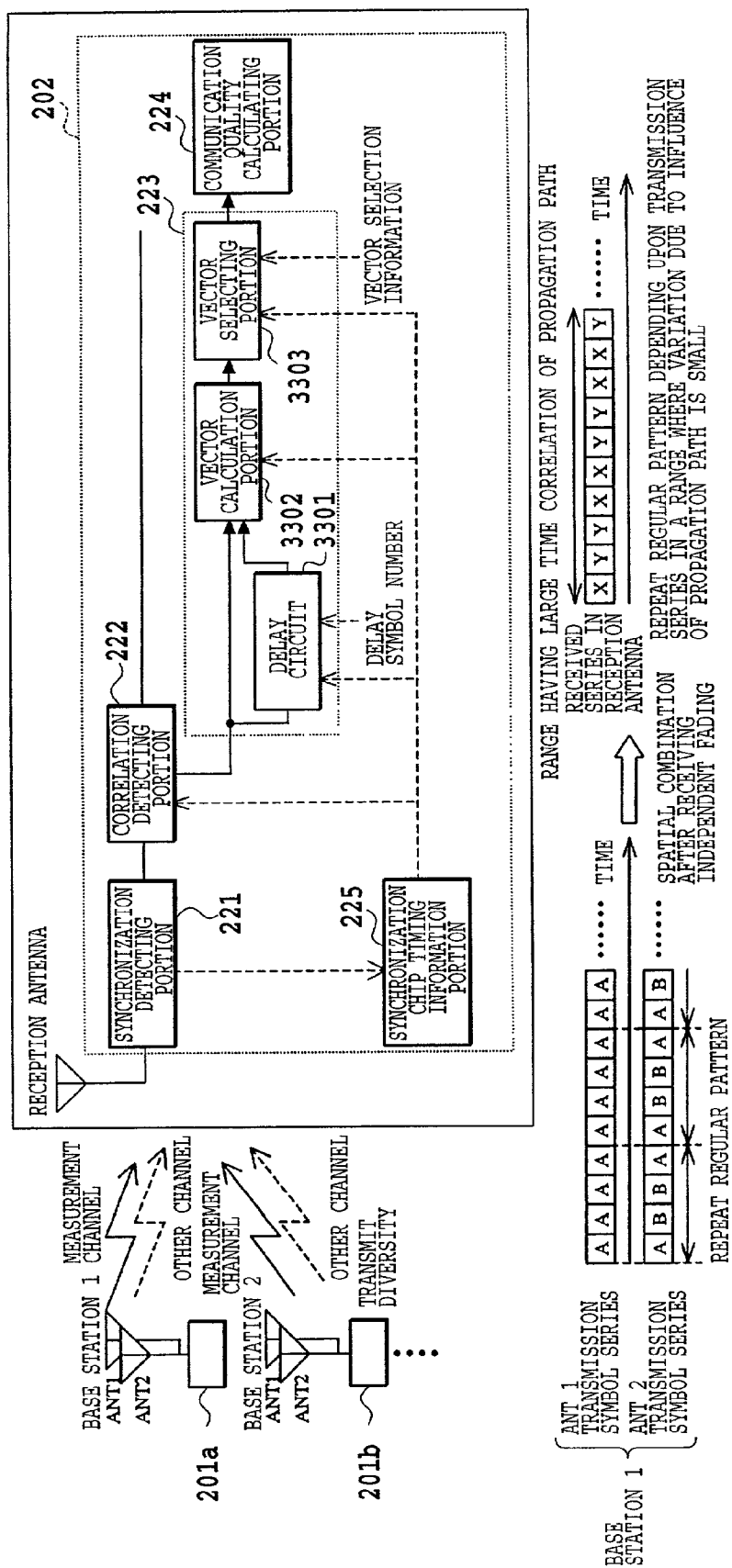
FIG. 29 is a block diagram showing an overall construction of a mobile communication system applying transmit diversity.

FIG. 29 shows overall construction of the mobile communication system applying transmit diversity. The mobile station 202 has the same construction as that shown in FIG. 2. The time series generating portion 223 is constructed with a delay circuit 3301 delaying the received signal vector after correlation detection for a predetermined delay symbol number, a vector calculation portion 3302 deriving a difference vector and add vector from difference and sum of the received signal vector, and a vector selecting portion 3303 selecting vector for performing calculation by the communication quality calculating portion 224.

When communication is performed applying transmit diversity as the channel to be measured, the channel repeatedly transmitted a known symbol series of respectively different patterns using common spreading code is assumed from two different antennas of the radio base station. When the communication applying transmit diversity is not performed, the channel repeatedly transmitted a known transmission symbol series is assumed. While two antennas of the radio base stations are located close to each other, the distance of the antennas is set to make the spatial correlation small. At receiving point in the service area, the signal reaches as a signal influenced by independent propagation path. The signals transmitted from two antennas are received by the antenna at the reception point as combined in vector in space.

Figure 30:
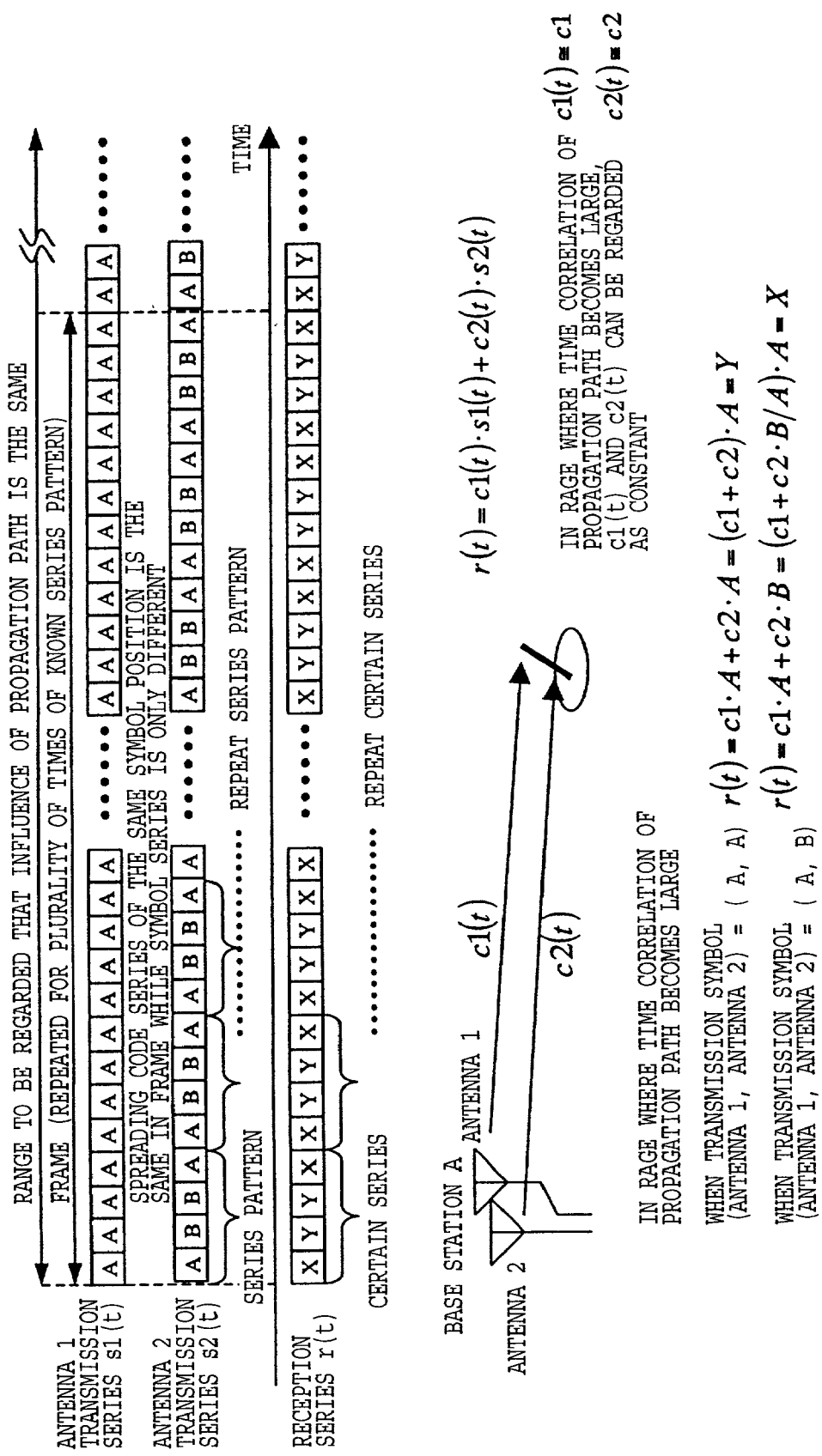
FIG. 30 is an illustration for explaining process for explaining correlation detection process in one embodiment of the present invention.

FIG. 30 is an illustration for explaining process for explaining correlation detection process in one embodiment of the present invention. In general, a transmission series s1(t) from the antenna #1 and a transmission series s2(t) from the antenna #2 are subject to respectively independent fading c1(t) and c2(t). These two series are received after combination in the space.

Accordingly, ignoring transmission delay, a received series becomes r(t)=c1(t)*s1(t)+c2(t)*s2(t). Here, considering a time range where influences of the propagation paths are regarded as the same, fading can be regarded as constant, c1(t)=c1 and c2(t)=c2. Therefore, the received series becomes a given value per combination of the transmission series s1(t) and s2(t).

For example, when the symbol of the transmission series of the antenna #1 at a certain timing is assumed as A and the symbol of the transmission series of the antenna #2 at the certain timing is assumed as A, the received series becomes X. When the symbol of the transmission series of the antenna #1 at a certain timing is assumed as A and the symbol of the transmission series of the antenna #2 at the certain timing is assumed as B, the received series becomes Y. As set forth above, in a time range where the influence of the propagation path is regarded as constant, the received series is determined only depending upon the transmission series.

In this circumstance, in the transmission series, if the regular pattern is periodically and repeatedly transmitted, certain series pattern is repeated in the same period in the received series. At this time, when a correlation value between the received series and the delayed received series delayed for a period of the regular series pattern is derived, the derived value becomes 1. Namely, the delayed received series delayed for the period of the transmitted series pattern and the received series are completely matched and the mutual correlation between the series becomes 1. Here, on transmission side, a unit where the known series pattern is repeated for a plurality of times is defined as frame.

Figure 31:
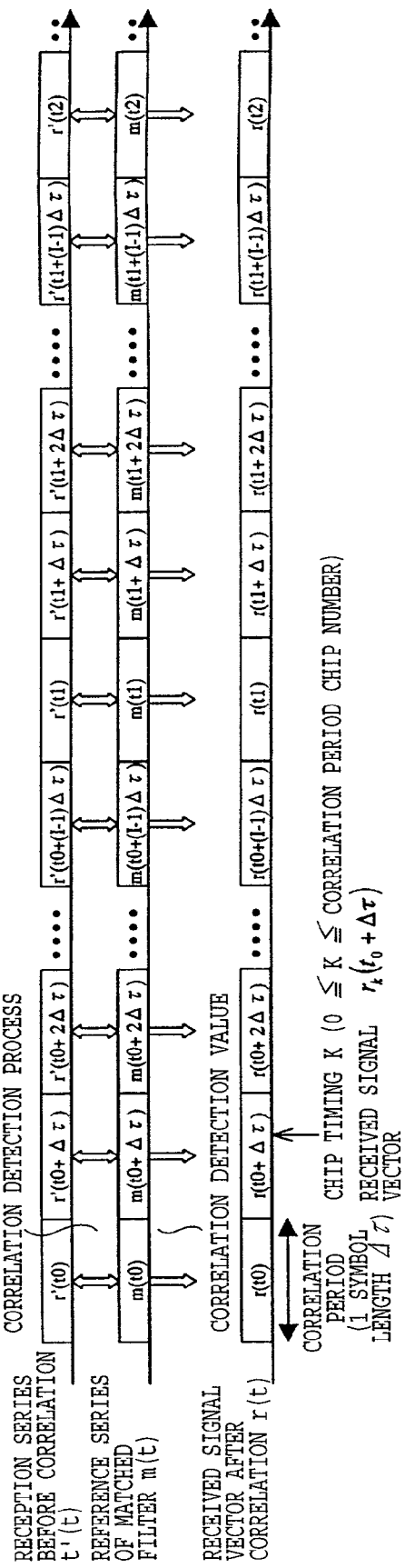
FIG. 31 is an illustration for explaining a correlation detection process in one embodiment of the present invention.

FIG. 31 shows a process of correlation detection in one embodiment of the present invention. A symbol as correlation unit taking $t_{j+1}+i\Delta\tau$ as leading end of the received series r'(t), is assumed as $r'(t_{j+1}+i\Delta\tau)$, and correlation detection process is performed by the correlation detector, such as matched filter set the code $m(t_{j+1}+i\Delta\tau)$ spreading respective of corresponding symbol, the received signal vector series $r(t_{j+1}+i\Delta\tau)$ after correlation can be obtained. Thus, the received signal vector is assumed as $r_k(t_{j+1}+i\Delta\tau)$. It should be noted that $\Delta\tau$ is a period of one symbol length, j is a repetition number of the series pattern in one frame, i is symbol number in the pattern, k is a reception chip timing in the symbol. On the other hand, it is assumed that information of the leading end position, the symbol position and so on of the channel frame to be measured are already known.

Figure 32:
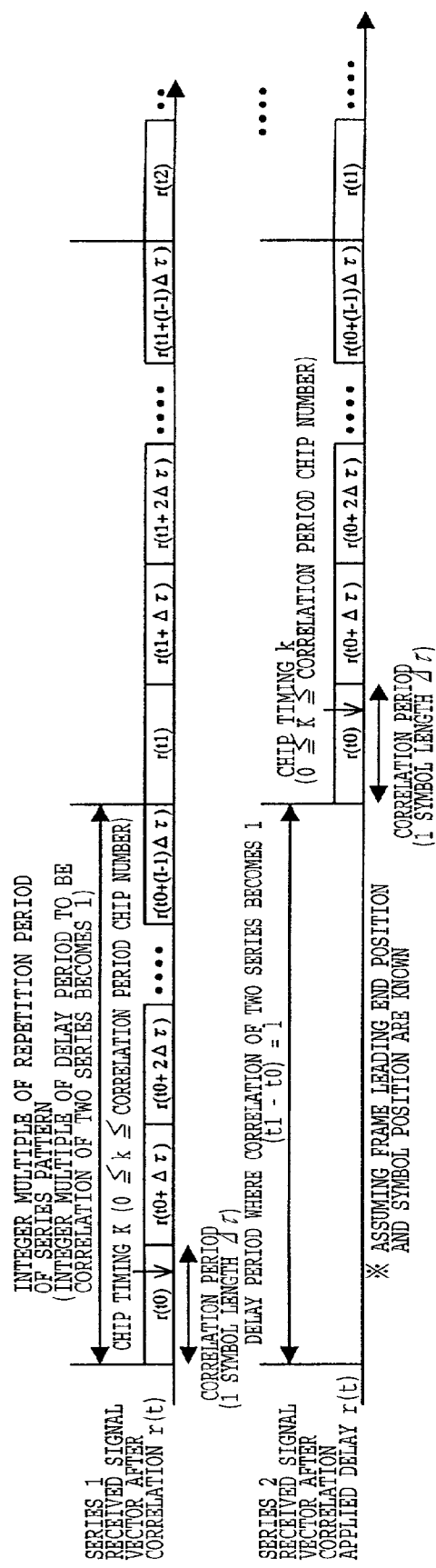
FIG. 32 is an illustration for explaining a delay process one embodiment of the present invention.

FIG. 32 shows a delay process in one embodiment of the present invention. With a preliminarily set delay symbol number I, by delaying the received signal vector series after correlation detection for delay symbol number I, the delayed received signal vector series is generated. The delay symbol number I us set at integer multiple of the repetition period of the transmission series pattern.

Figure 33:
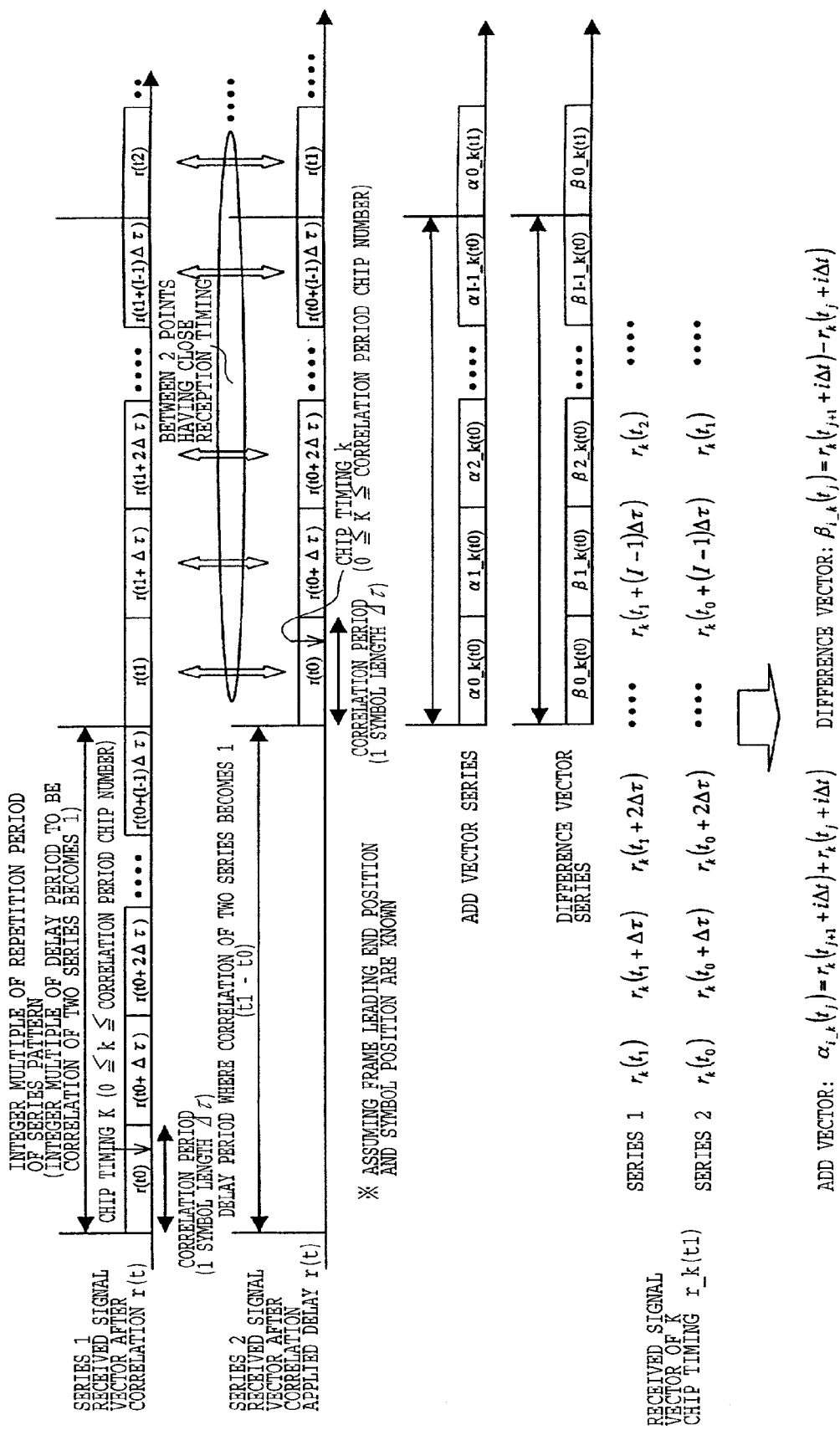
FIG. 33 is an illustration for explaining a vector calculation process in one embodiment of the present invention.

FIG. 33 shows vector calculation process in one embodiment of the present invention. In two time series data of the received signal vector series r(t) after correlation and the delayed received signal vector series r(t–IΔτ) delayed for delay symbol number I, the received signal vector $r_k(t_{j+1}+i\Delta\tau)$ in the reception chip timing k in the symbol and from difference and sum of the received signal vector series $r_k(t_{j+1}+i\Delta\tau-I\Delta\tau)$, namely $r_k(t_j+i\Delta\tau)$ at the same reception chip timing, at which the series is delayed for delay symbol I, difference vector and add vector are derived. The add vector becomes $\alpha_{i\_k}(t_j)=r_k(t_{j+1}+i\Delta\tau)+r_k(t_j+i\Delta\tau)$ and the difference vector becomes $\beta_{i\_k}(t_j)=r_k(t_{j+1}+i\Delta\tau)-r_k(t_j+i\Delta\tau)$.

Figure 34:
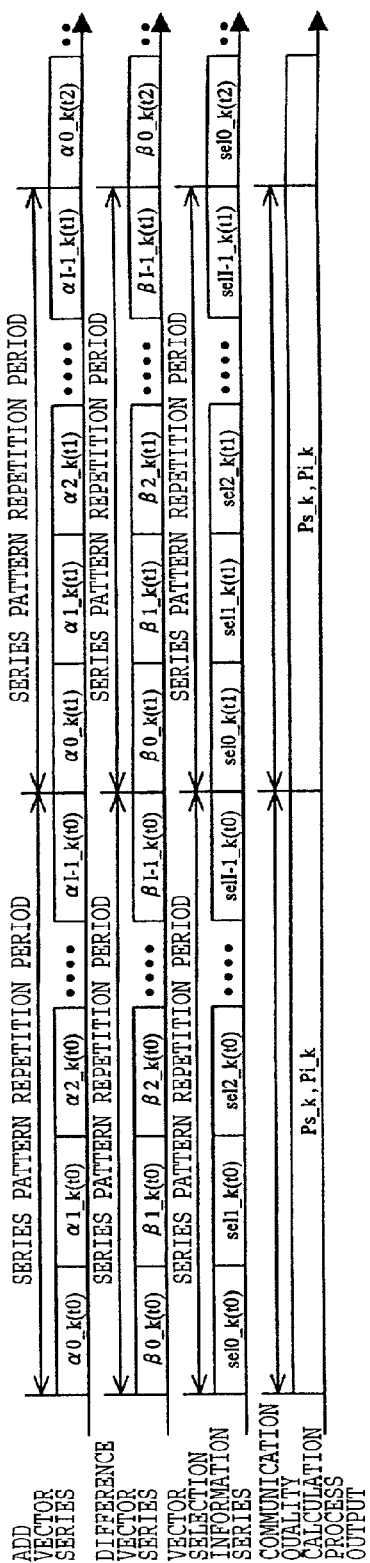
FIG. 34 is an illustration for explaining a vector selection process and communication quality calculating process in one embodiment of the present invention.

FIG. 34 shows a process of vector selection and a process of communication quality calculation in one embodiment of the present invention. The vector selection selects output of the vector calculation process to be input to the communication quality calculation process by a preliminarily set vector selection information $sel_{i\_k}(t_j)$, namely the difference vector and the add vector. The vector selection information is information ON=1 and OFF=0 per symbol.

The communication quality calculation uses input add vector $\alpha'_{i\_k}(t_j)$ and the difference vector $\beta'_{i\_k}(t_j)$. From an average of the difference vector, the interference signal power is derived, and from an average of the add vector and the average of the difference vector, the desired signal power is derived. SIR is derived from a ratio of the desired signal power and the interference signal power.

Figure 35:
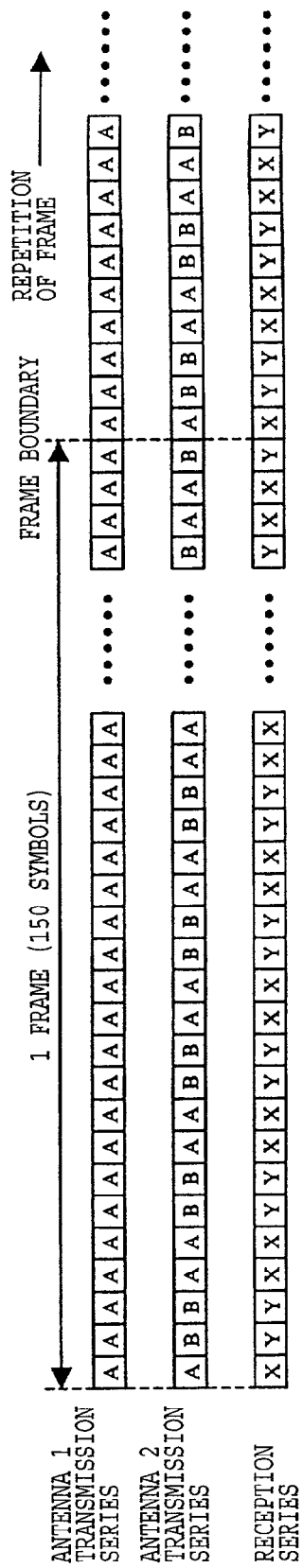
FIG. 35 is an illustration showing CPICH upon use of transmit diversity in the mobile communication system using W-CDMA system.

FIG. 35 shows CPICH upon use of the transmit diversity in the mobile communication system using W-CDMA cellular system. CPICH is consisted of 150 symbols per one frame, a symbol series consisted of four symbols (A, A, A, A) is transmitted from the antenna #1 and a symbol series consisted of four symbols (A, B, B, A) is transmitted from the antenna #2. Since the transmission symbol series is once reset per one frame, regularity of the four symbol period is not continued at the boundary of the frame. Therefore, in order to obtain a series where the correlation of the transmission symbol series becomes 1, the delay period has to be set at one frame. However, in case of the series provided such long delay should go beyond the range where the influence of the propagation path is constant to make it difficult to derive correct add vector and difference vector.

In order to avoid this, there are a method for selecting only correct add vector and the difference vector by setting the delay period to four symbols to avoid frame boundary, the delay period symbol is taken as one symbol, and a method for selecting only correct add vector and the difference vector appearing every other symbol with taking one symbol as the delay period symbol.

Figure 36:
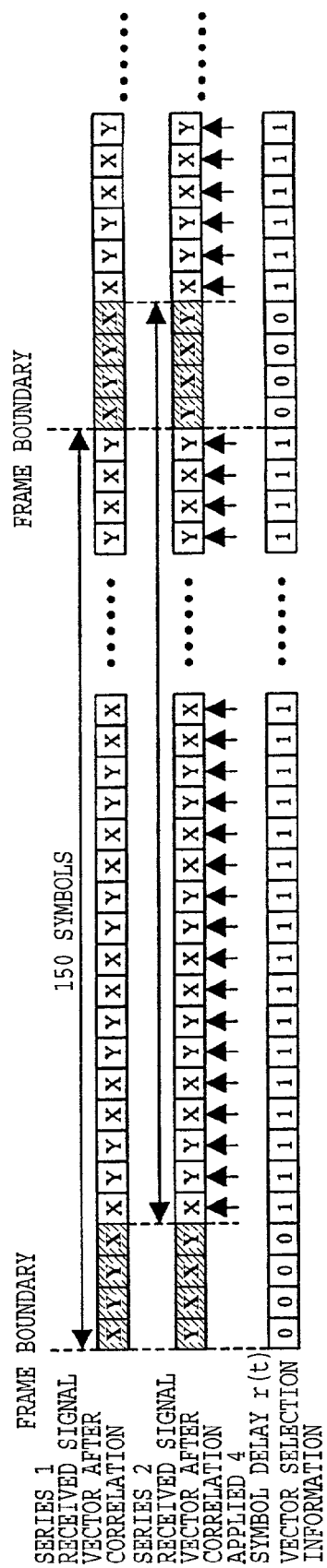
FIG. 36 is an illustration showing a principle of operation of the first embodiment of the communication quality measuring method while transmit diversity is applied, according to the present invention.

FIG. 36 shows a principle of operation of the first embodiment of the communication quality measuring method upon use of the transmit diversity according to the present invention. The synchronization detection is calculated with taking four symbols as the delay period. Among 150 symbols in one frame, 146 symbols matches symbol of the series 2, 4 symbols from the frame boundary do not match with the symbols in series 2. Therefore, the correlation value of the series 1 and the series 2 can not be 1. Since this make is difficult to derive correct add vector and difference vector, by setting the vector information of part of unmatched symbol in the frame boundary in the vector selection process, result of correct calculation can be obtained in the communication quality calculating process.

Figure 37:
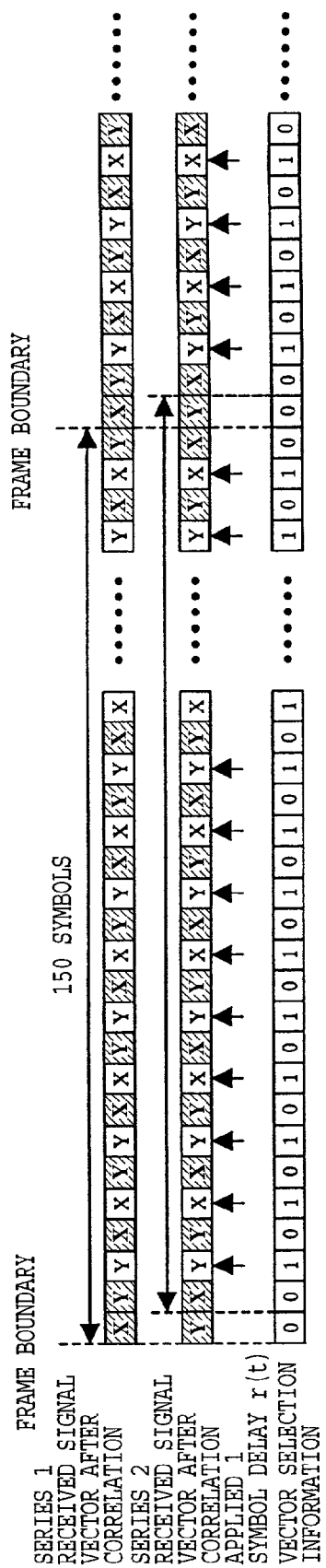
FIG. 37 is an illustration showing a principle of operation of the second embodiment of the communication quality measuring method while transmit diversity is applied, according to the present invention.

FIG. 37 shows a principle of operation of the second embodiment of the communication quality measuring method upon use of the transmit diversity according to the present invention. Communication quality is calculated with tasking one symbol as delay period. In the series 1, excluding first symbol from the leading end of the frame, odd number order symbol match with the symbols in the series 2, but even number order symbols from the leading end of the frame do not match. Therefore, the correlation value of the series 1 and series 2 does not become 1. With leaving this, correct add vector and the difference vector can be calculated. Therefore, by setting vector information to off=0 for the first and even number order symbols from the leading end of the frame, correct result of calculation can be obtained in the communication quality calculation process.

Figure 38:
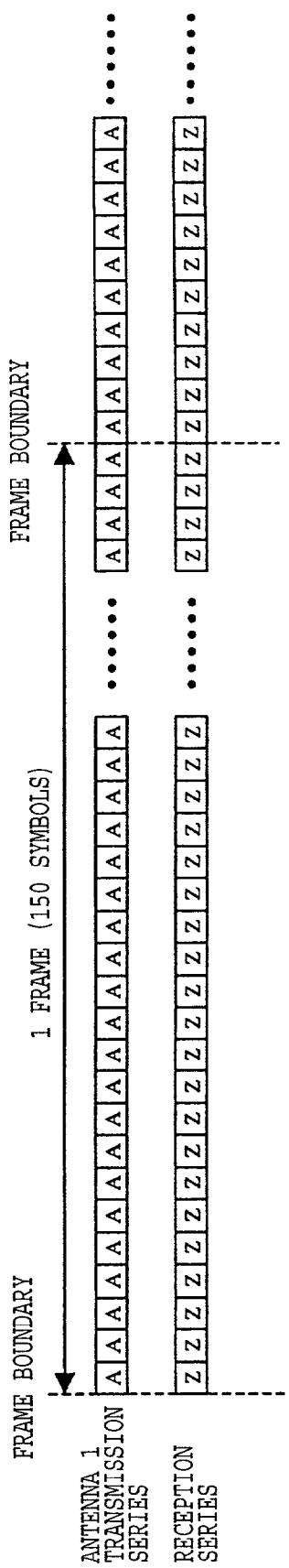
FIG. 38 is an illustration showing CPICH upon non-use of transmit diversity in the mobile communication system using W-CDMA system.

FIG. 38 shows CPICH when transmit diversity is not applied in the mobile communication system used in W-CDMA cellular system. The pilot channel is consisted of 150 symbols for one frame. A symbol series consisted of four symbols (A, A, A, A) is repeatedly transmitted only from the antenna #1 with taking four symbol as a period. While the transmission symbol series is reset per one frame, since symbol is constant, non-continuous at the frame boundary is not generated. Therefore, by applying any delay period, correlation of the transmission symbol series becomes 1. Accordingly, at arbitrary delay period where time correlation of the propagation path becomes small, correct add vector and difference vector can be derived.

This demonstrates capability of correct measurement of the desired signal power and the interference signal power when the transmit diversity is not applied using either the method of calculating the communication quality with taking four symbols as delay period as shown in FIG. 36 or the method of calculating the communication quality with taking one symbol as delay period as shown in FIG. 37. Accordingly, even when the base stations applying the transmit diversity and the base stations not applying the transmit diversity are present, it becomes unnecessary to change calculation method and the calculation method is used commonly.

Figure 39:
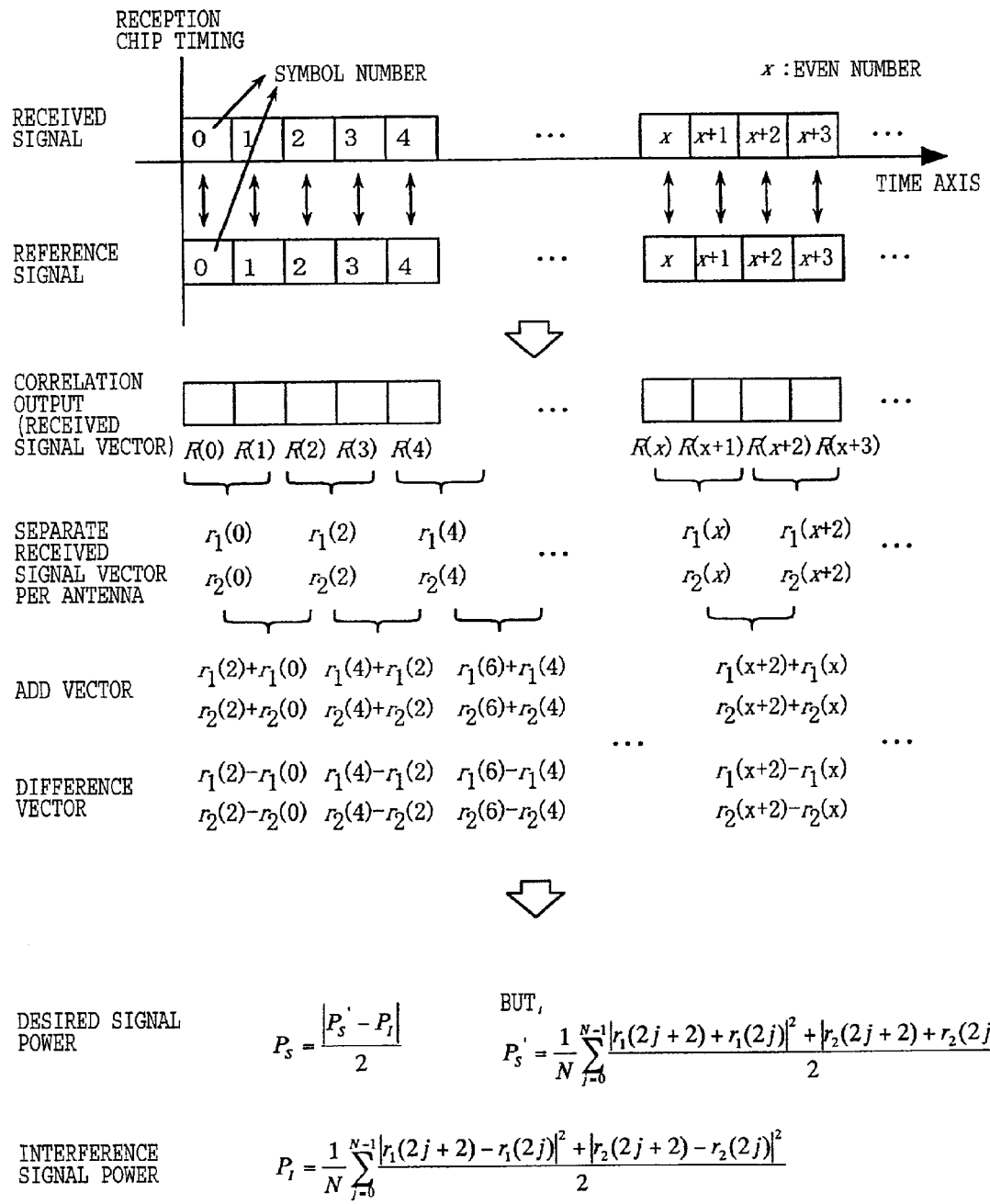
FIG. 39 is an illustration showing a principle of operation of the third embodiment of the communication quality measuring method while transmit diversity is used, according to the present invention.

FIG. 39 shows a principle of operation of the third embodiment of the communication quality measuring method upon use of the transmit diversity according to the present invention. With taking CPICH as channel to be measured upon use of the transmit diversity, the communication quality measuring method which does not require the vector selecting portion 223 shown in FIG. 29, is illustrated. The synchronization chip timing detected by the synchronization detecting portion 221 and accumulated in the synchronization chip timing information portion 225 is taken as reception chip timing. Then, detection of correlation is performed with modifying the spreading code of a reference signal adapting to the symbol number of the received signals. The received signal vector for each transmission antenna is calculated from the foregoing equation (4) using the received signal vector obtained by correlation detection.

Next, the add vector and the difference vector are generated per each transmission antenna. The desired signal power and the interference signal power upon use of transmit diversity are derived from the add vector and the difference vector for each antenna. In FIG. 39, N upon deriving the desired signal power and the interference signal power is number of samples of the add vector or the difference vector per one transmission antenna. For example, when the averaging period is 150 symbols (number of symbols in one frame), for example, N becomes 74. On the other hand, in FIG. 39, correlation detection is performed from the leading end of the frame for simplification, correlation detection is not necessarily performed from the leading end.

Figure 40:
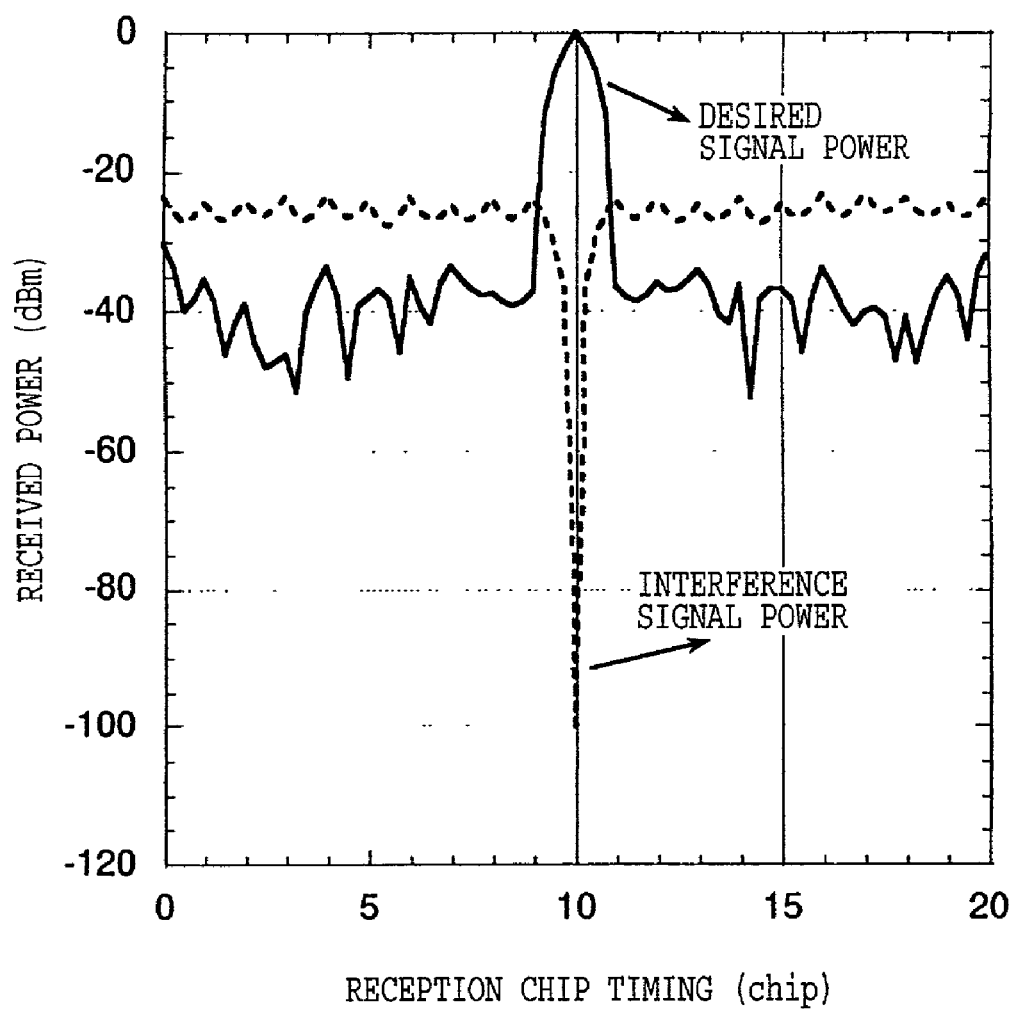
FIG. 40 is an illustration showing a result of simulation in the third embodiment of the communication quality measuring method upon use of transmit diversity.

FIG. 40 shows the result of simulation in the third embodiment of the communication quality measuring method upon use of transmit diversity. Under the premise of synchronization quality measurement using the measuring window, 4 times of over-sampling points is performed for the chip timing. Simulation is performed to set the received power of the desired signal at 0 dBm (−3 dBm for each antenna), the received power of the interference signal at −100 dBm, and the path position between transmitter and receiver at tenth chip in the measurement window. From FIG. 40, at set path position between transmitter and receiver, the desired signal power and the interference signal power can be calculated with high precision.

Figure 41:
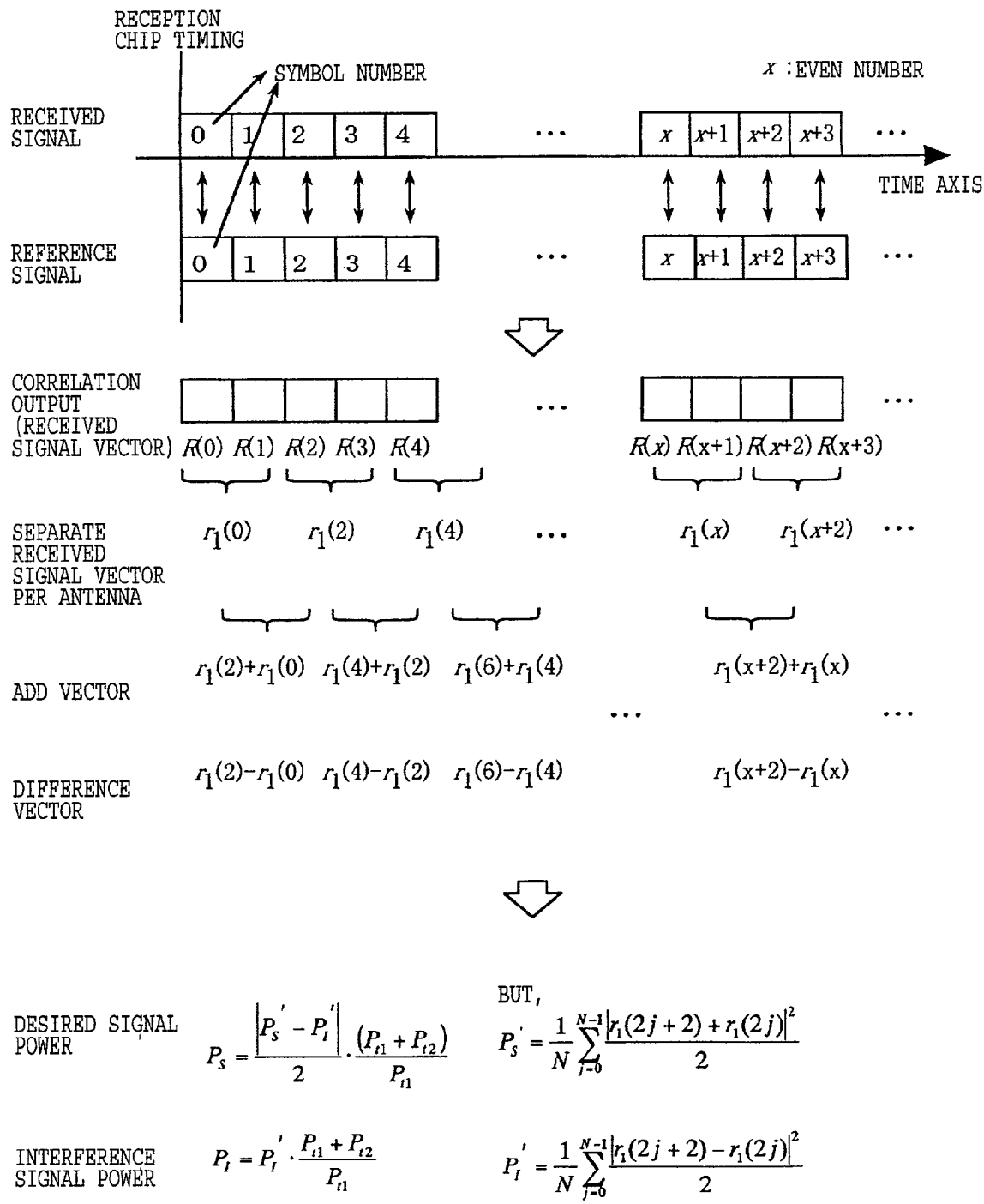
FIG. 41 is an illustration showing a principle of operation of the fourth embodiment of the communication quality measuring method while transmit diversity is applied, according to the present invention.

FIG. 41 shows a principle of operation of the fourth embodiment of the communication quality measuring method upon use of the transmit diversity according to the present invention. With taking CPICH as the channel to be measured upon applied of transmit diversity, the communication quality measuring method not requiring the vector selecting process 223 of FIG. 29 will be explained. In the shown embodiment, from the received signal vector obtained from correlation detection, only received signal vector for one transmission antenna is derived from the foregoing equation (4). Here, the transmission antenna to be selected is either antenna #1 or antenna #2. Calculation is simple as the antenna #1 is selected. In FIG. 41, the antenna #1 is selected as the selected transmission antenna.

Next, for the obtained received signal vector in one transmission antenna, the add vector and the difference vector are generated. The desired signal power and the interference signal power upon use of transmit diversity are calculated from the add vector and the difference vector. In FIG. 41, N upon deriving the desired signal power and the interference signal power is number of samples of the add vector or the difference vector per one transmission antenna. For example, when the averaging period is 150 symbols (number of symbols in one frame), for example, N becomes 74. On the other hand, upon derivation of the desired signal power and the interference signal power, $(P_{t1}+P_{t2})/P_{t1}$ is a correlation value which is a known value. Here, $P_{t1}$ and $P_{t2}$ are transmitting power of CPICH in each transmission antenna. It should be noted that, in FIG. 41, correlation detection is performed from the leading end of the frame for simplification. However, correlation detection can be not necessarily performed from the leading end.

Figure 42:
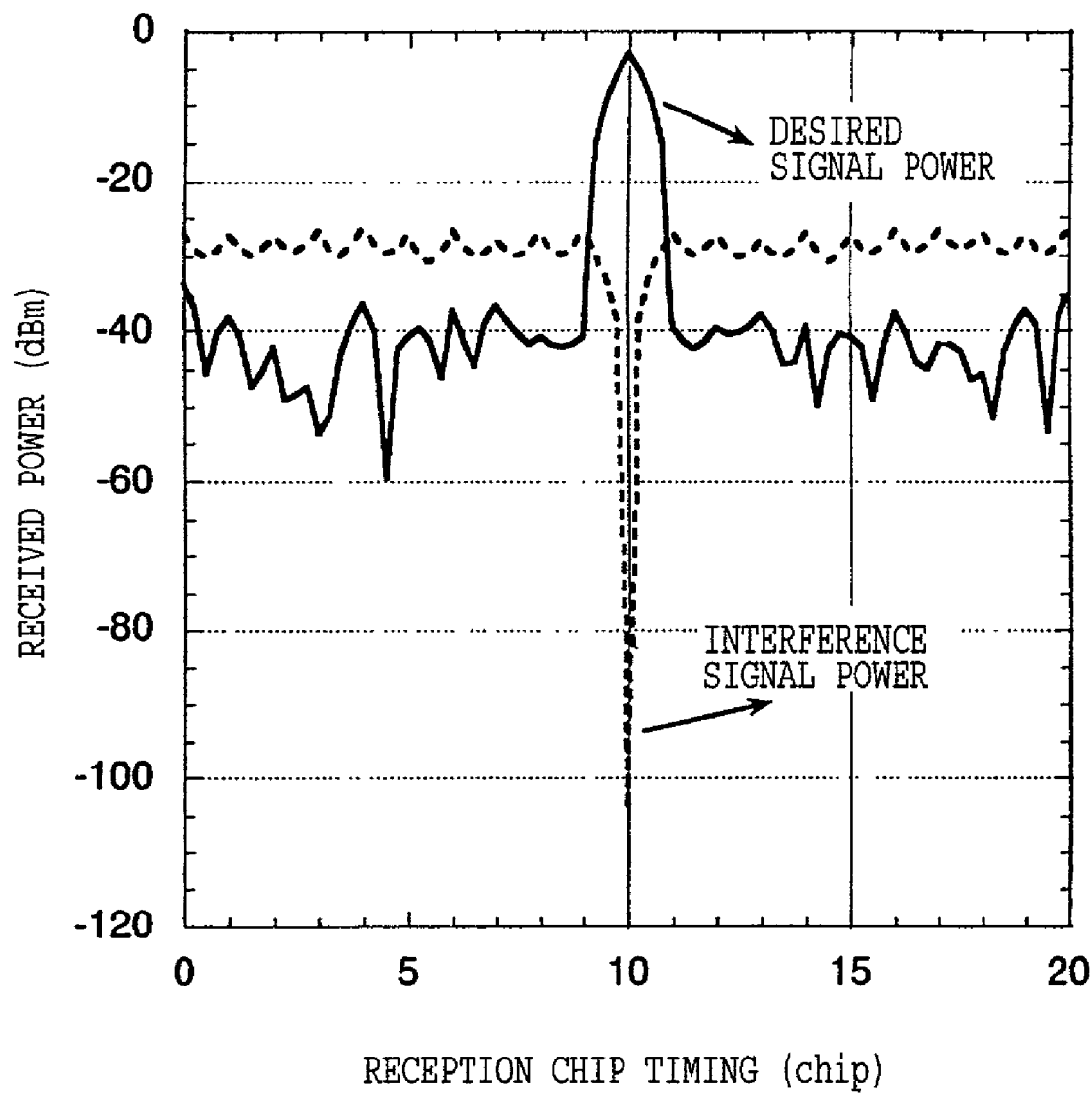
FIG. 42 is an illustration showing a result of simulation in the fourth embodiment of the communication quality measuring method upon use of transmit diversity.

FIG. 42 shows a result of simulation in the fourth embodiment of the communication quality measuring method upon use of transmit diversity. Condition of simulation is the same as FIG. 40. FIG. 42 shows the value before correction by the transmitting power. At the path position between the transmitter and receiver, it can be appreciated that the desired signal power and the interference signal power are calculated at −3 dB lower than the set values. On the other hand, the correction value is $(P_{t1}+P_{t2})/P_{t1}=2$ (3 dB). Accordingly, by adding the correction value of 3 dB, the desired signal power and the interference signal power can be correctly measured.

What is claimed is:

1. A communication quality measuring method in CDMA cellular system detecting a reception chip timing of a channel to be measured and measuring communication quality, comprising:

time series generating step of generating two series of data consisted of a time series data of a detected value and a time series data delayed for one, two or more periods, with respect to said reception chip timing where the detected value becomes the same;

matrix calculation step of deriving covariant matrix of said two series data generated in said time series generating step;

first power calculating step of deriving a desired signal power and an interference signal power in said reception chip timing from a eigenvalue of said covariant matrix; and signal to interference power ratio (SIR) calculating step deriving a SIR at said reception chip timing from said desired signal power and said interference signal power.

2. A communication quality measuring method in CDMA cellular system as claimed in claim 1, which further comprises third power calculation step of deriving an averaged desired signal power and an averaged interference signal power by performing averaging in a given period from said desired signal power and said interference signal power obtained in said first power calculation step and a second power calculation step, and in said SIR calculation step, said SIR is derived from said averaged desired signal power and said averaged interference signal power.

3. A communication quality measuring method in CDMA cellular system as claimed in claim 2, wherein when the channel to be measured is plural and only one correlation detector is useful,
  in said third power calculating step, said averaged desired signal power and said average interference signal power are derived in time division, and
  in said SIR calculation step, said SIR of a plurality of channels are derived in time division.

4. A communication quality measuring method in CDMA cellular system as claimed in claim 1, wherein when the channel to be measured is plural and only one correlation detector is useful,
  correlation detection of a plurality of channels is performed in time division for generating two series generated in the same reception chip timing per channel.

5. A communication quality measuring method in CDMA cellular system as claimed in claim 4, which further comprises
  fourth power calculation step of deriving an averaged desired signal power and an averaged interference signal power by averaging a given period from said desired signal power and said interference signal power obtained in said first power calculation step and a second power calculation step, and
  in said SIR calculation step, said SIR is derived from said averaged desired signal power and said averaged interference signal power.

6. A communication quality measuring method in CDMA cellular system as claimed in claim 1, which further comprises:
  path detection step of deriving paths between transmitter and receiver to be effective for communication from a value of said SIR obtained in said SIR calculation step.

7. A communication quality measuring method in CDMA cellular system detecting a reception chip timing of a channel to be measured and measuring communication quality, comprising:
  time series generating step of generating two series of data consisted of a time series data of a detected value and a time series data delayed for one, two or more periods, with respect to said reception chip timing where the detected value becomes the same;
  adding step of deriving an add vector from addition of received signal vectors between two points close in reception timing when said two series data generated in said time series generating step becomes a particular correlation value;
  subtracting step of deriving a difference vector from a difference of received signal vectors between two points close in reception timing;
  second power calculation step of deriving a desired signal power and an interference signal power by averaging said add vectors and said difference vectors; and
  signal to interference power ratio (SIR) calculating step deriving a SIR at said reception chip timing from said desired signal power and said interference signal power.

8. A communication quality measuring method in CDMA cellular system as claimed in claim 7, which further comprises
  third power calculation step of deriving an averaged desired signal power and an averaged interference signal power by performing averaging in a given period from said desired signal power and said interference signal power obtained in a first power calculation step and said second power calculation step, and
  in said SIR calculation step, said SIR is derived from said averaged desired signal power and said averaged interference signal power.

9. A communication quality measuring method in CDMA cellular system as claimed in claim 8, wherein when the channel to be measured is plural and only one correlation detector is useful,
  in said third power calculating step, said averaged desired signal power and said average interference signal power are derived in time division, and
  in said SIR calculation step, said SIR of a plurality of channels are derived in time division.

10. A communication quality measuring method in CDMA cellular system as claimed in claim 7, wherein when the channel to be measured is plural and only one correlation detector is useful,
  correlation detection of a plurality of channels are performed in time division for generating two series generated in the same reception chip timing per channel.

11. A communication quality measuring method in CDMA cellular system as claimed in claim 10, which further comprises
  fourth power calculation step of deriving an averaged desired signal power and an averaged interference signal power by averaging a given period from said desired signal power and said interference signal power obtained in said first power calculation step and a second power calculation step, and
  in said SIR calculation step, said SIR is derived from said averaged desired signal power and said averaged interference signal power.

12. A communication quality measuring method in CDMA cellular system as claimed in claim 7, which further comprises:
  path detection step of deriving paths between transmitter and receiver to be effective for communication from a value of said SIR obtained in said SIR calculation step.

13. A communication quality measuring apparatus in CDMA cellular system detecting a reception chip timing of a channel to be measured and measuring communication quality, comprising:
  time series generating means for generating two series of data consisted of a time series data of a detected value and a time series data delayed for one, two or more periods, with respect to said reception chip timing where the detected value becomes the same;
  matrix calculation means for deriving covariant matrix of said two series data generated in said time series generating means;
  first power calculating means for deriving a desired signal power and an interference signal power in said reception chip timing from eigenvalues of said covariant matrix; and
  signal to interference power ratio (SIR) calculating means deriving a SIR at said reception chip timing from said desired signal power and said interference signal power.

14. A communication quality measuring apparatus in CDMA cellular system as claimed in claim 13, which further comprises:
  third power calculation means for deriving an averaged desired signal power and an averaged interference signal power by performing averaging in a given period from said desired signal power and said interference signal power obtained in said first power calculation means and a second power calculation means.

15. A communication quality measuring apparatus in CDMA cellular system as claimed in claim 14, wherein when the channel to be measured is plural and only one correlation detector is useful,
said third power calculating means derives said averaged desired signal power and said average interference signal power in time division, and
said SIR calculation means derives said SIR of a plurality of channels in time division.

16. A communication quality measuring apparatus in CDMA cellular system as claimed in claim 13, wherein when the channel to be measured is plural and only one correlation detector is useful,
correlation detection of a plurality of channels is performed in time division for generating two series generated in the same reception chip timing per channel.

17. A communication quality measuring apparatus in CDMA cellular system as claimed in claim 16, which further comprises:
fourth power calculation means for deriving an averaged desired signal power and an averaged interference signal power by averaging a given period from said desired signal power and said interference signal power obtained in said first power calculation means and a second power calculation means.

18. A communication quality measuring apparatus in CDMA cellular system as claimed in claim 13, which further comprises
path detection means for deriving a path between transmitter and receiver to be effective for communication from a value of said SIR obtained in said SIR calculation means.

19. A communication quality measuring apparatus in CDMA cellular system detecting a reception chip timing of a channel to be measured and measuring communication quality, comprising:
time series generating means for generating two series of data consisted of a time series data of a detected value and a time series data delayed for one, two or more periods, with respect to said reception chip timing where the detected value becomes the same;
adding means for deriving an add vector from addition of received signal vector between two points close in reception timing when said two series data generated in said time series generating means becomes a particular correlation value;
subtracting means for deriving a difference vector from a difference of received signal vectors between two points close in reception timing;
second power calculation means for deriving a desired signal power and an interference signal power by averaging said add vectors and said difference vectors; and
signal to interference power ratio (SIR) calculating means deriving a SIR at said reception chip timing from said desired signal power and said interference signal power.

20. A communication quality measuring apparatus in CDMA cellular system as claimed in claim 19, which further comprises
third power calculation means for deriving an averaged desired signal power and an averaged interference signal power by performing averaging in a given period from said desired signal power and said interference signal power obtained in a first power calculation means and said second power calculation means.

21. A communication quality measuring apparatus in CDMA cellular system as claimed in claim 20, wherein when the channel to be measured is plural and only one correlation detector is useful,
said third power calculating means derives said averaged desired signal power and said average interference signal power in time division, and
said SIR calculation means derives said SIR of a plurality of channels in time division.

22. A communication quality measuring apparatus in CDMA cellular system as claimed in claim 19, wherein when the channel to be measured is plural and only one correlation detector is useful,
correlation detection of a plurality of channels is performed in time division for generating two series generated in the same reception chip timing per channel.

23. A communication quality measuring apparatus in CDMA cellular system as claimed in claim 22, which further comprises
fourth power calculation means for deriving an averaged desired signal power and an averaged interference signal power by averaging a given period from said desired signal power and said interference signal power obtained in said first power calculation means and a second power calculation means.

24. A communication quality measuring apparatus in CDMA cellular system as claimed in claim 19, which further comprises
path detection means for deriving a path between transmitter and receiver to be effective for communication from a value of said SIR obtained in said SIR calculation means.

25. A communication quality measuring method in CDMA cellular system detecting reception chip timing of channel to be measured repeatedly transmitted a transmission symbol series of a known pattern and performing measurement of communication quality, comprising:
correlation detection step of performing correlation detection of received signal using a code series spreading said channel to be measured;
delay step of delaying one of received series detected in said correlation detection step for one, two or more symbol period within a range where mutual correlation between transmission symbol series is 1 and influence of a propagation path can be regarded as the same;
vector calculation step of calculating difference vector and add vector from difference value and add value of respective received signal vectors of the same reception chip timing in the other received series detected by said correlation detection step and the received series provided delay in said delay step; and
communication quality calculation step of calculating a desired signal power, an interference signal power and SIR from said difference vector and said add vector calculated in said vector calculation step.

26. A communication quality measuring method in CDMA cellular system as claimed in claim 25, which further comprises
vector selection step of selecting only result of calculation at the same reception chip timing of received symbol matching respective transmission symbols among difference vector and add vector calculated in said vector calculation step when a correlation between the other received series detected in said correlation detection step and the received series delayed in said delay step is smaller than one.

27. A communication quality measuring method in CDMA cellular system detecting reception chip timing of channel to be measured repeatedly transmitted transmission symbol series of respectively different known pattern using common spreading code from different antennas upon use of transmit diversity and performing measurement of communication quality, comprising:

correlation detection step of performing correlation detection of received signal using a code series spreading said channel to be measured;

delay step of delaying one of received series detected in said correlation detection step for one, two or more symbol period within a range where mutual correlation between transmission symbol series in said different antennas is 1 and influence of a propagation path can be regarded as the same;

vector calculation step of calculating difference vector and add vector from difference value and add value of respective received signal vectors of the same reception chip timing in the other received series detected by said correlation detection step and the received series provided delay in said delay step; and communication quality calculation step of calculating a desired signal power, an interference signal power and signal to interference power ratio (SIR) from said difference vector and said add vector calculated in said vector calculation step.

28. A communication quality measuring method in CDMA cellular system as claimed in claim 27, which further comprises vector selection step of selecting only result of calculation at the same reception chip timing of received symbol matching respective transmission symbols of the different antenna among difference vector and add vector calculated in said vector calculation step when a mutual correlation between transmission symbol series in said different antenna is smaller than one.

29. A communication quality measuring apparatus in CDMA cellular system detecting reception chip timing of channel to be measured repeatedly transmitted a transmission symbol series of a known pattern and performing measurement of communication quality, comprising:

correlation detection means for performing correlation detection of received signal using a code series spreading said channel to be measured;

delay means for delaying one of received series detected in said correlation detection step for one, two or more symbol period within a range where mutual correlation between transmission symbol series is 1 and influence of a propagation path can be regarded as the same;

vector calculation means for calculating difference vector and add vector from difference value and add value of respective received signal vectors of the same reception chip timing in the other received series detected by said correlation detection step and the received series provided delay in said delay step; and communication quality calculation means for calculating a desired signal power, an interference signal power and signal to interference ratio (SIR) from said difference vector and said add vector calculated in said vector calculation step.

30. A communication quality measuring apparatus in CDMA cellular system as claimed in claim 29, which further comprises vector selection means for selecting only result of calculation at the same reception chip timing of received symbol matching respective transmission symbols among difference vector and add vector calculated in said vector calculation step when a correlation between the other received series detected in said correlation detection step and the received series delayed in said delay step is smaller than one.

31. A communication quality measuring apparatus in CDMA cellular system detecting reception chip timing of channel to be measured repeatedly transmitted transmission symbol series of respectively different known pattern using common spreading code from different antennas upon use of transmit diversity and performing measurement of communication quality, comprising:

correlation detection means for performing correlation detection of received signal using a code series spreading said channel to be measured;

delay means for delaying one of received series detected in said correlation detection step for one, two or more symbol period within a range where mutual correlation between transmission symbol series in said different antennas is 1 and influence of a propagation path can be regarded as the same;

vector calculation means for calculating difference vector and add vector from difference value and add value of respective received signal vectors of the same reception chip timing in the other received series detected by said correlation detection step and the received series provided delay in said delay step; and communication quality calculation means for calculating a desired signal power, an interference signal power and SIR from said difference vector and said add vector calculated in said vector calculation step.

32. A communication quality measuring apparatus in CDMA cellular system as claimed in claim 31, which further comprises vector selection means for selecting only result of calculation at the same reception chip timing of received symbol matching respective transmission symbols of the different antenna among difference vector and add vector calculated in said vector calculation step when a mutual correlation between transmission symbol series in said different antenna is smaller than one.

33. In a mobile communication system employing CDMA cellular system using a common pilot channel constantly transmitted from a base station in a mobile communication system upon use of transmit diversity for measuring communication quality in a mobile station being measured, a communication quality measuring method in CDMA cellular system comprising:

in said mobile station, received signal vector obtained by correlation detection of received signal per symbol being separated into received signal vector per transmission antenna by performing addition and subtraction before and after symbol, and a desired signal power, an interference signal power and signal to interference power ratio (SIR) being calculated by deriving add vector and difference vector of two received signal vectors spaced for a plurality of symbol periods per transmission antenna, and performing averaging process of said add vector and said difference vector.

34. A communication quality measuring method in CDMA cellular system as claimed in claim 33, wherein said add vector and said difference vector are derived from the received signal vector of one transmission antenna and said desired signal power, said interference signal power and SIR are derived by adding a predetermined correction value.

35. A communication quality measuring method in CDMA cellular system as claimed in claim 34, wherein said desired signal power and said interference signal power are averaged, and said desired signal power, said interference signal power and SIR are calculated by adding a predetermined correction value.

36. In a mobile communication system employing CDMA cellular system using a common pilot channel constantly transmitted from a base station in a mobile communication system upon use of transmit diversity for measuring communication quality in a mobile station being measured, a communication quality measuring apparatus in CDMA cellular system comprising:

said mobile station includes means for receiving received signal vector obtained by correlation detection of received signal per symbol being separated into received signal vector per transmission antenna by performing addition and subtraction before and after symbol, and calculating a desired signal power, an interference signal power and signal to power interference ratio (SIR) by deriving add vector and difference vector of two received signal vectors spaced for a plurality of symbol periods per transmission antenna, and performing averaging process of said add vector and said difference Vector.

37. A communication quality measuring apparatus in CDMA cellular system as claimed in claim 36, wherein said means derives said add vector and said difference vector from the received signal vector of one transmission antenna and derives said desired signal power, said interference signal power and SIR by adding a predetermined correction value.

38. A communication quality measuring apparatus in CDMA cellular system as claimed in claim 37, wherein said means averages said desired signal power and said interference signal power, and calculates said desired signal power, said interference signal power and SIR by adding a prodetennined correction value.

\* \* \* \* \*

UNITED STATES PATENT AND TRADEMARK OFFICE
CERTIFICATE OF CORRECTION

PATENT NO. : 7,050,482 B2
APPLICATION NO. : 09/827800
DATED : May 23, 2006
INVENTOR(S) : Imai et al.

It is certified that error appears in the above-identified patent and that said Letters Patent is hereby corrected as shown below:

Title Page
Item 56, References Cited, OTHER PUBLICATIONS, first reference, line 3, change "Mandayan" to --Mandayam--

Column 1
Line 34, change "detoctor" to --detector--
Line 49, change "presents" to --are present--

Column 2
Line 8, change "period" to --periods--
Line 40, change "Channel" to --CHannel--

Column 3
Line 15, after "invention" remove "is"
Line 22, change "period" to --periods--
Line 35, remove "a"
Line 38, change "consisted" to --consisting--
Line 53, remove "a"
Line 56, change "consisted" to --consisting--

Column 4
Line 22, change "are" to --is--
Line 56, remove "a"

Column 5
Line 8, remove "a"
Line 11, change "consisted" to --consisting--

Column 6
Line 16, change "period" to --periods--
Line 17, change "1" to --1--
Line 29, change "1" to --1--
Line 43, change "period" to --periods--
Line 45, change "1" to --1--
Line 64, change "antenna" to --antennas--

UNITED STATES PATENT AND TRADEMARK OFFICE
CERTIFICATE OF CORRECTION

PATENT NO. : 7,050,482 B2
APPLICATION NO. : 09/827800
DATED : May 23, 2006
INVENTOR(S) : Imai et al.

It is certified that error appears in the above-identified patent and that said Letters Patent is hereby corrected as shown below:

Column 7
Line 6, change "antenna" to --antennas--
Line 9, change "antenna" to --antennas--
Line 19, change "period" to --periods--
Line 32, change "1" to --1--
Line 47, change "period" to --periods--
Line 48, change "1" to --1--

Column 8
Line 16, change "antenna" to --antennas--
Line 63, after "27th" insert --inventions--
Line 66, after "timing" change "value" to --values--

Column 9
Line 23, after "filter" insert --that--
Lines 57-58, after "timing" change "value" to --values--

Column 10
Line 19, after "plurality" insert --of--
Line 20, change "antenna" to --antennas--
Line 20, change "period" to --periods--
Line 22, change "antenna" to --antennas--
Line 50, after "plurality" insert --of--
Line 50, change "antenna" to --antennas--
Line 51, change "period" to --periods--
Line 52, change "antenna" to --antennas--
Line 59, change "power" to --powers--

Column 11
Line 30, change "includes" to --including--

Column 12
Lines 12-13, after "detection" insert --can be done--

Column 15
Line 27, change "are" to --is--

UNITED STATES PATENT AND TRADEMARK OFFICE
CERTIFICATE OF CORRECTION

PATENT NO.         : 7,050,482 B2
APPLICATION NO. : 09/827800
DATED                  : May 23, 2006
INVENTOR(S)        : Imai et al.

It is certified that error appears in the above-identified patent and that said Letters Patent is hereby corrected as shown below:

Column 16
Line 16, change "fir" to --for--
Line 17, change "are" to --is--
Line 63, change "candidate" to --candidates--
Line 65. change "candidate" to --candidates--

Column 17
Line 2, change "as" to --is--
Line 37, change "S6" to --S26--
Line 56, change "measures" to --measured--

Column 18
Line 25, change "candidate" to --candidates--
Line 27, change "candidate" to --candidates--
Line 53, after "timings" insert --is derived--
Line 58, change "take" to --make--

Column 19
Line 3, after "mobile station," insert --and--
Line 34, replace Equation (2) with --$<P_{t1}|\alpha_1|^2+P_{t2}|\alpha_2|^2>$--

Column 21
Line 3, after "means" insert --2303--
Line 8, after "means" insert --2303--
Line 44, change "is" to --in--

Column 22
Line 45, remove "an"
Line 57, change "Condition" to --Conditions--

Column 25
Line 18, change "1" to --1--
Line 32, after "pattern," insert --and--
Line 42, change "us" to --is--

Column 26
Line 31, change "4" to --4--
Line 34, after "can not be" change "1" to --1--
Line 65, change "1" to --1--

UNITED STATES PATENT AND TRADEMARK OFFICE
CERTIFICATE OF CORRECTION

PATENT NO. : 7,050,482 B2
APPLICATION NO. : 09/827800
DATED : May 23, 2006
INVENTOR(S) : Imai et al.

It is certified that error appears in the above-identified patent and that said Letters Patent is hereby corrected as shown below:

Column 28
Line 41, change "consisted" to --consisting--

Column 29
Line 41, change "consisted" to --consisting--

Column 31
Line 41, change "consisted" to --consisting--

Column 32
Line 38, after "to be measured" insert --by--
Line 38, change "transmitted" to --transmitting--
Line 46, change "period" to --periods--

Column 33
Line 6, after "to be measured" insert --by--
Line 6, change "transmitted" to --transmitting--
Line 6, before "transmission" insert --a--

Column 34
Line 53, change "rceived" to --received--

Column 36
Line 6, change "Vector" to --vector--
Lines 18-19, change "prode-tennined" to --prede-termined--

Signed and Sealed this

Seventeenth Day of April, 2007

JON W. DUDAS
*Director of the United States Patent and Trademark Office*